US009544896B2

(12) United States Patent
Kim et al.

(10) Patent No.: US 9,544,896 B2
(45) Date of Patent: Jan. 10, 2017

(54) METHOD AND APPARATUS FOR TRANSCEIVING DATA USING PLURALITY OF CARRIERS IN MOBILE COMMUNICATION SYSTEM

(71) Applicant: SAMSUNG ELECTRONICS CO., LTD., Gyeonggi-do (KR)

(72) Inventors: Soeng Hun Kim, Suwon-si (KR); Jae Hyuk Jang, Suwon-si (KR); Jongsoo Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 13 days.

(21) Appl. No.: 14/398,900

(22) PCT Filed: May 9, 2013

(86) PCT No.: PCT/KR2013/004109
§ 371 (c)(1),
(2) Date: Nov. 4, 2014

(87) PCT Pub. No.: WO2013/169046
PCT Pub. Date: Nov. 14, 2013

(65) Prior Publication Data
US 2015/0117287 A1 Apr. 30, 2015

Related U.S. Application Data

(60) Provisional application No. 61/644,645, filed on May 9, 2012, provisional application No. 61/645,591, filed
(Continued)

(51) Int. Cl.
*H04W 72/04* (2009.01)
*H04W 52/02* (2009.01)
(Continued)

(52) U.S. Cl.
CPC ........ *H04W 72/0426* (2013.01); *H04L 5/0032* (2013.01); *H04L 5/0098* (2013.01);
(Continued)

(58) Field of Classification Search
None
See application file for complete search history.

(56) References Cited

U.S. PATENT DOCUMENTS

| 8,060,153 B2 | 11/2011 | Jeong et al. |
| 2008/0160918 A1 | 7/2008 | Jeong et al. |

(Continued)

FOREIGN PATENT DOCUMENTS

| EP | 2 410 670 A2 | 1/2012 |
| KR | 10-2008-0054865 A | 6/2008 |

(Continued)

OTHER PUBLICATIONS

Nokia Siemens Networks et al., Further Considerations on Inter-Site DTX/DRX with HSDPA Multiflow, 3GPP TSG-RAN WG2 Meeting #77bis, Jeju, South Korea, Mar. 26-30, 2012, R2-121777.

(Continued)

*Primary Examiner* — Gary Mui
(74) *Attorney, Agent, or Firm* — Jefferson IP Law, LLP

(57) ABSTRACT

The present invention relates to a method and apparatus for performing a discontinuous reception (DRX) operation while transceiving data using a plurality of carriers in a mobile communication system. The communication method for a terminal according to one embodiment of the present invention comprises receiving a control message, including setting information of a secondary serving cell (SCell) to be added and discontinuous reception setting information, from a primary serving cell (PCell) and applying, if the control message includes an indicator indicating that the first base station to which the SCell to be added belongs and the
(Continued)

second base station to which the PCell belongs are different from each other, the DRX setting information to the serving cell of a first base station. According to one embodiment of the present invention, a discontinuous reception (DRX) operation is applied upon the occurrence of inter-base-station carrier aggregation, thus reducing battery consumption.

14 Claims, 31 Drawing Sheets

Related U.S. Application Data on May 10, 2012, provisional application No. 61/646,888, filed on May 14, 2012, provisional application No. 61/649,910, filed on May 21, 2012, provisional application No. 61/653,026, filed on May 30, 2012, provisional application No. 61/658,617, filed on Jun. 12, 2012.

(51) Int. Cl.
*H04W 76/04* (2009.01)
*H04W 56/00* (2009.01)
*H04W 24/02* (2009.01)
*H04L 5/00* (2006.01)
*H04W 4/18* (2009.01)

(52) U.S. Cl.
CPC ............ *H04W 4/18* (2013.01); *H04W 24/02* (2013.01); *H04W 52/0216* (2013.01); *H04W 52/0241* (2013.01); *H04W 56/0005* (2013.01); *H04W 56/0045* (2013.01); *H04W 76/048* (2013.01); *Y02B 60/50* (2013.01)

(56) References Cited

U.S. PATENT DOCUMENTS

| | | | |
|---|---|---|---|
| 2009/0296643 A1 | 12/2009 | Cave et al. | |
| 2010/0111039 A1* | 5/2010 | Kim | H04W 76/048 370/331 |
| 2010/0322173 A1 | 12/2010 | Marinier et al. | |
| 2010/0323614 A1* | 12/2010 | Yu | H04B 7/155 455/9 |
| 2012/0002635 A1 | 1/2012 | Chung et al. | |
| 2012/0040677 A1* | 2/2012 | Chen | H04W 76/04 455/436 |
| 2012/0044847 A1 | 2/2012 | Chang | |
| 2012/0176950 A1 | 7/2012 | Zhang et al. | |
| 2012/0281566 A1* | 11/2012 | Pelletier | H04W 76/046 370/252 |
| 2012/0314635 A1 | 12/2012 | Lee et al. | |
| 2013/0163497 A1* | 6/2013 | Wei | H04L 5/0007 370/311 |
| 2013/0343261 A1* | 12/2013 | Gonsa | H04B 7/2606 370/315 |
| 2014/0029577 A1* | 1/2014 | Dinan | H04W 36/0072 370/331 |
| 2014/0071920 A1* | 3/2014 | Kamei | H04W 72/0486 370/329 |
| 2014/0105192 A1* | 4/2014 | Park | H04W 56/00 370/336 |
| 2014/0301317 A1* | 10/2014 | Xu | H04W 72/00 370/329 |
| 2015/0003418 A1* | 1/2015 | Rosa | H04W 74/0833 370/331 |
| 2015/0009923 A1* | 1/2015 | Lei | H04W 72/0413 370/329 |

FOREIGN PATENT DOCUMENTS

| | | |
|---|---|---|
| KR | 10-2011-0036518 A | 4/2011 |
| WO | 2009/132290 A2 | 10/2009 |
| WO | 2010-148192 A1 | 12/2010 |
| WO | 2011-038625 A1 | 4/2011 |

OTHER PUBLICATIONS

Huawei et al., Multiflow and DTX/DRX, 3GPP TSG-RAN WG2 #77, Dresden, Germany, Feb. 6-10, 2012, pp. 1-5, R2-120554.

* cited by examiner

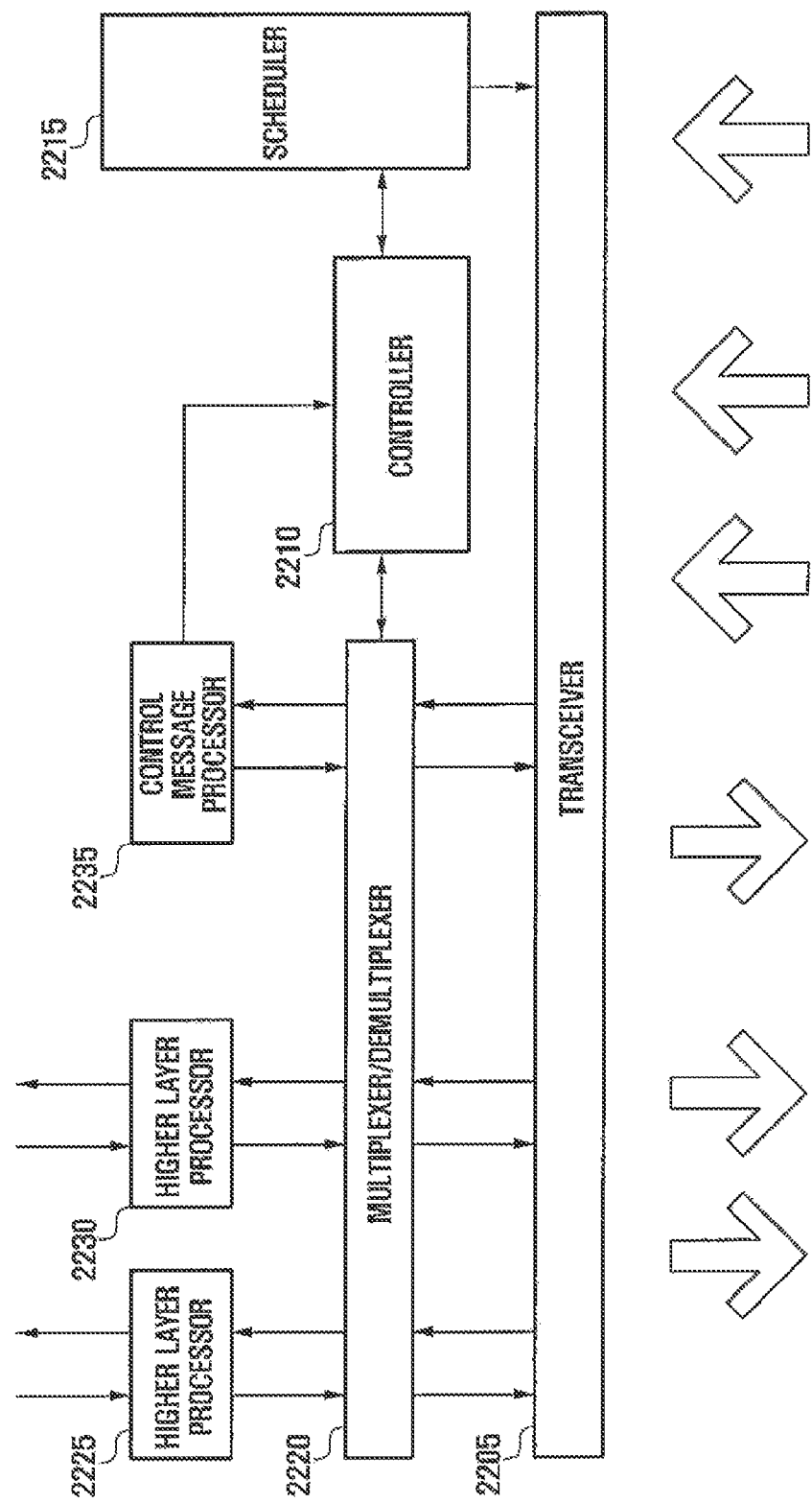

METHOD AND APPARATUS FOR TRANSCEIVING DATA USING PLURALITY OF CARRIERS IN MOBILE COMMUNICATION SYSTEM

TECHNICAL FIELD

The present invention relates to a method and apparatus of performing discontinuous reception operation in multicarrier data communication of a mobile communication system.

BACKGROUND ART

Mobile communication systems were developed to provide mobile users with communication services. With the rapid advance of technologies, the mobile communication systems have evolved to the level capable of providing high speed data communication service beyond the early voice-oriented services.

Recently, standardization for a Long Term Evolution (LTE) system, as one of the next-generation mobile communication systems, is underway in the $3^{rd}$ Generation Partnership Project (3GPP). LTE is a technology for realizing high-speed packet-based communications with the data rate of up to 100 Mbps, which is higher than the currently available data rate, and its standardization is almost complete.

In line with the completion of the LTE standardization, an LTE-Advanced (LTE-A) system is now under discussion, which improves a transfer rate by combining the LTE communication system with several new technologies. One of such technologies is Carrier Aggregation. The Carrier Aggregation is a technology allowing a terminal to use multiple downlink carriers and multiple uplink carriers unlike the conventional technology of using one downlink carrier and one uplink carrier for data communication.

Currently, the LTE-A is featured with the intra-eNB carrier aggregation only. This restricts applicability of the carrier aggregation function so as to a problem of failing aggregation of macro and pico cells in a scenario where a plurality of pico cells and a macro cell operate in an overlapped manner.

DISCLOSURE OF INVENTION

Technical Problem

The present invention has been conceived to solve the above problem and aims to provide an inter-eNB carrier aggregation method and apparatus.

Solution to Problem

In accordance with an aspect of the present invention, a communication method of a terminal in a mobile communication system includes receiving a control message including SCell configuration information on secondary serving cell (SCell) to be added and discontinuous reception (DRX) configuration information from a primary serving cell (PCell) and applying, when the control message includes an indicator indicating that a first base station to which the SCell to be added belongs differs from a second eNB to which the PCell belongs, the DRX configuration to the serving cell of the first base station.

Preferably, the method further includes applying, when the control message does not include an indicator indicating that a first base station to which the SCell to be added belongs differs from a second eNB to which the PCell belongs, the DRX configuration information to the serving cell of the second base station.

Preferably, the method further includes receiving a control message including a DRX MAC CE, determining whether the DRX MAC CE is received from a non-primary set serving cell or a primary set serving cell, and stopping, when the DRX MAC CE is received from the non-primary set serving cell, the DRX timer for the non-primary set serving cell.

Preferably, the method further includes stopping, when the DRX MAC CE is received from the primary set serving cell, the DRX timer for the primary set serving cell.

Preferably, the DRX configuration information comprises at least one of an active time timer and a DRX-cycle parameter.

In accordance with another aspect of the present invention, a communication method of a base station in a mobile communication system, the method includes transmitting a control message including SCell configuration information on secondary serving cell (SCell) to be added and discontinuous reception (DRX) configuration information from a primary serving cell (PCell), the control message including an indicator indicating that a first base station to which the SCell to be added belongs differs from a second eNB to which the PCell belongs.

Preferably, the DRX configuration information comprises at least one of an active time timer and a DRX-cycle parameter.

Preferably, the method further includes transmitting a control message including a DRX MAC CE.

In accordance with another aspect of the present invention, a communication method of a base station in a mobile communication system includes receiving a secondary serving cell (SCell) add request message from a second base station to which a primary serving cell (PCell) belongs and transmitting a SCell parameter and DRX configuration information to the second base station.

Preferably, the method further includes comprising transmitting a control message including a DRX MAC CE.

In accordance with another aspect of the present invention, a terminal includes a transceiver which communicates with a base station and a controller which controls receiving a control message including SCell configuration information on secondary serving cell (SCell) to be added and discontinuous reception (DRX) configuration information from a primary serving cell (PCell) and applying, when the control message includes an indicator indicating that a first base station to which the SCell to be added belongs differs from a second eNB to which the PCell belongs, the DRX configuration to the serving cell of the first base station.

In accordance with another aspect of the present invention, a base station includes a transceiver which communicates with a terminal and a controller which controls transmitting a control message including SCell configuration information on secondary serving cell (SCell) to be added and discontinuous reception (DRX) configuration information from a primary serving cell (PCell), the control message including an indicator indicating that a first base station to which the SCell to be added belongs differs from a second eNB to which the PCell belongs.

In accordance with still another aspect of the present invention, the base station a transceiver which communicates with a terminal and a controller controls receiving a secondary serving cell (SCell) add request message from a second base station to which a primary serving cell (PCell)

belongs and transmitting a SCell parameter and DRX configuration information to the second base station.

Advantageous Effects of Invention

The present invention is advantageous in terms of reducing battery consumption by applying DRX in the inter-eNB carrier aggregation mode.

The advantages of the present invention are not limited to the aforesaid, and other advantages not described herein be clearly understood by those skilled in the art from the descriptions below.

BRIEF DESCRIPTION OF DRAWINGS

FIG. 31 is a block diagram illustrating an eNB according to an embodiment of the present invention.

MODE FOR THE INVENTION

Detailed description of well-known functions and structures incorporated herein may be omitted to avoid obscuring the subject matter of the present invention. Exemplary embodiments of the present invention are described with reference to the accompanying drawings in detail. Prior to the description of the present invention, the LTE system and carrier aggregation are explained briefly.

Figure 1:
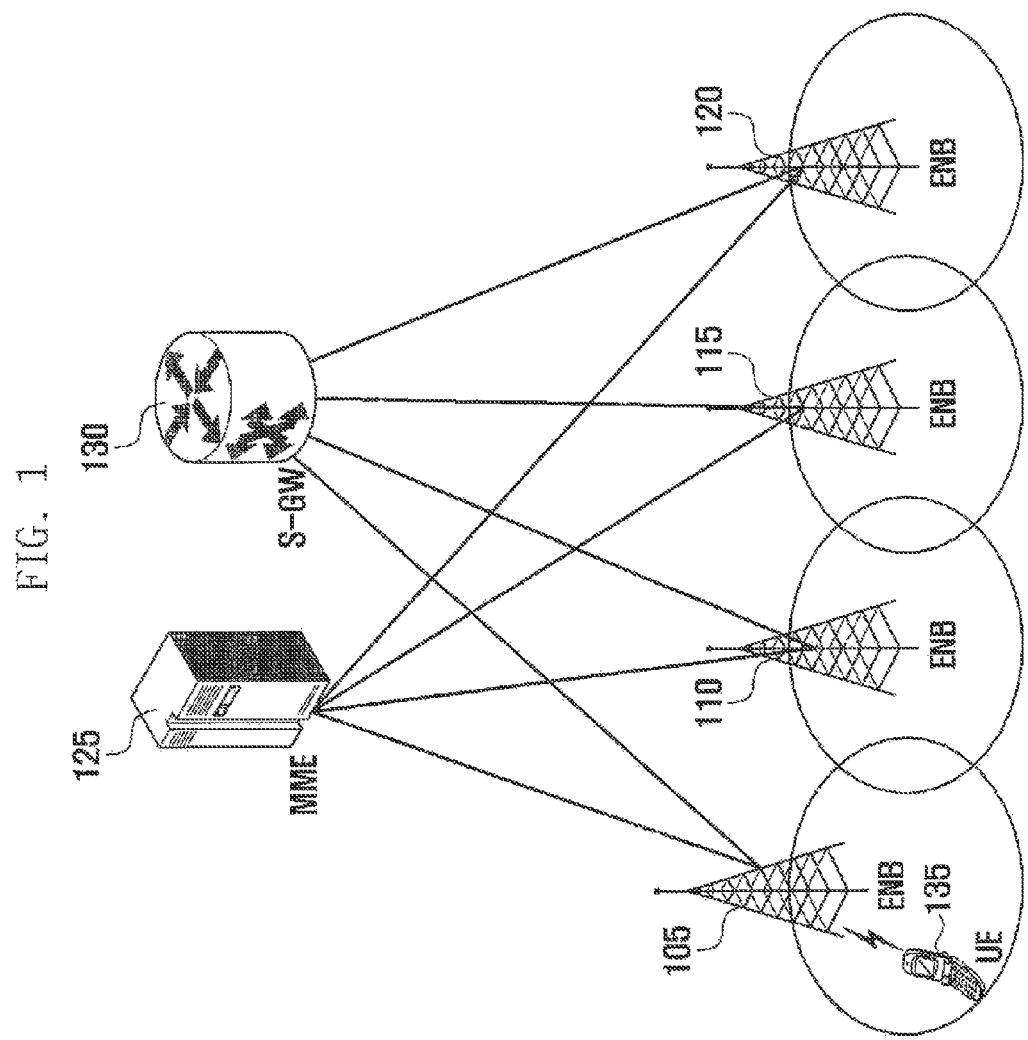
FIG. 1 is a diagram illustrating the architecture of an LTE system according to an embodiment of the present invention.

FIG. 1 is a diagram illustrating the architecture of an LTE system according to an embodiment of the present invention.

Referring to FIG. 1, the radio access network of the mobile communication system includes evolved Node Bs (eNBs) 105, 110, 115, and 120, a Mobility Management Entity (MME) 125, and a Serving-Gateway (S-GW) 130. The User Equipment (hereinafter, referred to as UE) 135 connects to an external network via eNBs 105, 110, 115, and 120 and the S-GW 130.

In FIG. 1, the eNBs 105, 110, 115, and 120 correspond to the legacy node Bs of the UMTS system. The eNBs allow the UE 135 to establish a radio channel and are responsible for complicated functions as compared to the legacy node B. In the LTE system, all the user traffic including real time services such as Voice over Internet Protocol (VoIP) are provided through a shared channel and thus there is a need of a device to schedule data based on the state information such as buffer states, power headroom states, and channel states of the UEs; and the eNBs 110, 115, and 120 are responsible for this. Typically, one eNB controls a plurality of cells. In order to secure the data rate of up to 100 Mbps, the LTE system adopts Orthogonal Frequency Division Multiplexing (OFDM) as a radio access technology. Also, the LTE system adopts Adaptive Modulation and Coding (AMC) to determine the modulation scheme and channel coding rate in adaptation to the channel condition of the UE. The S-GW 130 is an entity to provide data bearers so as to establish and release data bearers under the control of the MME 125. The MME 125 is responsible for mobility management of UEs and various control functions and may be connected to a plurality of eNBs.

Figure 2:
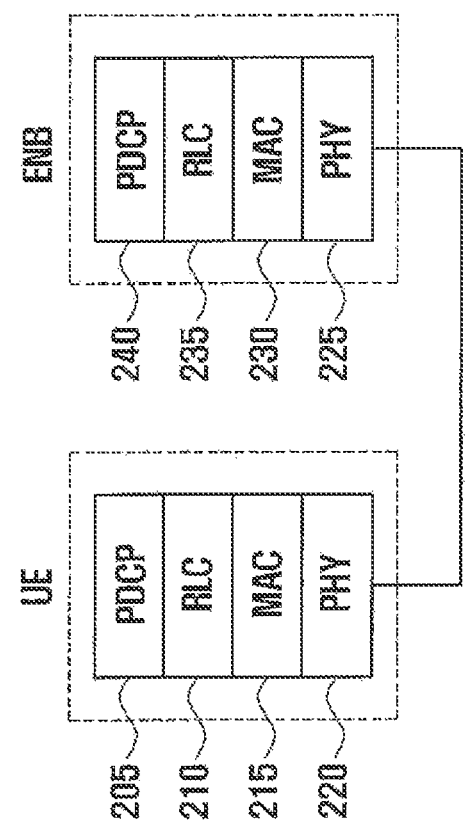
FIG. 2 is a diagram illustrating a protocol stack of the LTE system according to an embodiment of the present invention.

FIG. 2 is a diagram illustrating a protocol stack of the LTE system according to an embodiment of the present invention.

Referring to FIG. 2, the protocol stack of the LTE system includes Packet Data Convergence Protocol (PDCP) 205 and 240, Radio Link Control (RLC) 210 and 235, Medium Access Control (MAC) 215 and 230, and Physical (PHY) 220 and 225. The PDCP 205 and 240 is responsible for IP header compression/decompression, and the RLC 210 and 235 is responsible for segmenting the PDCP Protocol Data Unit (PDU) into segments in appropriate size for Automatic Repeat Request (ARQ) operation. The MAC 215 and 230 is responsible for establishing connection to a plurality of RLC entities so as to multiplex the RLC PDUs into MAC PDUs and demultiplex the MAC PDUs into RLC PDUs. The PHY 220 and 225 performs channel coding on the MAC PDU and modulates the MAC PDU into OFDM symbols to transmit over radio channel or performs demodulating and channel-decoding on the received OFDM symbols and delivers the decoded data to the higher layer.

Figure 3:
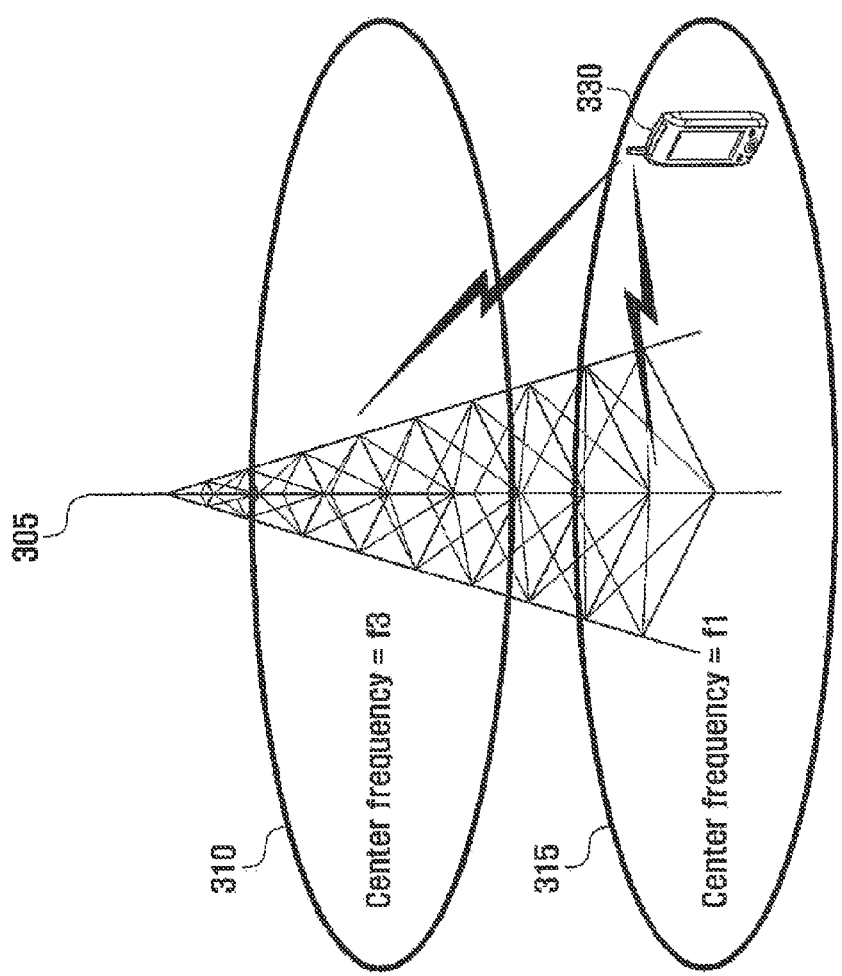
FIG. 3 is a diagram illustrating the concept of intra-eNB carrier aggregation.

FIG. 3 is a diagram illustrating the concept of intra-eNB carrier aggregation.

Referring to FIG. 3, an eNB transmits and receives signals through multiple carriers across a plurality of frequency bands. For example, the eNB 305 can be configured to use the carrier 315 with center frequency f1 and the carrier 310 with center frequency f3. If carrier aggregation is not supported, the UE 330 has to transmit/receive data using one of the carriers 310 and 315. However, the UE 330 having the carrier aggregation capability can transmit/receive data using both the carriers 310 and 315. The eNB can increase the amount of the resource to be allocated to the UE having the carrier aggregation capability in adaptation to the channel condition of the UE so as to improve the data rate of the UE 330. The technique of aggregating the downlink and uplink carriers respectively for transmission and reception at one eNB is referred to as intra-eNB carrier aggregation. In any case, however, there may be a need of aggregating the downlink/uplink carriers of different eNBs.

Figure 4:
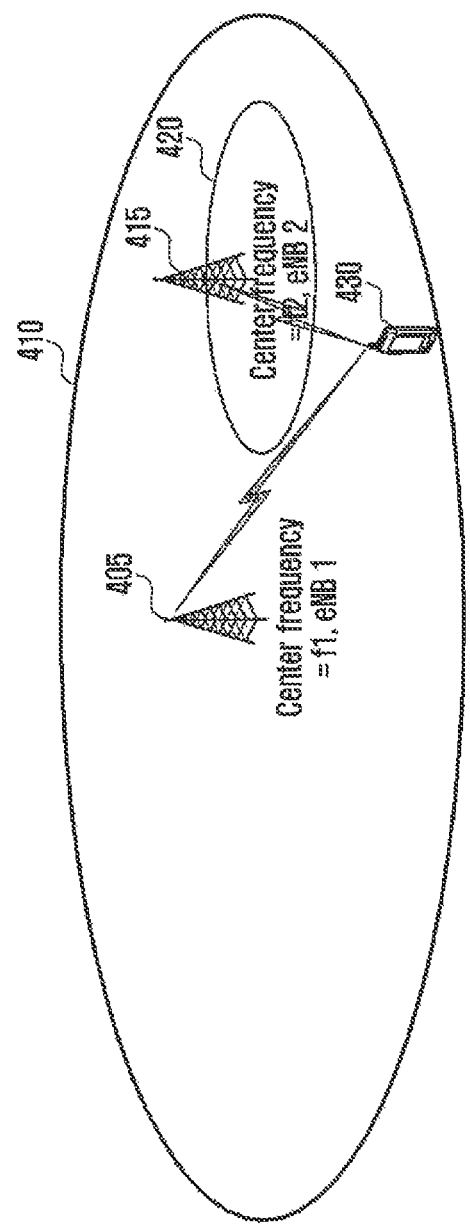
FIG. 4 is a diagram illustrating the concept of the inter-eNB carrier aggregation according to an embodiment of the present invention.

FIG. 4 is a diagram illustrating the concept of the inter-eNB carrier aggregation according to an embodiment of the present invention.

Referring to FIG. 4, the eNB 1 405 uses the carrier 410 with center frequency f1 for transmission/reception, and the eNB 2 415 uses the carrier 420 with center frequency f2 for transmission/reception. If the downlink carrier 410 with the center frequency f1 and the downlink carrier 420 with the center frequency f2 are aggregated, this means that carriers transmitted by more than one eNB are aggregated for one UE. This is referred to as inter-eNB Carrier Aggregation (CA) in the present invention.

The terms used frequently in the present invention are described hereinafter.

Assuming that a cell is configured with one downlink carrier and one uplink carrier in the conventional concept, the carrier aggregation can be understood as if the UE communicates data via multiple cells. With the use of carrier aggregation, the peak data rate increases in proportion to the number of aggregated carriers.

In the following description, if a UE receives data through a certain downlink carrier or transmits data through a certain uplink carrier, this means to receive or transmit data through control and data channels provided in cells corresponding to center frequencies and frequency bands characterizing the carriers. In the present Invention, carrier aggregation may be expressed as configuring a plurality of serving cells with the use of terms such as primary cell (PCell), secondary cell (SCell), and activated serving cell. These terms are used as they are in the LTE mobile communication system and specified in TS36.331 and TS36.321 (December, 2011).

In the present invention, the serving cells controlled by the same eNB are defined as a set of serving cells. The set may is classified into one of a primary set and a non-primary set. The primary set is the set of serving cells controlled by the eNB controlling the PCell (primary eNB), and the non-primary set is the set of serving cells controlled by the eNB not controlling the PCell (non-primary eNB). The eNB may notifies the UE whether a serving cell belongs to the primary set or non-primary set in the process of configuring the corresponding serving cell. One UE can be configured with one primary set and one or more non-primary set.

In the following description, the terms 'primary set' and 'non-primary set' may be substituted by other terms to help understanding. For example, the terms 'primary set,' 'secondary set,' 'primary carrier group,' and 'secondary carrier group' may be used. Even in such a case, however, it should be notice that although the terms are different but used in the same meaning.

Figure 5:
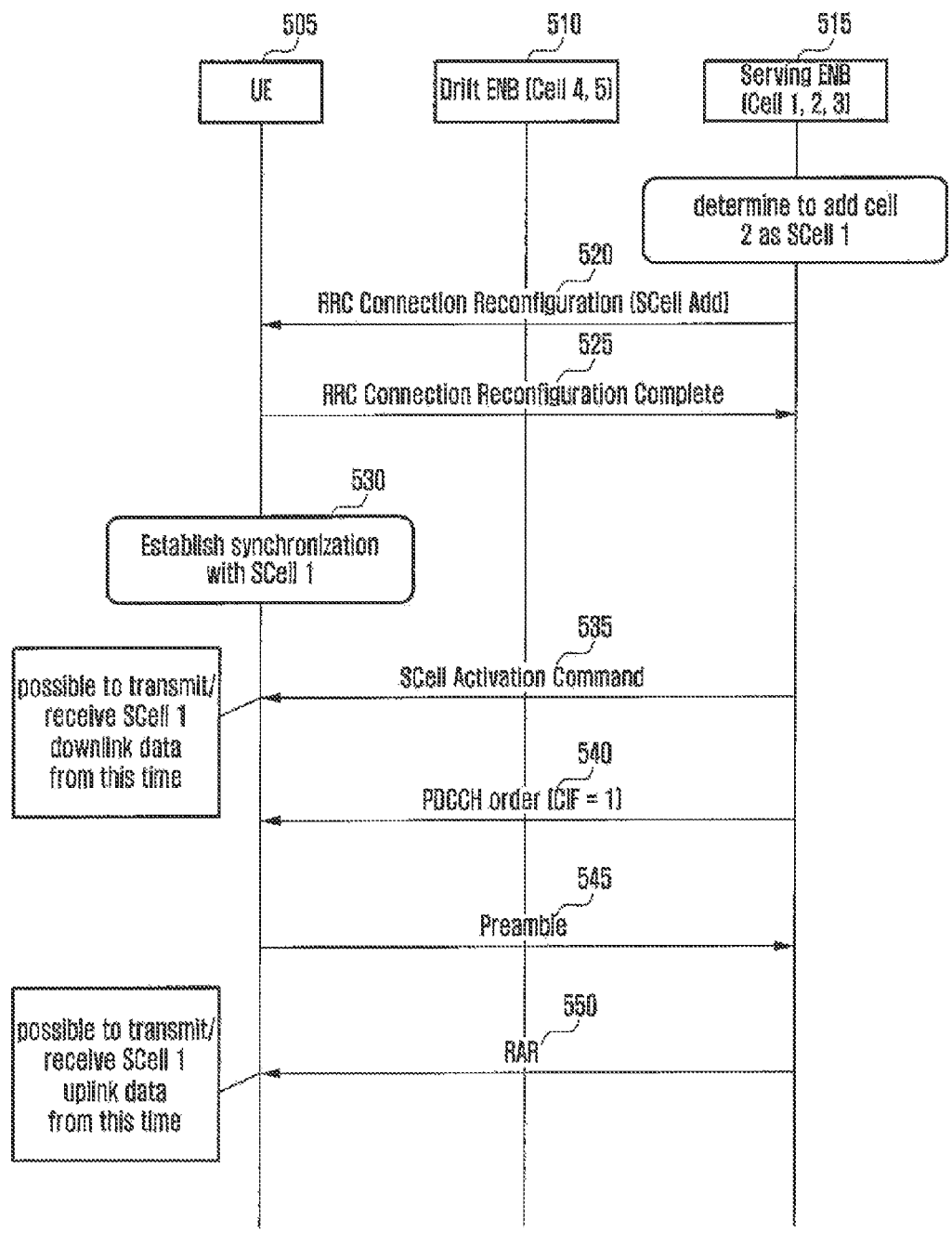
FIG. 5 is a signal flow diagram illustrating the operations of the UE and the eNB for configuring a SCell belonging to the primary set according to an embodiment of the present invention.

FIG. 5 is a signal flow diagram illustrating the operations of the UE and the eNB for configuring a SCell belonging to the primary set according to an embodiment of the present invention.

Referring to FIG. 5, in the mobile communication system made up of the UE 505, the first eNB 515, and the second eNB 510; the first, second, and third cells are controlled by the first eNB 515, and the fourth and fifth cells are control by the second eNB 510. Suppose that the PCell of the UE is the first cell and the first eNB 515 configures the second cell as an additional SCell to the UE 505. In the following description, the eNB 515 controlling the PCell, i.e. the primary set, is referred to as serving eNB. The eNB 510 which is not the serving eNB 515 and controls the serving cell of the UE is referred to as drift eNB. That is, the eNB 515 controlling the serving cells of the primary set is the serving eNB 515, and the eNB 510 controlling the serving cells of the non-primary set is the drift eNB 510. The serving eNB 515 and the drift eNB 510 may be referred to as the primary eNB 515 and non-primary eNB 510, respectively.

The serving eNB 515 sends the UE a control message called RRC Connection Reconfiguration including the information on the SCell to be added newly to the UE at step 520.

The SCells to be added newly are managed by the serving eNB 515 directly and informations thereon, as listed in table 1, are included in the control message.

TABLE 1

| | Description |
|---|---|
| sCellIndex-r10 | Serving cell identifier of an integer with a predetermined size. Used in updating information on the corresponding serving cell in the future. |
| cellIdentification-r10 | Information for use in identifying the serving cell physically and composed of downlink center frequency and Physical Cell ID (PCI) |
| radioResourceConfig-CommonSCell-r10 | Information on radio resource of service cell, e.g. downlink bandwidth, downlink Hybrid ARQ (HARQ) feedback channel configuration information, uplink center frequency information uplink bandwidth information. |
| radioResourceConfig-DedicatedSCell-r10 | Information on UE-specific resource allocated in the serving cell, e.g. channel quality measurement reference signal structure information and inter-carrier scheduling configuration information. |
| Timing Advance Group (TAG) information | Information indicating TAG to which UE belongs. For example, it may be composed of TAG id and Timing Advance (TA) timer. If the UE belongs to P-TAG, this information may not be signaled. |

The Timing Advance Group (TAG) is a set of the serving cells sharing the same uplink transmission timing. A TAG is classified into one of Primary TAG (P-TAG) and Secondary TAG (S-TAG). The P-TAG includes the PCell, and S-TAG includes SCells without PCell). If a certain serving cell belongs to a certain TAG, this means that the uplink transmission timing of the serving cell is identical with those of the other serving cells belonging to the TAG and whether the uplink synchronization is acquired is determined by means of the Timing Advance (TA) timer of the TAG. The uplink transmission timing of a certain TAG is set through a random access process in a serving cell belonging to the TAG and maintained with the receipt of TA command. The UE starts or restart the TA timer of the corresponding TAG whenever the TA command for the corresponding TAG is received. If the TA timer expires, the UE determines that the uplink transmission synchronization of the corresponding TAG has broken and thus suspends uplink transmission until the next random access occurs.

At step 525, the UE 505 transmits a response message in reply to the control message based on the message received at step 520. The UE 505 establishes forward/downlink synchronization with the cell 2, i.e. serving cell 1, at step 530. The forward/downlink is of transmitting from the eNB to the UE, and the reverse/downlink is of transmitting from the UE to the eNB. In the present invention, the terms are used interchangeably. If the downlink synchronization is established in a certain cell, this means that the synchronization channel of the cell is acquired so as to check the downlink frame boundary.

The serving eNB 515 may send the UE 505 a command to activate the SCell 1 at a certain time when determined that the UE has completed the configuration of the SCell 1 at step 535. The SCell 1 activation command may be Activate/Deactivate MAC Control Element (A/D MAC CE) as a MAC layer control command. The control command is structured in the form of a bitmap of which the first bit corresponds to the SCell 1, the second bit to SCell 2, and the nth bit to SCell n. The bitmap may be the size of 1 byte. In this case, 7 indices, i.e. from 1 to 7, are used in such a way of mapping the second Least Significant Bit (LSB) to the SCell 1, the third LSB to SCell 2, and the last LSB or the Most Significant Bit (MSB) to SCell 7, without use of the first LSB.

The UE 505 starts monitoring the physical control channel (carrying Physical Downlink Control Channel (PDCCH) and uplink/downlink transmission resource allocation information) of the SCell after the elapse of a predetermined period from the receipt of the SCell 1 activation command at step 535. If the SCell has been acquired synchronization and belonged to a TAG already, the downlink/uplink transmission starts since then. That is, if the downlink transmission resource allocation information is received on the PDCCH, the UE receives downlink data but ignores the uplink transmission resource information although it has been received. If the SCell belongs to a non-synchronized TAG, the UE waits for the receipt of 'random access command' on PDCCH in a SCell belonging to the TAG. The random access command is a value of a predetermined field of the uplink transmission resource allocation information to instruct the UE 505 to transmit a preamble in a serving cell. The Carrier Indicator Field of the random access command may carry the identifier of the serving cell for preamble transmission. The UE receives a random access command instructing to transmit the random access preamble in the serving cell 1 at step 540. As shown in FIG. 5, the serving cell 1 may be indicated, in the CIF field, as the serving cell for transmitting the preamble.

The UE 505 monitors PDCCH of the PCell to receive Random Access Response (RAR) in reply to the preamble after transmitting the preamble through the SCell 1 at step 545. The RAR may include TA command and other control information. If the preamble is transmitted by the serving eNB 515, it is likely to be efficient to send the response in replay to the preamble through the PCell in various aspects. For example, since the RAR is received only through the PCell, it is possible to reduce the PDCCH monitoring load of the UE. Accordingly, the UE 505 monitors the PDCCH of the PCell to receiving RAR at step 550. If a valid response message is received in reply to the preamble, the UE 505 assumes that it is possible to transmit uplink signal transmission after the elapse of a predetermined period from that time point. For example, if the valid RAR is received at the subframe n, it is determined that the uplink transmission is possible from the subframe (n+m).

Figure 6:
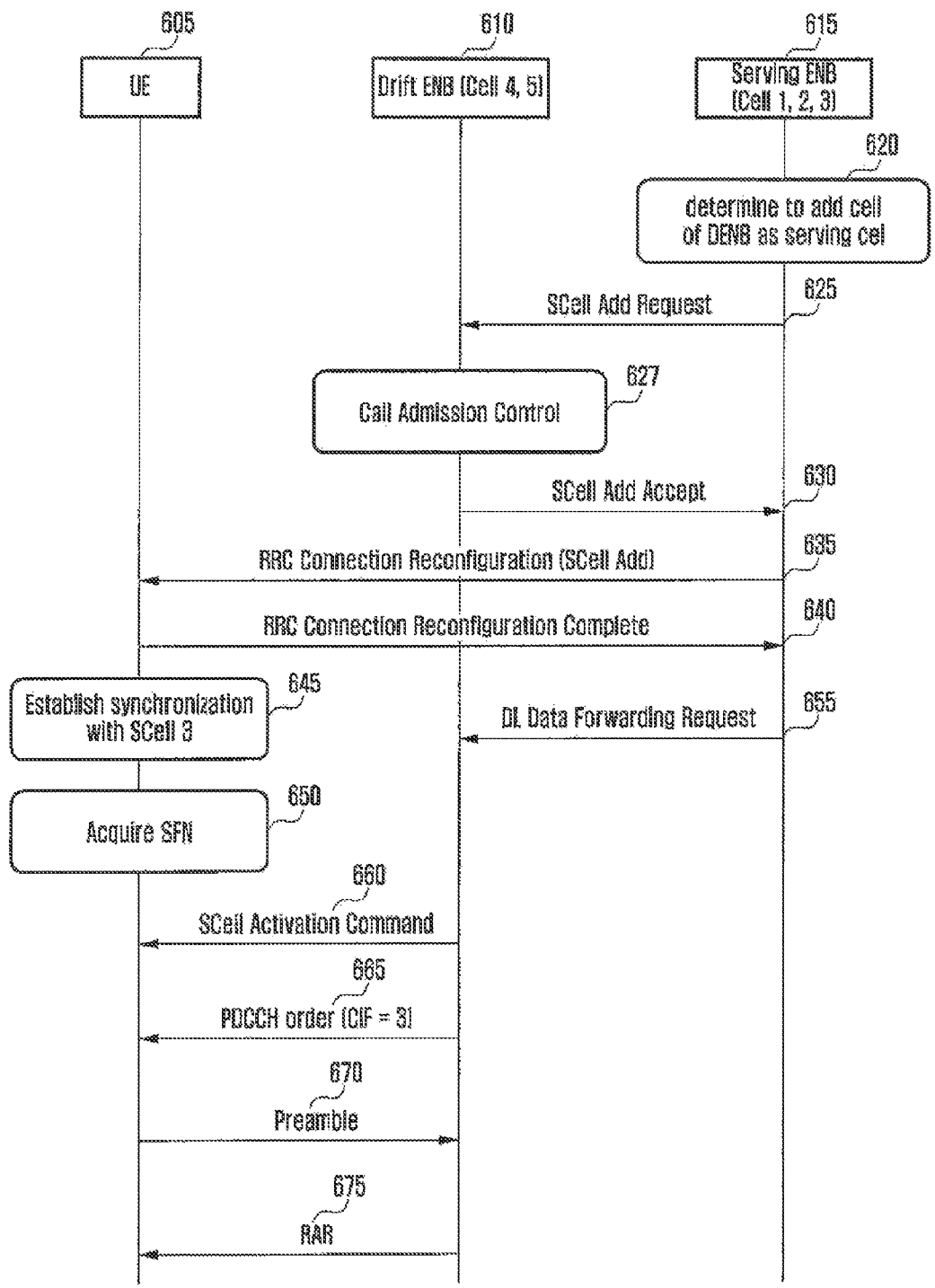
FIG. 6 is a signal flow diagram illustrating operations of UE and eNB for configuring a S Cell belonging to a non-primary set.

FIG. 6 is a signal flow diagram illustrating operations of UE and eNB for configuring a SCell belonging to a non-primary set.

At step 620, the serving eNB 615 determines to add a SCell to the UE 605 at a certain time point. Particularly if the UE is located in the area of a cell controlled by the second eNB 610, the serving eNB 615 determines to add the cell controlled by the second eNB 610 as a SCell and sends the second eNB 610 a control message at step 625. The control message may include the information indicating that the second eNB 610 is not identical with the first eNB 615. Here, the second eNB 610 which is not identical with the serving eNB 615 and controls the serving cell of the UE is referred to as drift eNB (DENB) 610. The control message may include the information as shown in table 2.

TABLE 2

| Name | Description |
|---|---|
| SCell id information | Information related to identifiers of SCells to be configured by the drift eNB. Formed with one or more sCellIndex-r10. Determined by the serving cell and |

TABLE 2-continued

| Name | Description |
| --- | --- |
| | notified to the drift eNB to prevent the identifier in use by the serving eNB from being reused. The ranges of SCell id used by the serving eNB and the drift eNB may be defined separately. For example, SCell ids 1~3 may be defined in advance for use in serving eNB while SCell ids 4~7 for use in drift eNB. |
| TAG id information | Information related to identifier of TAG to be configured by the drift eNB. Defined by the serving eNB and notified to the drift eNB to prevent the identifier in used by the serving eNB from being reused. |
| UL scheduling information | Include priority informations of logical channels and logical channel group information configured to the UE. The drift information interprets the UE buffer state report information and performs uplink scheduling using this information. |
| Inform on bearer to be offloaded | It is preferred that the drift eNB processes the service requiring large amount data transmission/reception, e.g. FTP download. The serving eNB determines the bearer to be offload to the eNB among the bearers configured to the UE and sends the drift eNB the information on the bearer to be offloaded, e.g. DRB identifier, PDCP configuration information, RLC configuration information, required QoS information. |
| Call accept control information | The serving eNB provides the drift eNB with reference information for use in determining whether to accept SCell add request. For example, this information may include required data rate, expected uplink data amount, and expected downlink data amount. |

If a SCell add request control message is received at step 625, the drift eNB 610 determines whether to accept the request in consideration of the current load status at step 627. If it is determined to accept the SCell add request, the drift eNB 610 sends the serving eNB 615 a SCell add accept message at step 630. At this time, the drift eNB 610 generates a control message including the information as shown in table 3 and transmits the control message to the serving eNB 615.

TABLE 3

| Name | Description |
| --- | --- |
| SCellToAddMod | Information related to SCells configured by the drift eNB as follows. sCellIndex-r10, cellIdentification-r10, radioResourceConfigCommonSCell-r10, radioResourceConfigDedicatedSCell-r10, TAG-related information |
| PUCCH information for PUCCH SCell | At least one of SCells belonging to the non-primary set is configured with Physical Uplink Control Channel (PUCCH). Uplink control information such as HARQ feedback, Channel Status Information (CSI), Sounding Reference Signal (SRS), and Scheduling Request (SR) may be transmitted. Hereinafter, the SCell in which PUCCH is transmitted is referred to as PUCCH SCell. The PUCCH SCell identifier and PUCCH configuration information are the sub-informations of this information. |
| Information for data forwarding | Logical channel (or logical tunnel) for use in data exchange between the serving eNB and drift eNB. May include GPRS Tunnel Protocol (GTP) tunnel identifier for downlink data exchange and GTP tunnel identifier for uplink data exchange. |
| UE identifier | C-RNTI for use by UE in SCells of non-primary set. Hereinafter, referred to as C-RNTI_NP |
| Bearer configuration information | Configuration information on the bearer to be offloaded. May include list of bearers accepted to be offloaded and per-bearer configuration information. If the bearer configurations are identical, it is possible to include only the list of bearers accepted. |

If the control message is received at step 630, the serving eNB 615 generates an RRC control message instructing the UE 605 to add a serving cell at step 635. The RRC control message may include the information as shown in table 4.

TABLE 4

| Name | Description |
| --- | --- |
| SCellAddMod | This may include the information transmitted from the drift eNB to the serving eNB as it was. That is, this is identical with SCellAddMod in table 3. The SCellAddMod is included per SCell and is sub-information of SCellAddModList. |
| PUCCH information for PUCCH SCell | This may include the information transmitted from the drift eNB to the serving eNB as it was. That is, this is identical with PUCCH information for PUCCH SCell in table 3. |
| Non-primary SCell List | This is the information on the SCells belonging to the non-primary set among the SCells to be configured. This may be the identifiers of the SCells or the TAGs belonging to the non-primary set. |
| UE identifier | This is C-RNTI for use by the UE in the serving cell of the non-primary set. |
| Offload bearer information | This is the information on the bearers to be processed by the drift eNB. This is the information on the bearers to be transmitted/received through the serving cells of the non-primary set in view of the UE and, if the bearer lists and bearer configurations are different, may include bearer configuration information. |

The RRC control message of step 635 may include the configuration information of a plurality of SCells. The serving cells of the primary and non-primary sets may be configured together. For example, if the second to fifth cells are configured to the UE having the first cell as the PCell, the informations thereon may be arranged in the RRC control message in various orders.

Figure 7:
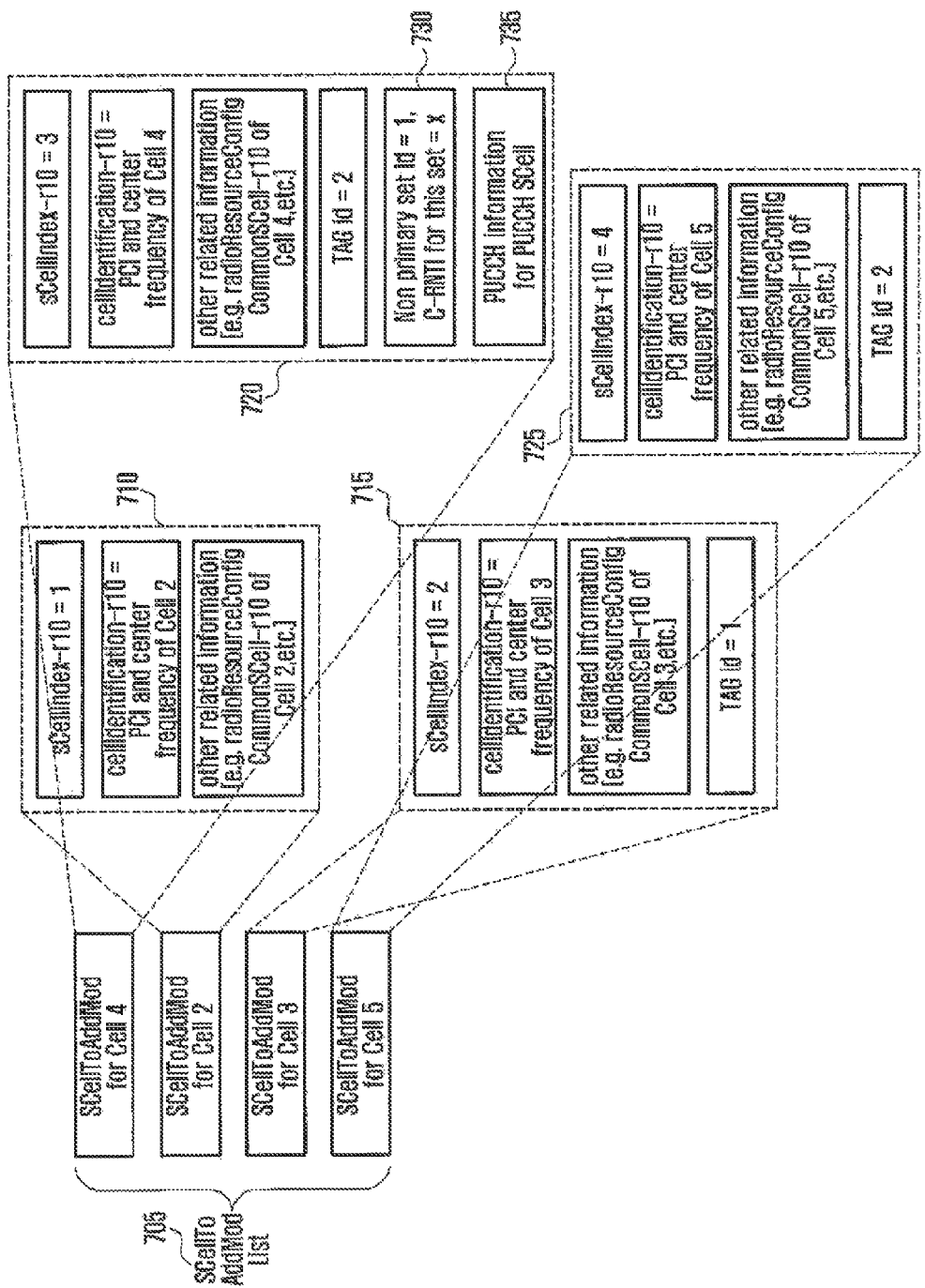
FIG. 7 is a diagram illustrating an exemplary RRC control message included in the SCell configuration information according to an embodiment of the present invention.

FIG. 7 is a diagram illustrating an exemplary RRC control message included in the SCell configuration information according to an embodiment of the present invention.

Referring to FIG. 7, the Cell 1 and Cell 2 have the same uplink transmission timing to form the P-TAG, the Cell 3 forms the S-TAG 1, and the Cell 4 and Cell 5 form the S-TAG 2.

The RRC control message contains SCellToAddModList 705 including SCellToAddMod 710 for Cell 2, SCellToAddMod 715 for Cell 3, SCellToAddMod 720 for Cell 4, and SCellToAddMod 725 for Cell 5.

The SCellToAddMod 710, 715, 720, and 725 may include specific information or not depending on the characteristic of the corresponding SCell.

If the SCell belongs to the P-TAG, i.e. if the SCell has the same uplink transmission timing as the PCell, the corresponding SCellToAddMod does not include the information related to the TAG. For example, the SCellToAddMod for the Cell 2 does not include the information about TAG. The SCellToAddMod 715, 720 and 725 for the SCells of the rest non-P-TAGs may include the TAG identifiers and TA timer values of the TAGs to which the corresponding SCells belong.

The information on at least one of the cells belonging to the non-primary set may include the non-primary set information 730, e.g. non-primary set identifier and C-RNTI for use by the UE in the non-primary set. In the example of FIG. 7, the SCellToAddMod 720 for the fourth cell includes the non-primary set information 730. Accordingly, whether the corresponding cell belongs to the non-primary set can be determined based on the non-primary set information 730. The information on one of the cells belonging to the non-primary set includes PUCCH configuration information 735. In the example of FIG. 7, the SCellToAddMod 720 for the fourth cell includes the PUCCH configuration information 735.

To the SCell which belongs to the non-primary set but has no non-primary set information, the non-primary set information of the SCell having the same TAG id is applied. In the exemplary case of FIG. 7, although the information on the fifth cell includes no non-primary set information, the UE can check that the fifth cell belongs to the non-primary set based on the non-primary set information of the fourth cell having the same TAG id. The UE can use the non-primary set identifier and C-RNTI of the fourth cell for identifying the fifth cell.

Figure 8:
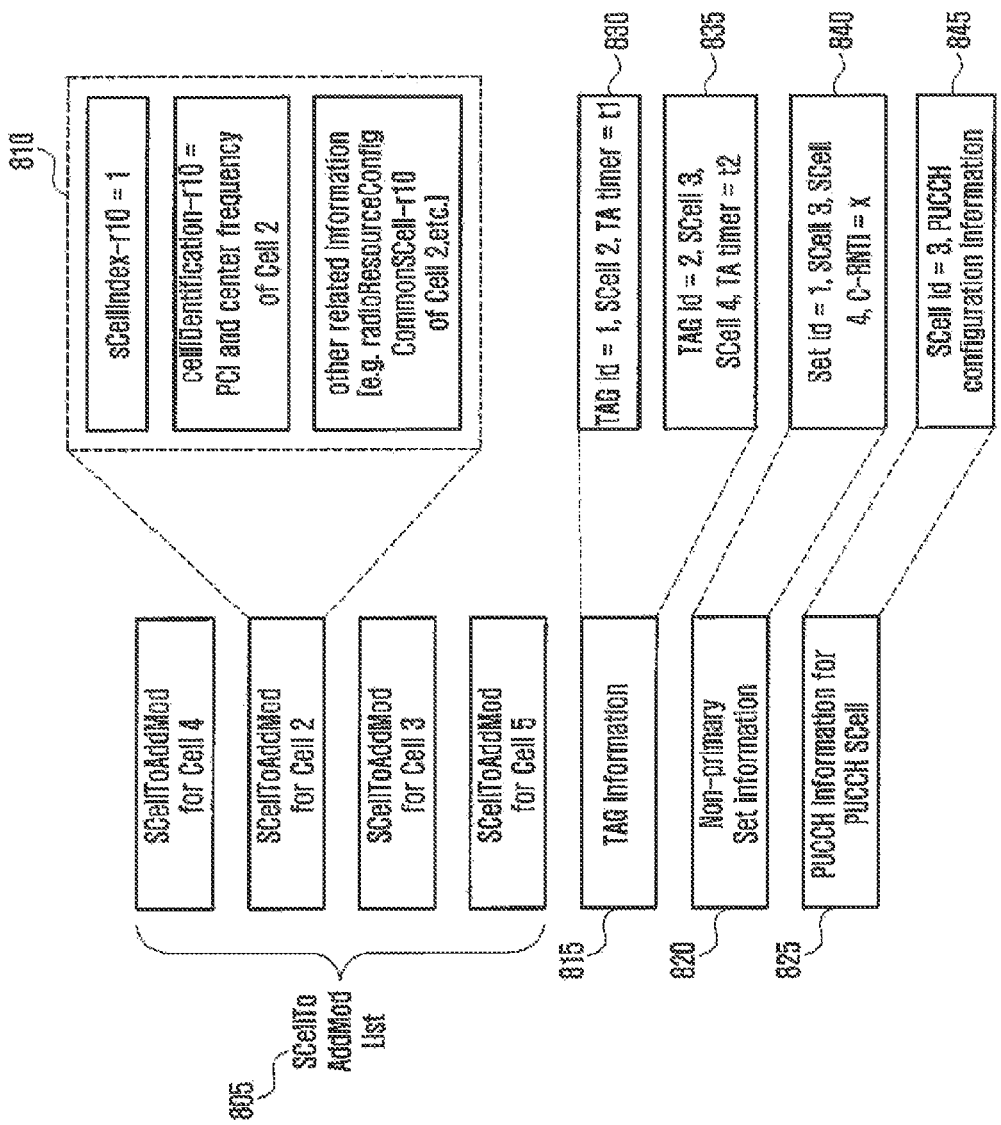
FIG. 8 is a diagram illustrating a structure of the RRC control message including S Cell configuration information according to another embodiment of the present invention.

FIG. 8 is a diagram illustrating a structure of the RRC control message including SCell configuration information according to another embodiment of the present invention.

Referring to FIG. 8, the TAG information and non-primary set information may be included at a position not in the SCellToAddMod.

The RRC control message may include SCellToAddModList 805. The SCellToAddModList may include SCellToAddMod 810 for the second cell, SCellToAddMod for the third cell, SCellToAddMod for the fourth cell, and SCellToAddMod for the fifth cell. FIG. 8 shows only the SCellToAddMod 810 for the second cell for explanation convenience. The SCellToAddMod 810 may include the same types of informations. That is, every SCellToAddMod may include the information such as sCellIndex-r10, cellIdentification-r10, and radioResourceConfigCommonSCell-r10.

The TAG information 815, the non-primary set information 820, and the PUCCH configuration information of PUCCH SCell 825 may be included separately.

The TAG information 815 may include the TAG identifiers, identifiers of the SCells forming the TAG, and TA timer value. As shown in FIG. 8, the TAG information 815 may include the information 830 notifying that the TAG having the TAG identifier 1 includes the SCell 2 and that the TA timer is set to the value t1. The TAG information 815 also may include the information 835 notifying that the TAG having the TAG identifier 2 includes the SCell 3 and SCell 4 and that the TA timer is set to the value t2.

The non-primary set information 820 may include the per-non-primary set identifiers, identifiers of the serving cells included in the set, and C-RNTI for use in the corresponding set. For example, the information 840 indicating that the non-primary set having the set identifier 1 includes the SCell 3 and SCell 4 and uses the C-RNTI x. The primary set information is determined according to the following rule without explicit signaling.

<Primary Set Information Determination Rule>

The serving cells belonging to the primary set include the PCell and the SCells not belonging to any non-primary set.

The C-RNTI to be use in the primary set may be the C-RNTI in use by the current PCell. The non-primary set information 820 may include the TAG identifier other than the SCell identifier. This is possible under the assumption that the set and TAG are formed such that one TAG is not formed across multiple sets. For example, the non-primary set configuration information 820 may include the information indicating the TAG id 2 instead of the information indicating the SCell 3 and SCell 4 in order for the UE to determine that the SCell 3 and SCell 4 having the TAG id 2 belong to the non-primary set.

The PUCCH SCell's PUCCH configuration information 825 may be made up of non-primary set identifier, PUCCH SCell identifier, and PUCCH configuration information. Each non-primary set has one PUCCH SCell. The CSI information for the serving cells belonging to the non-primary set and HARQ feedback information may be transmitted on the PUCCH configured to the PUCCH SCell.

Depending on the embodiment, the PUCCH SCell can be determined according to a predetermined rule without signaling PUCCH SCell identifier explicitly in the PUCCH SCell's PUCCH configuration information 825. For example, the SCell corresponding to the first SCellToAddMod of the SCellToAddModList 805 may be assumed as the PUCCH SCell. In the embodiment of FIG. 8, the SCell corresponding to the first SCellToAddMod of the SCellToAddModList 805 may be determined as the PUCCH SCell. Also, the SCell having the highest or lowest SCell identifier among the SCells of which information includes the SCellToAddMod information in the corresponding RRC control message may be determined as the PUCCH SCell. Such an implicit determination method can be used under the assumption that only one non-primary set exists.

Returning to FIG. 6, the UE 650 sends the serving eNB 615 a response message at step 640 and establishes downlink synchronization with the newly configured SCells at step 645. The UE 650 acquires System Frame Number (SFN) of the PUCCH SCell among the newly configured SCells at step 650. The SFN is acquired in the process of receiving the system information, i.e. Master Information Block (MIB). The SFN is an integer incrementing by 1 at every 10 ms in the range of 0 to 1023. The UE 605 checks the PUCCH transmission timing of the PUCCH SCell based on the SFN and PUCCH configuration information.

Afterward, the UE waits until the SCells are activated. If downlink data or a predetermined control message instructing to activate SCell is received from the serving eNB 615 at step 655, the drift eNB 610 starts a procedure of activating the SCells.

The drift eNB 610 sends the UE 605 the A/D MAC CE instructing to activate the SCell, e.g. SCell 3, at step 660 and, if the MAC CE is received at the subframe n, the UE 605 activates the SCell at subframe (n+m1). However, since the uplink synchronization of the PUCCH SCell is not acquired yet at the subframe (n+m1), both the downlink and uplink transmission/reception are not possible although the SCell has been activated. That is, the UE 605 monitors PDCCH of the SCell but ignores the downlink/uplink resource allocation signal although it is received.

The drift eNB 610 sends the UE 605 a random access command to establish uplink synchronization with the PUCCH SCell at step 665. The random access command includes Carrier Indicator Field (CIF) carrying the identifier of the serving cell for preamble transmission.

The UE 605 initiates random access procedure in the PUCCH SCell using a dedicated preamble indicated in the random access command. That is, the UE 605 sends a preamble through the SCell at step 670 and monitors PDCCH to receive RAR in response thereto. If the UE transmits the preamble in the primary set, the RAR is transmitted through the PCell. Otherwise if the preamble is transmitted in the non-primary set, the UE monitors PDCCH of the SCell in which the preamble has been transmitted or the PUCCH SCell to receive RAR. This is because there is a need of extra information exchange between the drift eNB 610 and the serving eNB 615 to process the RAR in the PCell. The RAR may be received with the C-RNTI to be used by the UE 605 in the non-primary set. It is more efficient to transmit the response message with the C-RNTI because the UE 605 also has been allocated the C-RNTI and there is no probability of malfunctioning caused by collision due to the use of the dedicated preamble (i.e. since the eNB knows the UE to which the RAR has to be transmitted based on the dedicated preamble). If the valid response message is received through the SCell in which the preamble has been transmitted or the PUCCH SCell, the UE 605 adjusts the uplink transmission timing of the PUCCH SCell and the TAG to which the PUCCH SCell based on the TA command of the response message and activates uplink at a predetermined time point. If the valid TA command or the valid random access response message is received at the subframe n, the predetermined timing becomes the subframe (n+m2). Here, m2 is a predetermined integer.

Figure 9:
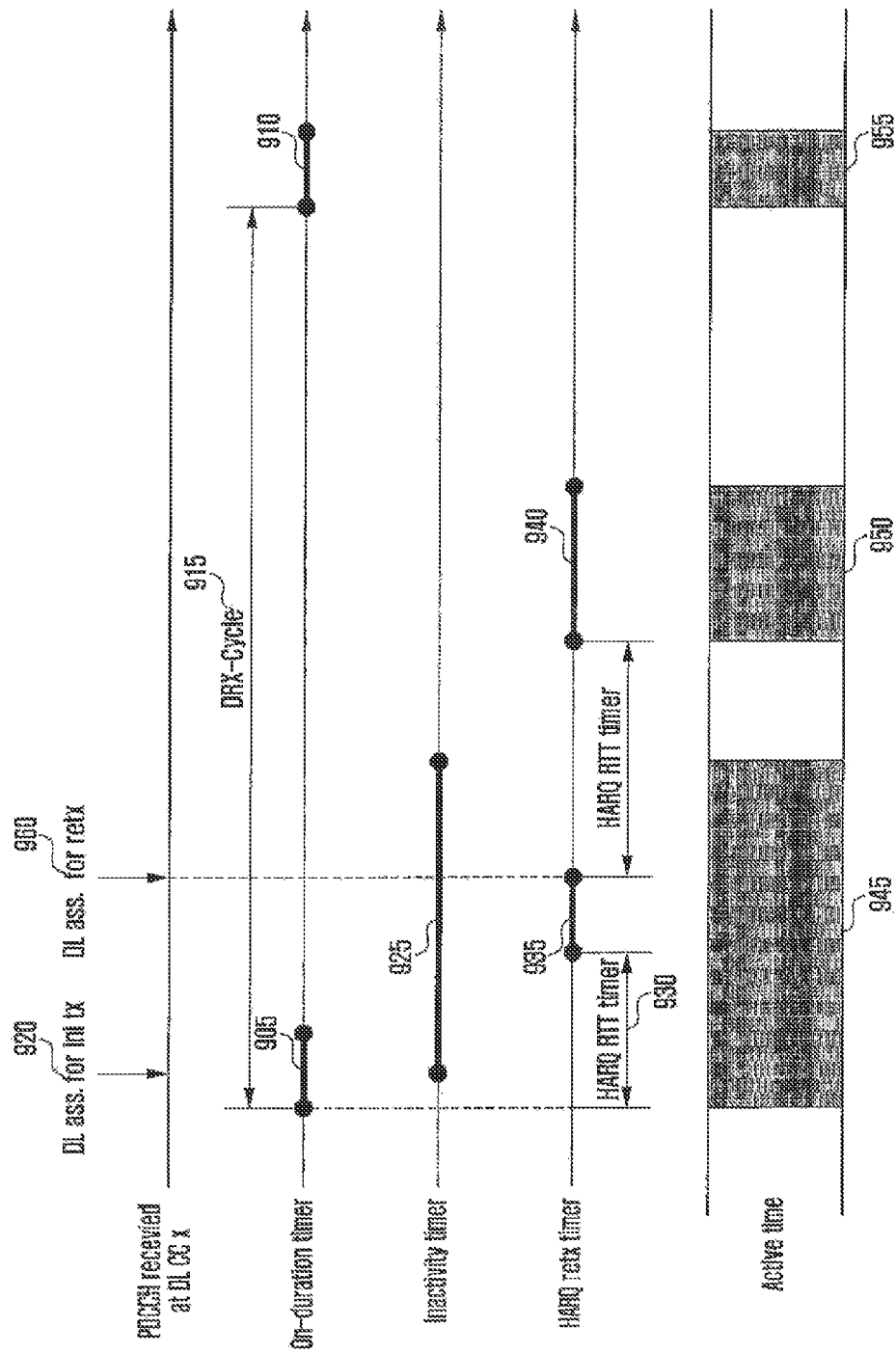
FIG. 9 is a diagram illustrating DRX operation according to an embodiment of the present invention.

FIG. 9 is a diagram illustrating DRX operation according to an embodiment of the present invention.

In the case that the inter-eNB carrier aggregation is configured, it is advantageous to activate the DRX operation to reduce battery consumption of the UE. The DRX is a technique for minimizing power consumption of the UE by waking up its receiver periodically to monitor to check presence of scheduling information. If the UE turns on its receiver to check presence of scheduling, this means that the UE is in the active time to monitor PDCCH. The PDCCH is used to transmit downlink scheduling command (for allocating downlink transmission resource and delivering other control information necessary for downlink data reception) or uplink scheduling command (for allocating uplink transmission resource and delivering other control information necessary for uplink data transmission). The downlink scheduling command is referred to as downlink assignment, and the uplink scheduling command is referred to as uplink grant. In the following description, if the UE receives the downlink scheduling command (or the uplink scheduling command), this is expressed in such a way that the UE receives downlink assignment (or uplink grant) or PDCCH.

The downlink or uplink scheduling command is classified into two different types of HARQ initial transmission and HARQ retransmission and, in the following description, the downlink or uplink scheduling command for HARQ initial transmission is referred as initial downlink or uplink scheduling command, and the downlink or uplink scheduling command for HARQ retransmission as retransmission downlink or uplink scheduling command.

The DRX operates in such a way that the UE transitions to the active time at a certain time to monitor PDCCH and then to the non-active time at a certain time to step monitoring PDCCH with the turn-off of the receiver. The UE is provided with timers such as onDurationTimer, drx-InactivityTimer, and drx-RetransmissionTimer, and operates, if at least one of the timers is running, in the active time 945, 950, and 955. The onDurationTimer starts in every DRX cycle 915 as denoted by reference numbers 905 and 910. If a downlink scheduling command indicating initial transmission is received while the onDurationTimer is running as denoted by reference number 920, the drx-inactivitytimer starts as denoted by reference number 925. At this time, although a downlink scheduling command indicating retransmission is received as denoted by reference number 960, the drx-InactivityTimer does not restart. The downlink data reception and uplink data transmission are performed according to the HARQ scheme and thus, if there is any data error, it is necessary to receive a scheduling command for HARQ retransmission. In order to achieve this, the drx-RetransmissionTimer is defined so whenever receiving downlink data as to be turned on after a predetermined period (HARQ RRT timer 930) starting at the time when downlink data is received as denoted by reference number 935 and stopped upon receipt of the scheduling command indicating retransmission as denoted by reference number 935 and 940.

As described above, the active time is determined depending on which of the onDurationTimer, drx-InactivityTimer, and drx-RetransmissionTimer (hereinafter, referred to as active time timers), and the start/restart of the timer is determined according to the scheduling information. In the case that the carrier aggregation is applied, i.e. multiple serving cells are configured to the UE, the UE receives the scheduling command from the multiple serving cells. If no non-primary set serving cell is configured, the UE starts/restarts or stops the timers independently of the cell in which the scheduling command is received. This is because, although the scheduling command may occur in several serving cells, the schedulers generating the scheduling commands are under the control of the one eNB and thus share the scheduling states thereof If any non-primary set serving cell is configured, two or more eNBs perform scheduling independently. Therefore, the drift eNB may not know the scheduling state of the serving eNB, and the serving eNB also may not know the scheduling state of the drift eNB. Accordingly, an eNB cannot check whether its active timers are influenced by the scheduling of other eNB and, as a consequence and this may cause a problem in that the UE cannot know whether it is in the active time currently.

In the present invention, the UE configured with multiple cells performs DRX operation distinctly depending on whether the carrier aggregation is intra-eNB carrier aggregation or inter-carrier aggregation.

In more detail, the UE manages one active time for all the serving cells in the intra-eNB carrier aggregation mode and two active times independently for the primary set and the non-primary set in the inter-eNB carrier aggregation. That is, the UE differentiates the active time to be applied of the primary set and the active time to be applied to the non-primary set by set. The onDurationTimer, drx-InactivityTimer, and drx-RetransmissionTimer are configured and start/restart/expiry by set. The eNB determines the start/restart/expiry of the timers, whether the eNB is in the active time, or whether the UE is monitoring the PDCCH of the corresponding cell, in consideration of scheduling states of the serving cells under its control.

Figure 10:
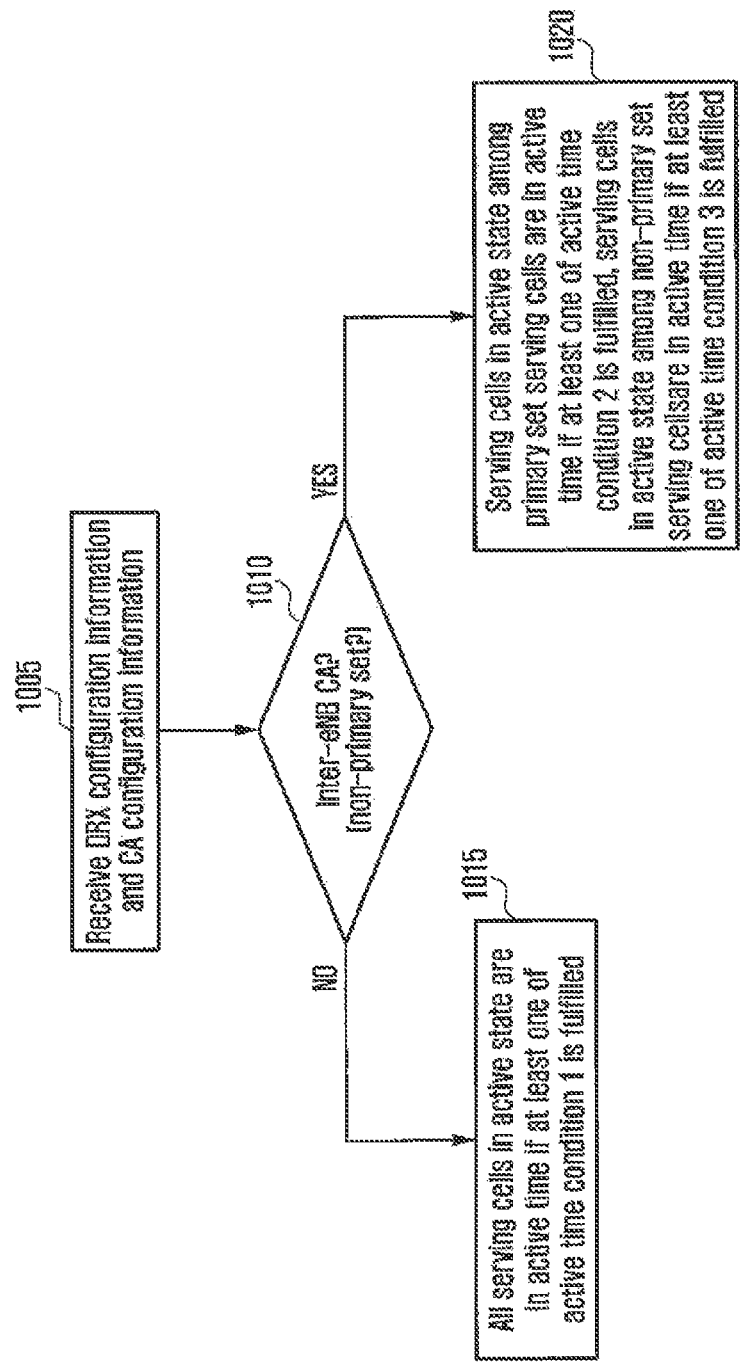
FIG. 10 is a flowchart illustrating the UE operation of performing DRX independently in the primary and non-primary sets serving cells in the inter-eNB carrier aggregation mode according to an embodiment of the present invention.

FIG. 10 is a flowchart illustrating the UE operation of performing DRX independently in the primary and non-primary sets serving cells in the inter-eNB carrier aggregation mode according to an embodiment of the present invention.

The UE acquires DRX configuration information and CA configuration information at step 1005. These configuration informations may be received through a control message such as RRC Connection Reconfiguration at a time or at respective times.

The DRX configuration information may include onDurationTimer, drx-InactivityTimer, Drx-RetransmissionTimer, DRX-Cycle, and drxStartOffset.

There may be one or two sets of the above parameters.

The UE determines whether the current CA is the inter-eNB CA or intra-eNB CA at step 1010. If the current CA is the intra-eNB CA, the procedure goes to step 1015 and, otherwise if the current CA is the inter-eNB CA, step 1020. For example, if any non-primary set serving cell exists among the currently configured serving cess, the current CA is the inter-eNB CA and, otherwise no non-primary set serving cell exists, the current CA is the intra-eNB CA.

If the current CA is the intra-eNB CA, the UE determines whether at least one of [active time condition 1] is fulfilled and, if so, monitors PDCCHs of the serving cells in the active state at step 1015.

[Active Time Condition 1]

At least one of onDurationTimer, drx-InactivityTimer, Drx-RetransmissionTimer, and mac-ContentionResolutionTimer is running; or As to be described with reference to FIG. 18 later, Scheduling Request signal has been transmitted through PUCCH of PCell and it is currently in pending state; or As to be described with reference to FIG. 12 later, it's the time period during which uplink scheduling command for a pending HARQ retransmission may occurs and data is buffered in the corresponding HARQ buffer; or As to be described with reference to FIG. 13, although a valid random access response is received in response to the dedicated preamble, any PDCCH indicating new transmission addressed to the C-RNTI of the UE is not received yet.

The onDurationTimer starts at the subframe in which the SFN and frame number of the PCell fulfills equation (1).

$$[(SFN*10)+\text{subframe number}]\text{modulo}(DRX\text{-}Cycle)=(drxStartOffset)\text{modulo}(DRX\text{-}Cycle) \quad (1)$$

The drx-InactivityTimer starts/restarts when an uplink grant or downlink assignment instructing new transmission in the serving cell in the active state currently.

The drx-RetransmissionTimer starts when the HARQ RTT timer of the serving cell which is in the active state currently expires.

The mac-ContentionResolutionTimer is the timer for use in determining whether the contention resolution is successfully in the random access and, if the contention resolution is not completed before the expiry of this timer, the UE retransmits the preamble.

If the current CA is the inter-eNB CA, the UE determines whether at least one of [active time condition 2] is fulfilled and, if so, monitors the PDCCHs of the primary set serving cells in the active state currently at step 1020.

[Active Time Condition 2]

At least one of onDurationTimer_P, drx-InactivityTimer_P, Drx-RetransmissionTimer_P, and mac-ContentionResolutionTimer_P is running; or As to be described with reference to FIG. 18 later, Scheduling Request signal is transmitted through PUCCH of PCell and it is in pending state; or As to be described with reference to FIG. 12 later, it's the time period during which uplink scheduling command for pending HARQ retransmission may occur and data is buffered in the corresponding HARQ buffer; or, As to be described with reference to FIG. 13, although a valid random access response is received in response to the dedicated preamble of the PCell, any PDCCH indicating new transmission addressed to the C-RNTI Primary of the UE is not received yet.

onDurationTimer_P, drx-InactivityTimer_P, Drx-RetransmissionTimer_P, DRX-Cycle-P, drxStartOffset_P are the parameters defined for use in the primary set. The onDurationTimer_P, drx-InactivityTimer_P, Drx-RetransmissionTimer_P, DRX-Cycle-P, and drxStartOffset_P are transmitted through a dedicated RRC message such as RRC Connection Reconfiguration message, and the mac-ContentionResolutionTimer_P may be transmitted through the system information of the PCell. The C-RNTI_P is the C-RNTI which the UE configured with non-primary set serving cells uses in the primary set serving cell.

The onDurationTimer_P starts at the subframe in which the SFN and frame number of a predetermined serving cell, e.g. PCell, fulfills equation (2).

$$[(SFN*10)+\text{subframe number}]\text{modulo}(DRX\text{-}Cycle\_P)=(drxStartOffset\_P)\text{modulo}(DRX\text{-}Cycle\_P) \quad (2)$$

The drx-InactivityTimer_P starts/restarts when an uplink grant or downlink assignment indicating new transmission is received in the primary set serving cell which is in the active state currently.

The drx-RetransmissionTimer_P starts when the HARQ RTT timer of the primary set serving cell in the active state currently expires.

The mac-ContentionResolutionTimer_P is the timer for use in determining whether the contention resolution is completed in the random access procedure of the PCell and, if the contention resolution is not completed before the expiry of the timer, the UE retransmits the preamble in the PCell.

If the current CA is the inter-eNB CA, the UE determines whether at least one of [active time condition 3] is fulfilled and, if so, monitors the PDCCHs of the non-primary set serving cells in the active state currently.

[Active Time Condition 3]

At least on of onDurationTimer_NP, drx-InactivityTimer_NP, Drx-RetransmissionTimer_NP, and mac-ContentionResolutionTimer_NP is running; or As to be described with reference to FIG. 18 later, Scheduling Request signal is transmitted through PUCCH of an SCell and it is in pending state; or As to be described with reference to FIG. 12 later, it's the time period during which uplink scheduling command for pending HARQ retransmission may occur and data is buffered in the corresponding HARQ buffer; or As to be described with reference to FIG. 13, although a valid random access response is received in response to the dedicated preamble transmitted in the non-primary set SCell, any PDCCH indicating new transmission addressed to the C-RNTI_NP of the UE is not received yet.

onDurationTimer_NP, drx-InactivityTimer_NP, Drx-RetransmissionTimer_NP, DRX-Cycle-NP, drxStartOffset_NP are the parameters defined for use in the non-primary set. If these parameters are not signaled, the UE sets them to the same values as onDurationTimer_P, drx-InactivityTimer_P, Drx-RetransmissionTimer_P, DRX-Cycle-P, and drxStartOffset_P. The onDurationTimer_NP, drx-InactivityTimer_NP, Drx-RetransmissionTimer_NP, and DRX-Cycle-NP, drxStartOffset_NP may be transmitted through a dedicated RRC message such as RRC Connection Reconfiguration. At this time, the RRC control message may be another control message, e.g. the control message for configuring puch SCell, which is different from the control message carrying the onDurationTimer_P, drx-InactiyityTimer_P, and Drx-RetransmissionTimer_P. The mac-ContentionResolutionTimer_NP may be signalled through a dedicated RRC control message for configuring the PUCCH SCell.

The onDurationTimer_NP starts at the subframe in which the SFN and frame number of a predetermined serving cell, e.g. PUCCH SCell, fulfills equation (3).

$$[(SFN*10)+\text{subframe number}]\text{modulo}(DRX\text{-}Cycle\_NP)=(drxStartOffset\_NP)\text{modulo}(DRX\text{-}Cycle\_NP) \quad (3)$$

The drx-InactivityTimer_NP starts/restarts when an uplink grant or downlink assignment indicating new transmission is received in a non-primary set serving cell which is in the active state currently.

The drx-RetransmissionTimer_NP starts when the HARQ RTT timer of the non-primary set serving cell in the active state currently expires.

The mac-ContentionResolutionTimer_NP is the timer for use in determining whether the contention resolution is completed in the random access procedure of a non-primary set serving cell, e.g. PUCCH SCell, and, if the contention resolution is not completed before the expiry of the timer, the UE retransmits the preamble in a predetermined non-primary set serving cell, e.g. PUCCH SCell.

Figure 11:
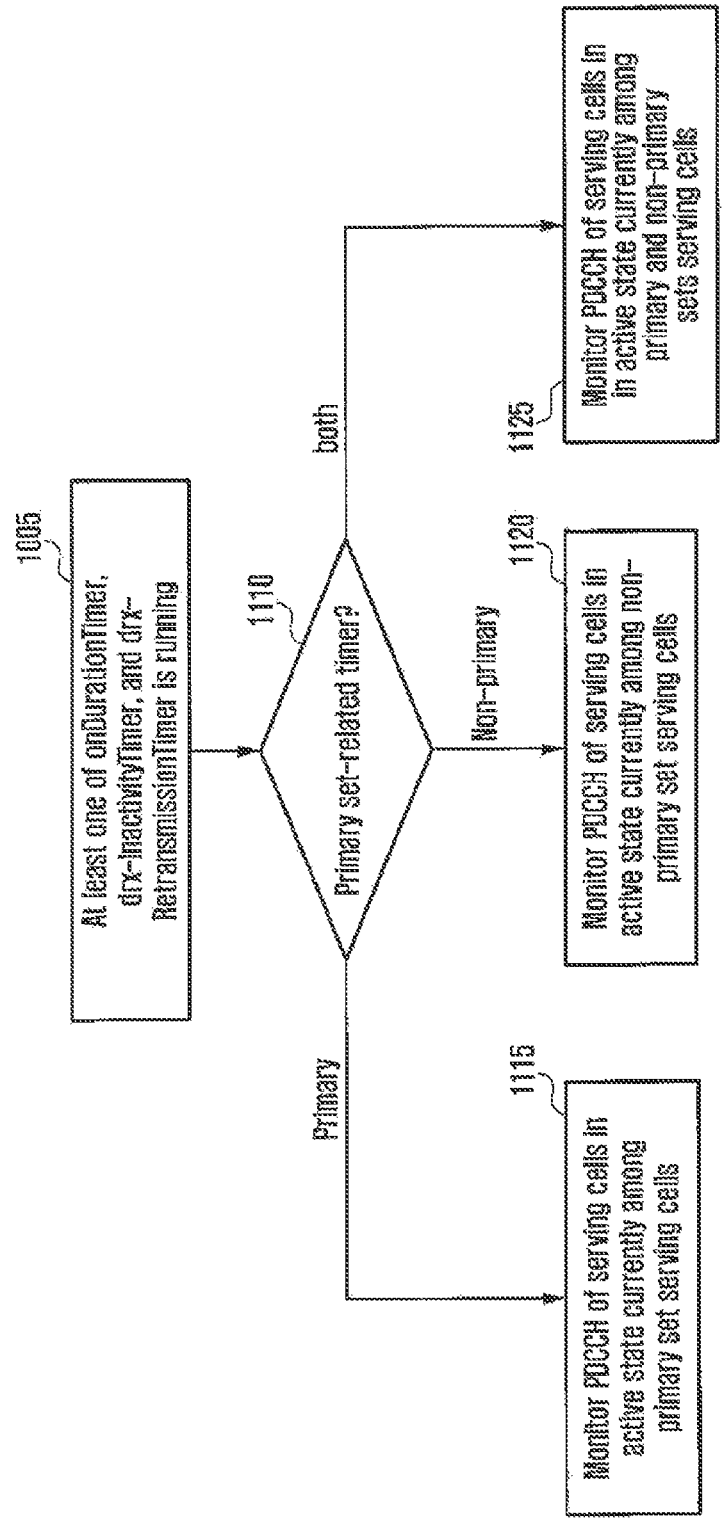
FIG. 11 is a flowchart illustrating the UE operation of selecting a serving cell for monitoring PDCCH while an active time-related parameter is running according to an embodiment of the present invention.

FIG. 11 is a flowchart illustrating the UE operation of selecting a serving cell for monitoring PDCCH while an active time-related parameter is running according to an embodiment of the present invention.

Referring to FIG. 11, the UE determines whether at least one of the onDurationTimer, drx-InactivityTimer, and drx-RetransmissionTimer is running at every subframe or a predetermined time before the start of every subframe at step 1105. If at least one of the onDurationTimer, drx-InactivityTimer, and drx-RetransmissionTimer is running, the procedure goes to step 1110.

At step 1110, the UE determines whether the currently running active time timer is a primary set-related timer or a non-primary set-related timer.

The primary set onDurationTimer is the onDurationTimer of which start and end are determined based on the SFN of the PCell and the DRX Cycle signaled in the PCell. The onDurationTimer related to a certain non-primary set is the onDurationTimer of which start and end are determined by the SFN of the PUCCH SCell of the non-primary set and the DRX cycle signaled in the non-primary set.

The primary set drx-inactivityTimer is the drx-inactivity-Timer of which start and end are controlled based on the uplink assignment or uplink grant indicating initial transmission in the primary set serving cell. The non-primary set drx-inactivityTimer is the drx-inactivityTimer of which start and end are controlled based on the downlink assignment or uplink grant indicating initial transmission in the non-primary set serving cell.

The primary set drx-retransmissionTimer is the drx-retransmissionTimer related to the HARQ process configured to the primary set serving cell. The non-primary set drx-retransmissionTimer is the drx-retransmissionTimer related to the HARQ process configured to the non-primary set serving cell.

If only the primary set active time timer is running, the procedure goes to step 1115. If only the non-primary set active time timer is running, the procedure goes to step 1120. If both the primary set active time timer and non-primary set active time timer are running, the procedure goes to step 1125.

If only the primary set active time timer is running, the UE monitors the PDCCH of the cell in the active state currently among the primary set serving cells in the corresponding subframe at step 1115.

If only the non-primary set active time timer is running, the UE monitors the PDCCH of the cell in the active state currently among the non-primary set serving cells in the corresponding subframe.

If both the primary set active time timer and non-primary set active time timer are running, the UE monitors the PDCCHs of the cell in the active state currently among the primary and non-primary sets serving cells in the corresponding subframe.

Figure 12:
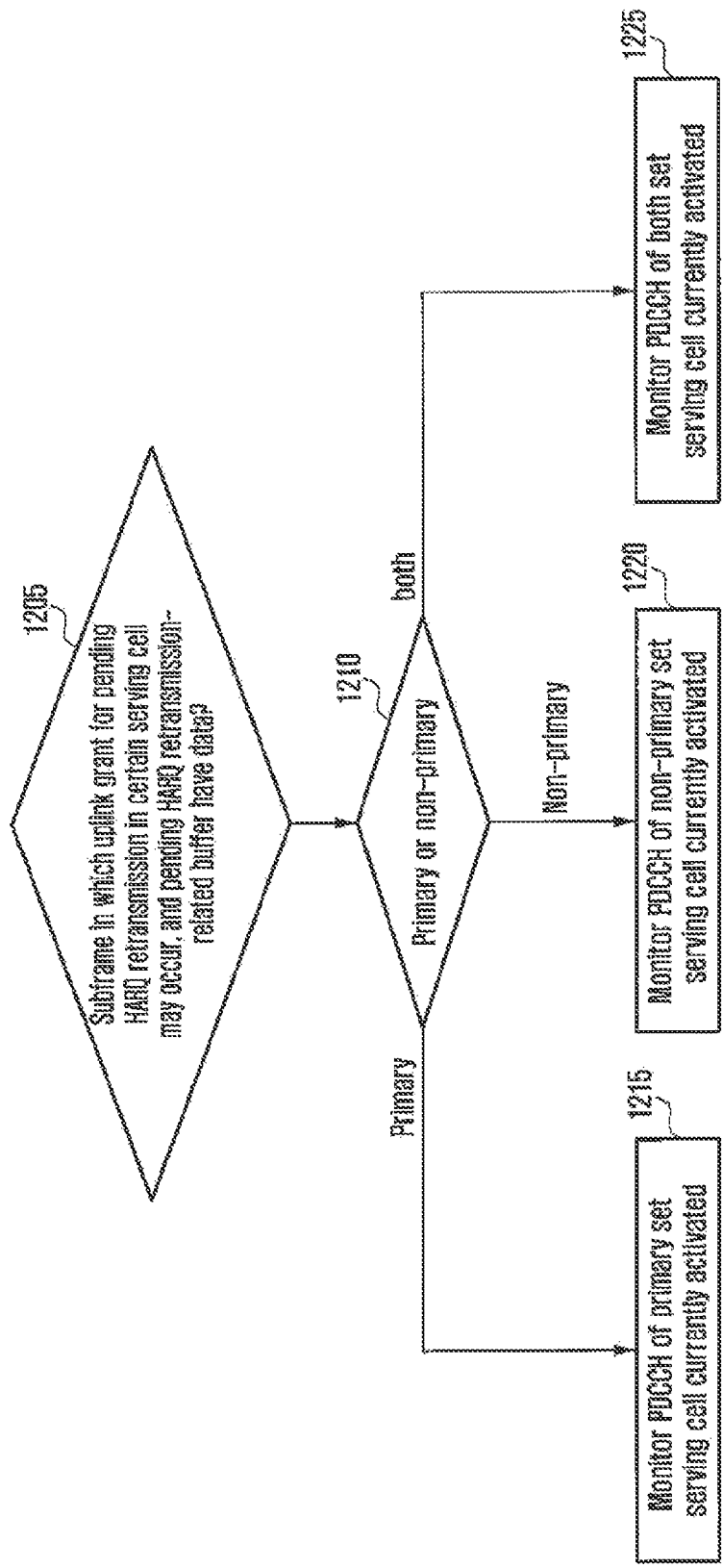
FIG. 12 is a flowchart illustrating the UE operation of monitoring PDCCH in association with the pending HARQ retransmission according to an embodiment of the present invention.

FIG. 12 is a flowchart illustrating the UE operation of monitoring PDCCH in association with the pending HARQ retransmission according to an embodiment of the present invention.

Referring to FIG. 12, the UE determines whether the following <condition> is fulfilled at every subframe or a predetermined time before the start of every subframe in at least one serving cell. If the <condition> is fulfilled, the procedure goes to step 1210.

<Condition>

The uplink transmission is not completed yet, there is HARQ buffer having any data to be transmitted, and the corresponding subframe is the subframe capable of carrying retransmission command to the HARQ operation (when the uplink transmission resource is allocated in a certain subframe, the uplink retransmission command to the HARQ process may be carried in the subframe (n+m*8).

If there is any data to be transmitted in a certain HARQ process, this means that the CURRENT_TX_NB does not reach the maximum transmission limit and is expressed in such a way that the data transmission is pending state. The CURRENT_TX_NB is a variable managed per HARQ process and increments by 1 whenever the data stored in the HARQ buffer is transmitted or whenever the transmission-available subframe elapses. If the CURRENT_TX_NB reaches the maximum transmission limit, the UE discards the data stored in the corresponding HARQ buffer such that the pending state is released.

The uplink transmission complies with the synchronous HARQ scheme. In more detail, if an uplink grant indicating initial transmission occurs in the subframe [n] (hereinafter, referred to as sf[n]), the initial transmission is performed at sf[n+4] and, afterward, the transmission-available subframe occurs at every 8 subframes. That is, sf[n+12], sf[n+20], . . . , sf[n+4+m*8] are the transmission-available subframes. At the uplink transmission, a retransmission command may occur at a predetermined subframe. In an exemplary case of FDD system, the HARQ feedback and retransmission command to the uplink transmission at the sf[n+4] may occurs after 4 subframes, i.e. at sf[n+8]. The subframe capable of carrying the retransmission command occurs periodically until the HARQ transmission completes and is called the subframe in which a retransmission command to the HARQ operation may be received or the subframe in which an uplink grant may occur.

If a certain subframe is the subframe in which an uplink grant may occur and if the corresponding HARQ process has data, the UE monitors PDCCH in the subframe to determine whether an uplink grant indicating retransmission occurs.

That is, if the subframe is the subframe in which an uplink grant to the pending HARQ regransmission of a certain HARQ process of a certain serving cell and if the HARQ process associated with the pending HARQ retransmission has data, the procedure goes to step 1210. If the above condition is not fulfilled, the UE waits until the next subframe.

At step 1210, the UE determines whether the HARQ process having the data fulfilling the above condition is a primary set serving HARQ process or a non-primary set serving cell HARQ process. If the HARQ process is of the primary set, the procedure goes to step 1215 and, otherwise if the HARQ process is of the non-primary set serving cell, step 1220, and, otherwise if the HARQ process is of the both the primary and non-primary set serving cells, step 1225.

At step 1215, the UE monitors PDCCH of the cell in the active state currently among the serving cells belonging to the primary set in the corresponding subframe.

At step 1220, the UE monitors PDCCH of the cell in the active state currently among the serving cell belonging to the non-primary set in the corresponding subframe.

At step 1225, the UE monitors PDCCH of the cell in the active state currently among the serving cells belonging to the primary set and the serving cells belonging to the non-primary set in the corresponding subframe.

Figure 13:
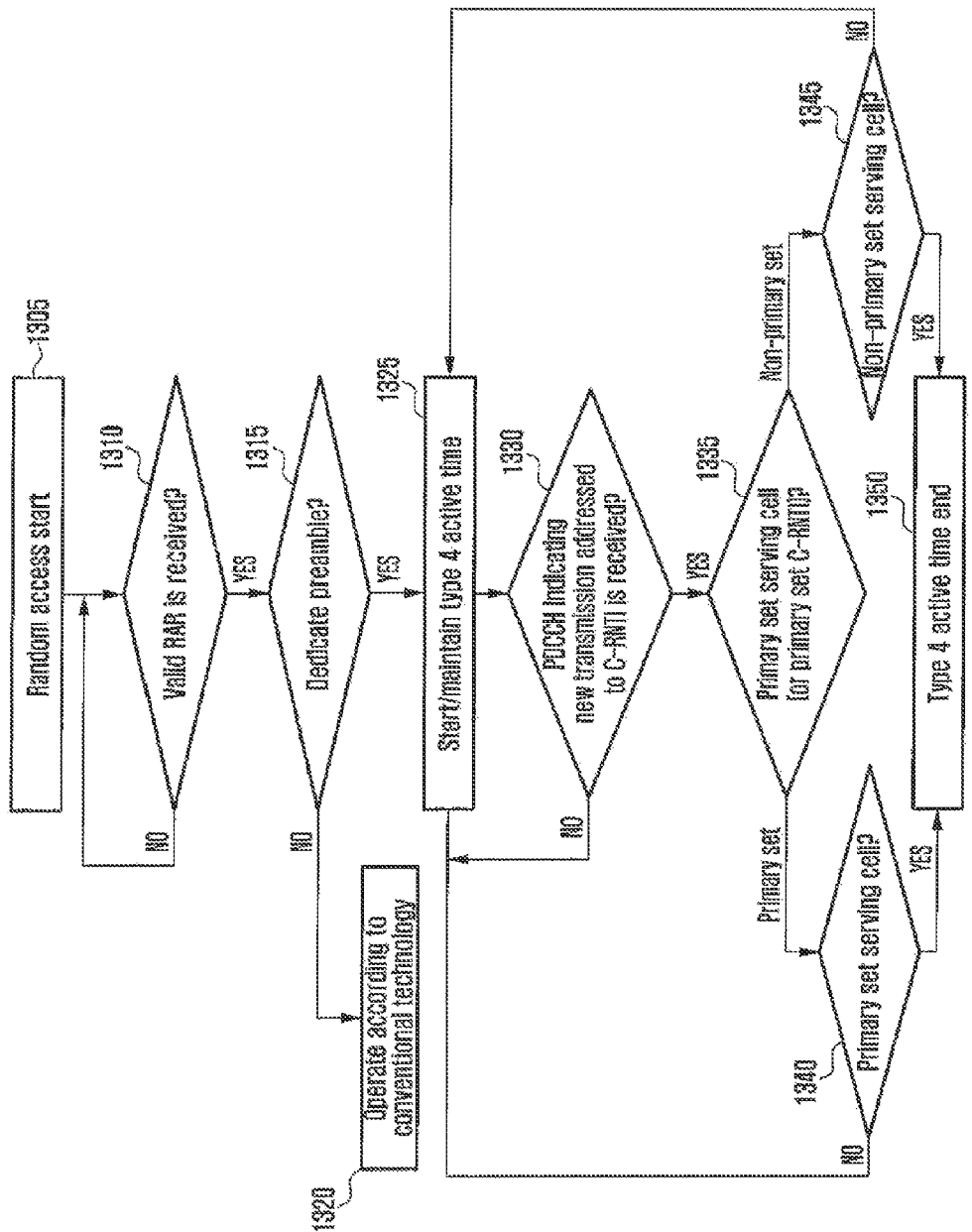
FIG. 13 is a flowchart illustrating the UE operation of selecting a serving cell for monitoring PDCCH after the completion of contention-free random access according to an embodiment of the present invention.

FIG. 13 is a flowchart illustrating the UE operation of selecting a serving cell for monitoring PDCCH after the completion of contention-free random access according to an embodiment of the present invention.

The random access is classified into one of contention-based random access and contention-free random access. The former is the random access procedure of transmitting a preamble selected by the UE (random preamble), and the latter is the random access procedure of transmitting a preamble allocated by an eNB (dedicated preamble).

The contention-free random access procedure is completed in such a way that a UE transmits a preamble and then receives a valid random access response message in reply to the preamble.

The contention-free random access is performed by the UE in the connected state, and the UE transmits a control message such as buffer status report using the uplink transmission resource allocated through the random access procedure. The control message transmitted by the UE may causes a situation in which the eNB sends the UE an uplink grant or control message in downlink. In the case of the UE operating in DRX mode, if the active time ends immediately upon receipt of the valid random access response message, this may cause a problem of delaying the receipt of the downlink control message or uplink grant transmission. In the present invention, the UE maintains the active time until the downlink assignment or uplink grant indicating new transmission is received completely after the contention-free random access has completed so as to solve the above problem. At this time, if the contention-free random access has been performed in a primary set serving cell, the UE monitors the PDCCHs of the primary set serving cells and, otherwise if the contention-free random access has been performed in a non-primary set serving cell, the UE monitors the PDCCHs of the non-primary set serving cells.

Referring to FIG. 13, the UE starts random access in a predetermined serving cell at step 1305.

The UE determine whether a valid random access response message is received at step 1310. If a valid random access response message is received, the procedure goes to step 1315 and, otherwise, the UE retransmits the preamble and waits until the random access response message is received.

At step 1315, the UE determines whether the transmitted preamble is a random access preamble or a dedicated preamble.

If the random access preamble has been transmitted, the UE performs the contention resolution procedure according to the conventional technology at step 1320.

If the dedicated preamble has been transmitted, this means that the UE which has transmitted the preamble is known and thus the UE ends the random access procedure with contention resolution procedure. In the case that the dedicated preamble has been transmitted, the UE starts the type 4 active time at step 1325. In the present invention, the active time is classified in four types as follows.

First active time: Active time occurring when one of onDurationTimer, drx-InactivityTimer, Drx-RetransmissionTimer, and mac-ContentionResolutionTimer is running.

Second active time: Active time occurring when the scheduling request signal has been transmitted as to be described with reference to FIG. 18 and it is currently in the pending state.

Third active time: Active time associated with the HARQ retransmission in the pending state as described with reference to FIG. 12.

Fourth active time: Active time associated with the contention-free random access If a certain subframe fulfils the conditions of the first to fourth active times, it is determined that the subframe is active time and, otherwise if at least none of the conditions is fulfilled, the subframe is not active time.

The UE determines whether the PDCCH indicating new transmission addressed to C-RNTI is received at step 1330. If the PDCCH indicating new transmission addressed to the C-RNTI is received, the procedure goes to step 1335 and, otherwise, step 1325.

At steps 1325 and 1330, the UE applies the type 4 active time to the serving cells of the corresponding set. That is, If the random access has been performed in a primary set serving cell (or PCell), the type 4 active time is applied to only the primary set serving cells and, otherwise if the random access has been performed in a non-primary set serving cell (or PUCCH SCell), the type 4 active time is applied to only the non-primary set serving cells.

If the PDCCH indicating new transmission addressed to the C-RNTI at step 1330, the UE determines whether the PDCCH has been received through a primary set serving cell or a non-primary set serving cell at step 1335.

At step 1335, the UE may determine whether the PDCCH is addressed to the C-RNTI_P or the C-RNTI_NP. The C-RNTI_P is acquired through the random access procedure in the PCell or allocated by the UE through a dedicated RRC message for use in scheduling in the primary set. The C-RNTI_NP is acquired through the random access procedure in the non-primary set or allocated by the eNB through an RRC message instructing to add new non-primary set serving cell for use in scheduling in the non-primary set.

If the PDCCH is received in a primary set serving cell, the procedure goes to step 1340 and, otherwise the PDCCH is received in a non-primary set serving cell, step 1345.

At step 1340, the UE determines whether the serving cell through which the preamble has been transmitted is a primary set serving cell, e.g. PCell. If it is determined that the serving cell through which the preamble has been transmitted is a primary set serving cell at step 1340, the UE ends the type 4 active time at step 1350. If it is determined that the serving cell through which the preamble has been transmitted is not a primary set serving cell at step 1340, the procedure goes to step 1325.

At step 1345, the UE determines whether serving cell through which the preamble has been transmitted is a non-primary set serving cell, e.g. PUCCH SCell. If it is determined that the serving cell through which the preamble has been transmitted is a non-primary set serving cell at step 1345, the UE stops the type 4 active time at step 1350. Otherwise if it is determined that the serving cell through which the preamble has been transmitted is no a non-primary set serving cell at step 1345, the procedure goes to step 1325.

Figure 14:
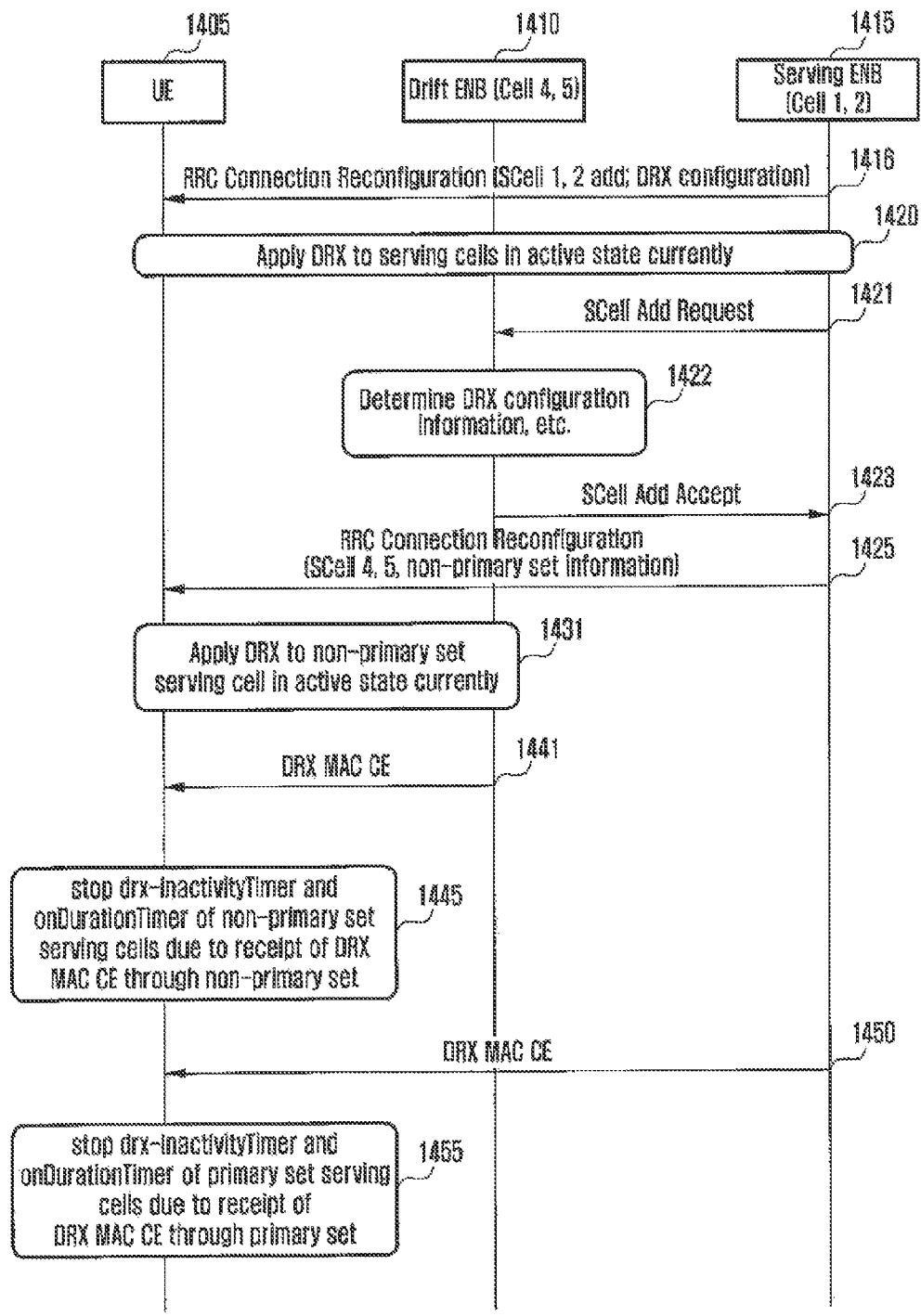
FIG. 14 is a signal flow diagram illustrating the procedure of shortening the active time using a DRX MAC CE according to an embodiment of the present invention.

FIG. 14 is a signal flow diagram illustrating the procedure of shortening the active time using a DRX MAC CE according to an embodiment of the present invention.

In order to transition the UE to the non-active time promptly, the eNB may instruct the UE to end the active time using a MAC layer control message. The MAC layer control message may be DRX MAC CE (Control Element) made up of a MAC sub-header with payload. The MAC sub-header includes a LCID field which is set to a value, e.g. 1110, to indicate that the corresponding MAC sub-header is DRX MAC CE.

The UE processes the DRX MAC CE differently depending on whether any non-primary set is configured or not.

If the DRX MAC CE is received in a situation where no non-primary set is configured, the UE may stop the onDurationTimer and drx-inactivityTimer among the currently running DRX timers at the corresponding time point. The rest timers, e.g. drx-retransmissionTimer, are running normally to complete the currently running HARQ operation.

If the DRX MAC CE is received in the situation where any non-primary set is configured, the UE determines the timers to be ended depending on whether the serving cell through which the DRX MAC CE has been received is a primary set serving cell or a non-primary set serving cell.

Referring to FIG. 14, the serving eNB 1415 configures SCell 1 and SCell 2 to the UE 1405 at a certain time point at step 1416. At this time, the RRC Connection Reconfiguration message may be used as described with reference to step 520 of FIG. 5. Since the RRC Connection Reconfiguration message include no information indicating that the newly added serving cells are the non-primary cell, the UE assumes that the newly added SCell 1 and SCell 2 are the primary set serving cells.

If the RRC Connection Reconfiguration message transmitted to the UE 1405 includes the DRX configuration information or if the DRX configuration information has been signaled previously at step 1416, the UE 1405 applies the same DRX operation to the serving cells in the active state among the currently configured serving cells. In more detail, the UE 1405 may start/restart/end the drx-InactivityTimer and drx-RetransmissionTimer depending on the scheduling status of the serving cell in the active state currently. The UE also may determine the start time of the onDurationTimer using the longDRX-CycleStartOffset, longDRX-Cycle, and shortDRX-Cycle. The UE also may determine the DRX-Cycle to be used by applying the drxShortCycleTimer.

Afterward, the serving eNB 1415 may determine to add a serving cell under the control of the drift eNB 1410 at a certain time point. The serving eNB 1415 sends the drift eNB 1410 a control message requesting to add the SCell at step 1421. The control message includes the information necessary for the drift eNB 1410 to add an appropriate serving cell, e.g. traffic condition of the UE 1405, QoS requirement, DRX configuration necessity to the UE 1405, DRX configuration information if DRX has been applied to the current serving cell.

The drift eNB 1410 performs Call Admittance Control at step 1422. If it is accepted to add the SCell, the drift eNB 1410 determines various parameters associated with the SCell. Examples of the parameters may include information on the serving cell to be added as SCell, information on the PUCCH transmission resource for use by the UE 1405 in the SCell, and DRX configuration information. Also, the C-RNTI_NP may be included.

The drift eNB 1410 sends the serving eNB 1415 a SCell add accept control message including the above information at step 1423. FIG. 14 is directed to the case where the drift eNB 1410 configures two SCells and the SCell indices indicate the SCell 4 and SCell 5. Both the serving eNB 1415 and the drift eNB 1410 are configured with DRX, the DRX configuration of the serving eNB 1415 is referred to as DRX configuration 1, and the DRX configuration of the drift eNB 1410 is referred to as DRX configuration 2.

The serving eNB 1315 sends the UE 1405 a predetermined control message, e.g. RRC Connection Reconfiguration message, to configure the SCell 4 and SCell 5 to the UE 1405. The UE 1405 configures the SCells 4 and 5 upon receipt of the control message. The control message transmitted to the UE 1405 at step 1425 may include the information notifying that the SCells 4 and 5 belong to a non-primary set or the SCells 4 and 5 are under the control of the eNB 1410 other than the serving eNB 1415.

If the DRX configuration information 2 for non-primary set is received, the UE 1405 applies the DRX configuration 2 since the activation of the non-primary set serving cell or acquisition of the SFN of the PUCCH SCell to perform DRX operation in the non-primary set serving cell at step 1431. In more detail, the UE may start/restarts/stops the drx-InactivityTimer_NP and drx-RetransmissionTimer_NP depending on the scheduling status of the non-primary set serving cell. The UE also may determine the start timing of the onDurationTimer_NP using the longDRX-CycleStartOffset_NP, longDRX-Cycle_NP, and shortDRX-Cycle_NP. The UE also may determine the DRX cycle to be used based on the drxShortCycleTimer_NP.

Afterward, the drift UE 1410 may determine to end the active time of the UE 1405 at a certain time point. This may be the case where the UE 1405 has to maintain the active time during a considerable period due to the onDurationTimer or drx-inactivityTimer even without downlink/uplink data. In this case, the drift eNB 1410 sends the UE 1405 a DRX MAC CE at step 1441.

Upon receipt of the DRX MAC CE, the UE 1405 determines whether the serving cell through which the DRX MAC CE has been received is a primary set serving cell or a non-primary set serving cell. Since the DRX MAC CE has been received through the non-primary set serving cell at step 1441, the UE stops the onDurationTimer_NP and drx-InactivityTimer_NP associated with the non-primary set serving cell at step 1445.

The serving eNB 1415 determines to end the active time of the UE 1405 at a certain time point and sends the UE 1405 a DRX MAC CE at step 1450.

Upon receipt of the DRX MAC CE, the UE determines whether the serving cell through which the DRX MAC CE has been received is a primary set serving cell or a non-primary set serving cell at step 1440. Since the DRX MAC CE has been received through the primary set serving cell at step 1440, the UE 1405 stops the onDurationTimer and drx-InactivityTimer associated with the primary set serving cell, or PCell, at step 1455.

Figure 15:
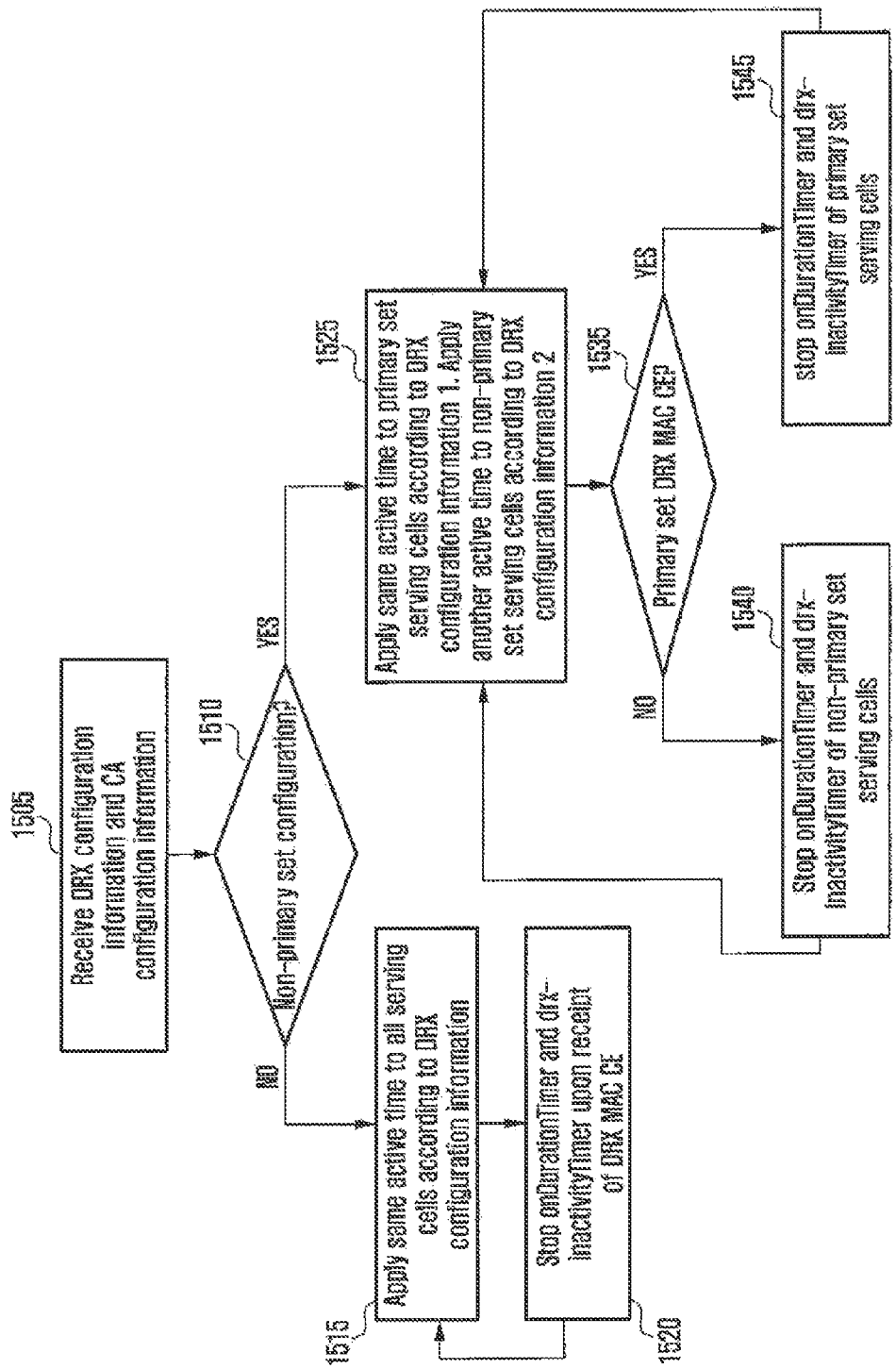
FIG. 15 is a flowchart illustrating the UE operation of shortening the active time with the receipt of DRX MAC CE according to an embodiment of the present invention.

FIG. 15 is a flowchart illustrating the UE operation of shortening the active time with the receipt of DRX MAC CE according to an embodiment of the present invention.

Referring to FIG. 15, the UE acquires the DRX configuration information and CA configuration information at step 1505. The configuration informations may be received through a control message such as RRC Connection Reconfiguration at a single or several transmissions.

The DRX configuration information may include onDurationTimer, drx-InactivityTimer, drx-RetransmissionTimer, longDRX-CycleStartOffset, longDRX-Cycle, shortDRX-Cycle, drxShortCycleTimer, etc.

There may be one or two sets of parameters. The DRX configuration information for the primary set serving cells is referred to as DRX configuration information 1, and the DRX configuration information for the non-primary set serving cells as DRX configuration information 2. The DRX configuration information may include the indentifier for identifying the set to which the serving cells belong. The DRX configuration information including no identifier may be the DRX configuration information 1 for the primary set serving cells, and the DRX configuration information including the identifier may be the DRX configuration information 2 for the non-primary set serving cells. The DRX configuration information 1 and the DRX configuration information 2 may be transmitted simultaneously in one control message or sequentially in separate control messages. For convenience purpose, the DRX configuration informations 1 and 2 are discriminated by attaching '_NP' and '_P' respectively. That is, the onDurationTimer_NP is of the DRX configuration information 2 for the non-primary set serving cells, and the onDurationTimer_P is of the DRX configuration information 1 for the primary set serving cells.

The UE determines whether any non-primary set is configured at the corresponding timing at step 1510. If any non-primary set is configured, i.e. inter-eNB carrier aggregation is applied, the procedure goes to step 1525. If no non-primary set is configured, the procedure goes to step 1515.

If no non-primary set is configured, the UE determines the subframes corresponding to the active time by applying the DRX configuration and the SFN of the PCell and monitors PDCCH of the serving cells in the active state at the corresponding time point in the subframe at step 1515. If the DRX MAC CE is received while operating in the DRX mode, the UE stops the onDurationTimer and drx-inactivityTimer at step 1520 and returns the procedure to step 1515 to continue normal DRX operation.

If any non-primary set is configured, the UE determines the active time to be applied to the primary set serving cells using the DRX configuration information 1 and the SFN of the PCell at step 1525. The UE monitors PDCCH of the primary set serving cells in the active state in the subframes corresponding to the active time. The UE also determines the active time to be applied of the non-primary set serving cells using the DRX configuration information 2 and the SFN of a predetermined SCell, e.g. PUCCH SCell. The UE monitors PDCCH of the non-primary set serving cells in the active state in the subframes corresponding to the active time.

If the DRX MAC CE is received, the UE determines whether the DRX MAC CE is for primary set or non-primary set at step 1535. If the DRX MAC CE is the first DRX MAC CE or transmitted through a primary set serving cell, it is the DRX MAC CE for primary set and such that the procedure goes to step 1545. If the DRX MAC CE is the second DRX MAC CE or transmitted through a non-primary set serving cell, it is the DRX MAC CE for non-primary set such that the procedure goes to step 1540.

If the DRX MAC CE is for non-primary set, the UE stops the onDurationTimer and drx-inactivityTimer for the non-primary set serving cell and returns the procedure to step 1525 to continue normal DRX operation.

If the DRX MAC CE is for primary set, the UE stops the onDurationTimer and drx-inactivityTimer for the primary set serving cells and returns the procedure to step 1525 to continue normal DRX operation.

The first DRX MAC CE is the DRX MAC CE for the primary set serving cells, and the second DRX MAC CE is the DRX MAC CE for the non-primary set serving cells. The first and second DRX MAC CEs are distinguished by LCID, i.e. the first DRX MAC CE is identified by the same LCID as the conventional DRX MAC CE and the second DRX MAC CE is identified by a reserved LCID.

Figure 16:
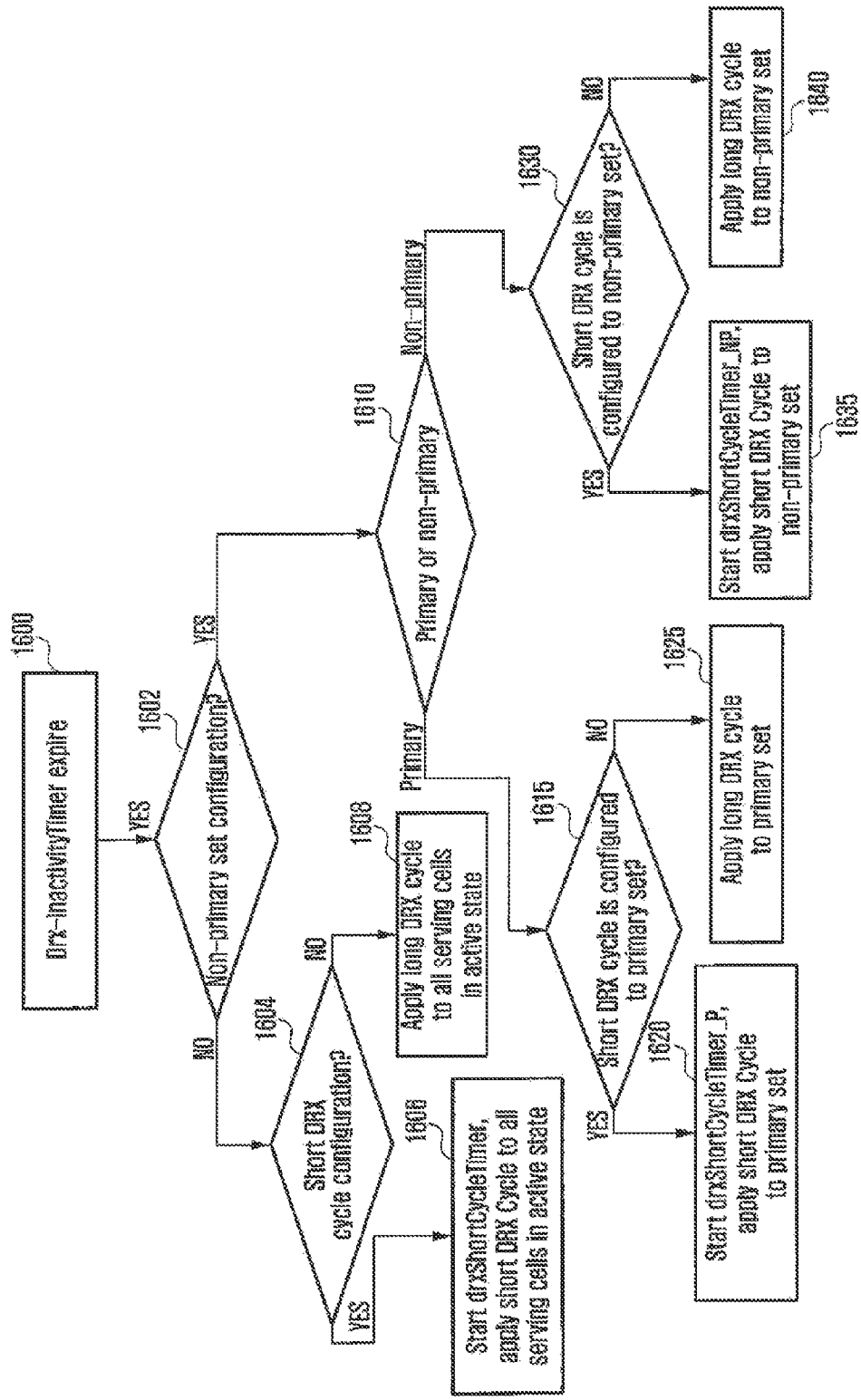
FIG. 16 is a flowchart illustrating the UE operation of determining the DRX cycles to be applied to the primary and non-primary set serving cells according to an embodiment of the present invention.

FIG. 16 is a flowchart illustrating the UE operation of determining the DRX cycles to be applied to the primary and non-primary set serving cells according to an embodiment of the present invention.

In order to reduce battery consumption, it is possible to use multiple DRX cycles. For example, it is possible to apply a short DRX cycle while the UE a webpage and a long DRX while the UE reads the webpage to further reduce the battery consumption.

The switching between the two types of DRX cycles can be controlled using the drxShortCycleTimer. For example, the UE may apply the short DRX cycle while the drxShortCycleTimer is running and the long DRX cycle while the drxShortCycleTimer is not running. It is preferred to apply the short DRX cycle when the data communication is active. If the drx-inactivityTimer is running, this means that the data communication is active so as to associate operation of the drxShortCycleTimer with the drx-inactivityTimer. In detail, if the drx-inactivityTimer stops or expires, the UE may start/restart the drxShortCycleTimer. The UE applies the short DRX cycle while the drxShortCycleTimer is running and the long DRX cycle when the drxShortCycleTimer expires.

If any non-primary set serving cell is configured to the UE, the UE may apply independent DRX operations for the primary and non-primary set serving cells. The primary set serving cells are configured with the DRX parameters such as longDRX-Cycle_P, shortDRX-Cycle_P, and drxShortCycleTimer_P; and the non-primary set serving cells are configured with the DRX parameters such as longDRX-Cycle_NP, shortDRX-Cycle_NP, and drxShortCycleTimer_NP.

The primary set serving cell parameters such as longDRX-Cycle_P, shortDRX-Cycle_P, and drxShortCycleTimer_P may be signaled to the UE as a part of the DRX configuration information 1. The non-primary set serving cell parameters such as longDRX-Cycle_NP, shortDRX-Cycle_NP, and drxShortCycleTimer_NP are signaled to the UE as a part of the DRX configuration information 2.

If the shortDRX-Cycle_P, drxShortCycleTimer_P, shortDRX-Cycle_NP, drxShortCycleTimer_NP are not signaled, the UE may not apply the short DRX cycle to the corresponding set.

Referring to FIG. 16, if the drx-InactivityTimer expires at step 1600, the procedure goes to step 1602. At step 1602, the UE determines whether any non-primary set serving cell is configured. If any non-primary set serving cell is configured, the procedure goes to step 1610 and, otherwise if the non-primary set serving cell is not configured, step 1604.

At step 1604, the UE determines whether the shortDrx-Cycle and drxShortCycleTimer as short DRX parameters are signaled. The UE may determine whether the short DRX cycle is configured. If so, the procedure goes to step 1606 and, otherwise, step 1608.

At step 1606, the UE starts the drxShortCycleTimer and applies the short DRX cycle. In more detail, the subframe at which the onDuration for the serving cells in the active state starts is determined using equation (4).

$$[(SFN*10)+\text{subframe number}]\,\text{modulo}(\text{short DRX-Cycle}) = (\text{drxStartOffset})\,\text{modulo}(\text{short DRX-Cycle}) \quad (4)$$

At step 1608, the UE applies the long DRX to the serving cell in the active state currently. In more detail, the subframe at which the onDuration for the serving cells in the active state currently starts is determined using equation (5).

$$[(SFN*10)+\text{subframe number}]\,\text{modulo}(\text{Long DRX-Cycle}) = \text{drxStartOffset} \quad (5)$$

The UE determines whether the DRX_InactivityTimer is for the primary set serving cell or non-primary set serving cells at step 1610. If the DRX_InactivityTimer is for the primary set serving cells, the procedure goes to step 1615 and, otherwise if the DRX_InactivityTimer is for the non-primary set serving cells, step 1630.

At step 1615, the UE determines whether the short DRX cycle length_P and drxShortCycleTimer_P as the short DRX parameters are signaled in the DRX configuration information 1. Or, the UE determines whether the short DRX cycle is configured for the primary set serving cells. If the short DRX cycle is configured, the procedure goes to step 1620 and, otherwise, step 1625.

At step 1620, the UE starts the drxShortCycleTimer_P and applies the short DRX cycle. In more detail, the subframe at which the onDuration for the primary set serving cells in the active state currently start is determined using equation (6).

$$[(SFN\_P*10)+\text{subframe number}\_P] \bmod (\text{short DRX-Cycle}\_P) = (\text{drxStartOffset}\_P) \bmod (\text{shortDRX-Cycle}\_P) \quad (6)$$

In equation (6), SFN_P denotes the SFN of the PCell, and the subframe number_P denotes the subframe number of the PCell.

At step 1625, the UE applies the long DRX to the primary set serving cells. In more detail, the subframe at which the onDuration for the primary set serving cells in the active state currently is determined using equation (7).

$$[(SFN\_P*10)+\text{subframe number}\_P] \bmod (\text{Long DRX-Cycle}\_P) = \text{drxStartOffset}\_P \quad (7)$$

At step 1630, the UE determines whether the shortDRX-cycle_NP and drxShortCycleTimer_NP as the short DRX parameters are signaled in the DRX configuration information 2. Or the UE determines whether the non-primary set serving cells are configured with the short DRX cycle. If the short DRX cycle is configured, the procedure goes to step 1635 and, otherwise, step 1640.

At step 1635, the UE starts the drxShortCycleTimer_NP and applies the short DRX cycle. In more detail, the subframe at which the onDuration for the non-primary set serving cells in the active state currently starts is determined using equation (8).

$$[(SFN\_NP*10)+\text{subframe number}\_NP] \bmod (\text{short DRX-Cycle}\_NP) = (\text{drxStartOffset}\_NP) \bmod (\text{short DRX-Cycle}\_NP) \quad (8)$$

In equation (8), SFN_N denotes the SFN of a predetermined non-primary set serving cell, e.g. PUCCH SCell, and subframe number_NP denotes the subframe number of a predetermined non-primary set serving cell, e.g. PUCCH SCell.

At step 1640, the UE applies the long DRX to the non-primary set serving cells. In more detail, the subframe at which the onDuration for the primary set serving cells in the active state currently starts is determined using equation (9).

$$[(SFN\_NP*10)+\text{subframe number}\_NP] \bmod (\text{Long DRX-Cycle}\_NP) = \text{drxStartOffset}\_NP \quad (9)$$

In equations (6) and (8), the reason for taking shortDRX-Cycle_P and shortDRX-Cycle_NP modulo operation for the respective drxStartOffset_P and drxStartOffset_NP is to configure the drxStartOffset_P and drxStartOffset_NP based on the long DRX-Cycle_P and long DRX-Cycle_NP and applies the parameters to both the short and long DRX cycles.

Figure 17:
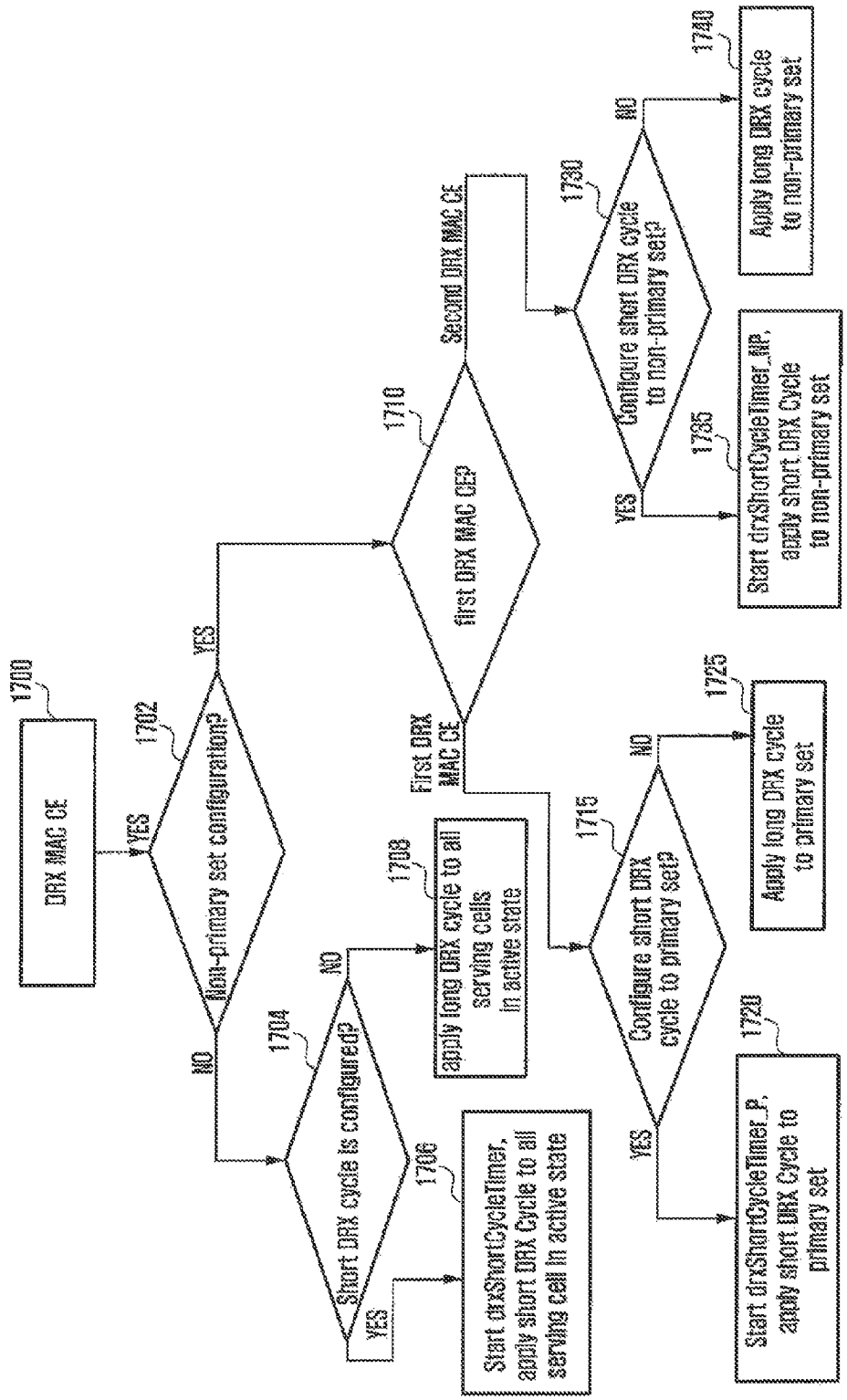
FIG. 17 is a flowchart illustrating the UE operation of determining DRX cycles to be applied to the primary and non-primary sets serving cells according to another embodiment of the present invention.

FIG. 17 is a flowchart illustrating the UE operation of determining DRX cycles to be applied to the primary and non-primary sets serving cells according to another embodiment of the present invention.

Even in the case of receiving the DRX MAC CE, the UE applies the short DRX cycle to restart the DRX operation. The UE determines the serving cells in which the DRX operations resumes by referencing the serving cell through which the DRX MAC CE has been received or the type of the DRX MAC CE.

Referring to FIG. 17, the UE receives the DRX MAC CE at step 1700.

Steps 1702, 1704, 1706, and 1708 of FIG. 17 are identical with steps 1602, 1604, 1606, and 1608 of FIG. 16, detailed descriptions thereof are omitted herein.

If it is determined that any non-primary set serving cell is configured at step 1702, the UE determines whether the received DRX MAC CE is the first DRX MAC CE or the second DRX MAC CE at step 1710. If the received DRX MAC CE is the first DRX MAC CE, the procedure goes to step 1715 and, otherwise if the received DRX MAC CE is the second DRX MAC CE, step 1730. At step 1710, the UE may determine whether the serving cell through which the DRX MAC CE has been transmitted is a primary set serving cell or a non-primary set serving cell. If the DRX MAC CE has been transmitted through a primary set serving cell, the procedure goes to step 1715 and, otherwise, if the DRX MAC CE has been transmitted through a non-primary set serving cell, step 1730.

Steps 1715, 1720, 1725, 1730, 1735, and 1740 of FIG. 17 are identical with steps 1615, 1620, 1625, 1630, 1630, and 1640 of FIG. 16, detailed descriptions thereof are omitted herein.

Figure 18:
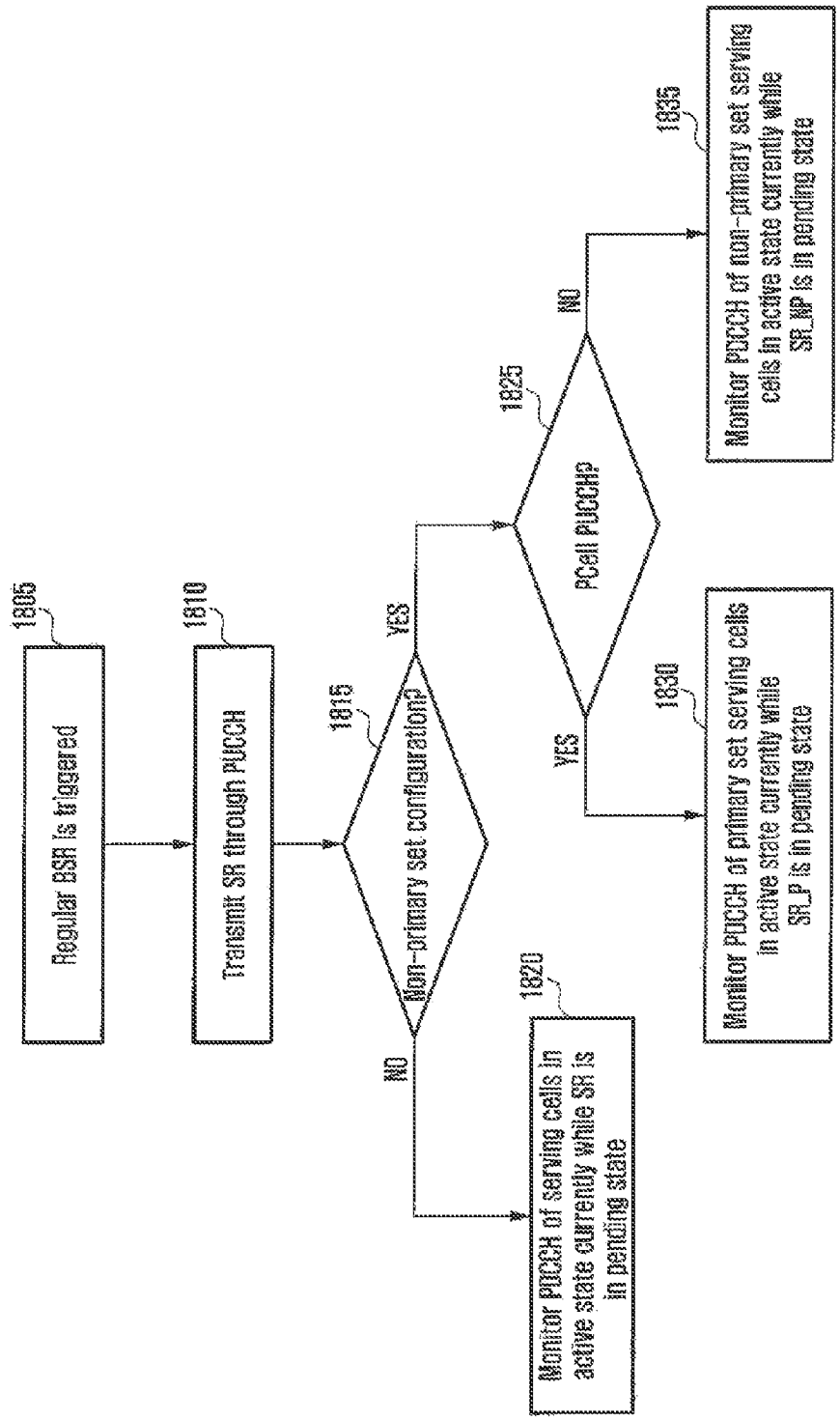
FIG. 18 is a flowchart illustrating the UE operation of selecting the serving for monitoring PDCCH in association with SR transmission according to an embodiment of the present invention.

FIG. 18 is a flowchart illustrating the UE operation of selecting the serving for monitoring PDCCH in association with SR transmission according to an embodiment of the present invention.

Referring to FIG. 18, if a regular BSR is triggered at step 1805, the UE transmits the SR using the PUCCH transmission resource at step 1819.

The UE determines whether any non-primary set serving cell is configured at step 1815. If no non-primary set serving cell is configured, the procedure goes to step 1820 and, otherwise if any non-primary set serving cell is configured, step 1825.

In the case that no no-primary set serving is configured, the UE monitors the PDCCH of the serving cells in the active state currently during a predetermined period at step 1820. The predetermined period is the period in which the SR is in the pending state.

In the case that any non-primary set serving cell is configured, the UE determines whether the PUCCH on which the SR has been transmitted is the PUCCH of the PCell (or PUCCH of the primary set) or the PUCCH of the SCell, e.g. PUCCH SCell (or PUCCH of a non-primary set) at step 1825. If the SR has been transmitted on the PUCCH of the PCell, the procedure goes to step 1830. Otherwise if the SR has been transmitted on the PUCCH of the PUCCH SCell, the procedure goes to step 1835.

If the SR has been transmitted on the PUCCH of the PCell, the UE monitors the PDCCH of the serving cell in the active state currently among the serving cells belonging to the primary set during a predetermined period at step 1830. The predetermined period is the period in which the SR (SR_P) is transmitted through the PCell.

If the SR has been transmitted on the PUCCH of the PUCCH SCell, the UE monitors the PDCCH of the serving cells in the active state among the serving cells belonging to the non-primary set during a predetermined period. The predetermined period is the period in which the SR (SR_NP) is transmitted through the PUCCH SCell.

The SR is the signal to request for UL-SCH transmission resource available for new transmission. The SR is triggered along with the regular BSR and in the pending state before being cancelled. If a non-primary set has been configured, the SR may be classified into one of SR_P and SR_NP. If the BSR triggered along with the SR is the BSR of the primary set (i.e. if the BSR includes the primary set logical channel buffer status and triggered by the data of the primary set logical channel), the SR transmitted on the PUCCH of the PCell is the SR_P. If the BSR triggered along with the SR is the BSR of the non-primary set (i.e. if the BSR includes the non-primary set logical channel buffer status and triggered by the data of the non-primary set logical channel), the SR transmitted on the PUCCH of the PUCCH SCell is the SR_NP. The SR_P and SR_NP cancellation conditions are as follows.

[SR_P Cancellation Condition]

A MAC PDU to be transmitted through the primary set, the PDU includes a BSR, and the BSR reflects the buffer status up to the time point when the last event that triggered the primary set BSR (MAC PDU for the primary set is assembled and this PDU includes a BSR which includes buffer status up to (and including) the last event that triggered a primary set BSR).

[SR_NP Cancellation Condition]

A MAC PDU to be transmitted through the non-primary set is generated, the PDU includes a BSR, and the BSR reflects the buffer status up to the time point when the last event that triggered the non-primary set BSR (MAC PDU for the non-primary set is assembled and this PDU includes a BSR which includes buffer status up to (and including) the last event that triggered a non-primary set BSR).

A certain logical channel may be configured for transmission only in the primary set serving cell or only in the non-primary set serving cell. The former is referred to as primary logical channel, and the latter is referred to as non-primary logical channel.

Whether a certain logical channel is a primary logical channel or non-primary logical channel is indicated by a control message configuring the corresponding logical channel. If a certain logical channel is a non-primary logical channel, the control message includes the information indicating the non-primary logical channel and the information notifying the non-primary set to which the logical channel belongs. The logical channel having not information indicating the non-primary logical channel is a primary logical channel.

Figure 19:
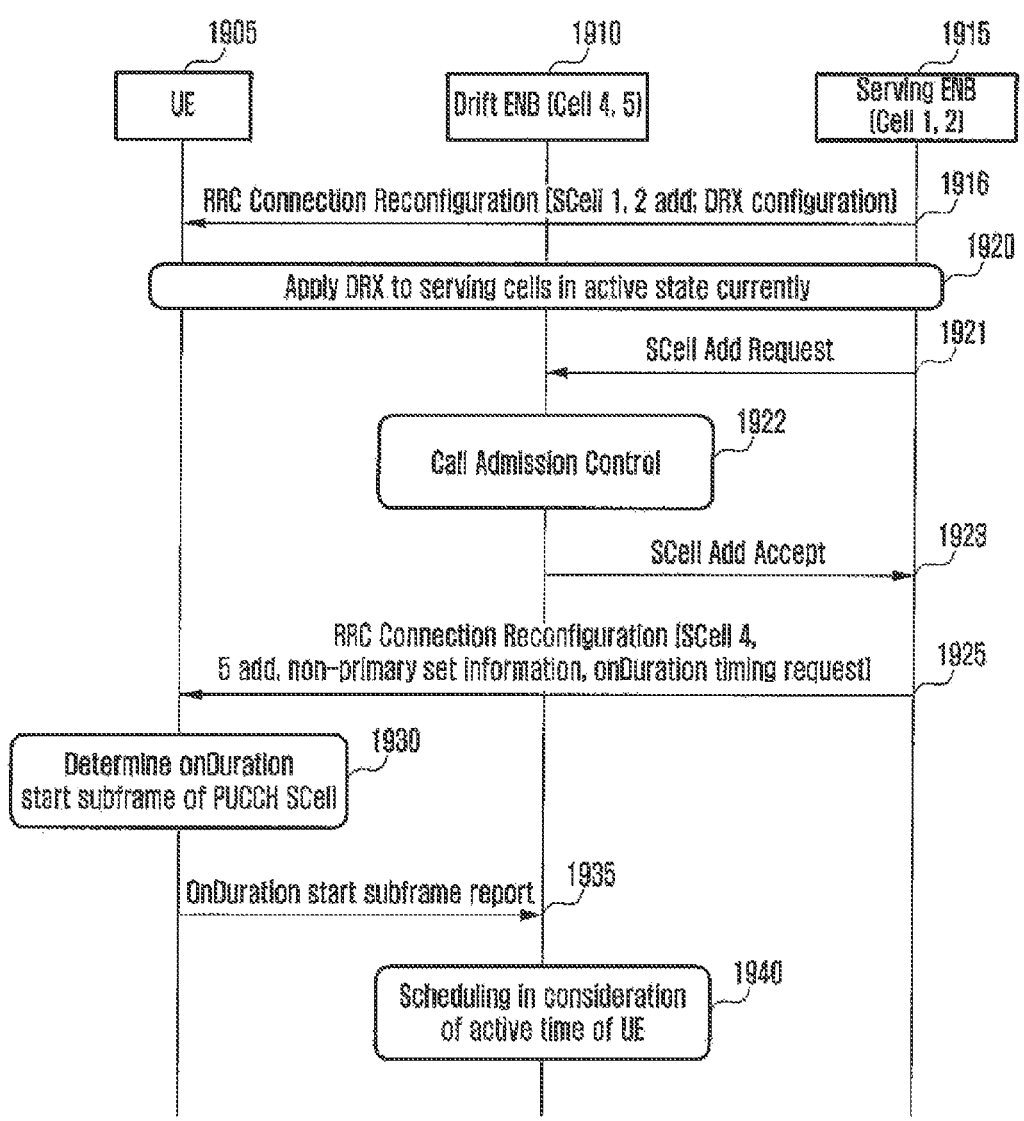
FIG. 19 is a signal flow diagram illustrating the procedure of using the common onDuration in the serving and drift eNBs according to an embodiment of the present invention.

FIG. 19 is a signal flow diagram illustrating the procedure of using the common onDuration in the serving and drift eNBs according to an embodiment of the present invention.

From the viewpoint of the UE, if the common active time is applied to the primary and non-primary sets serving cells, it is possible to reduce the implementation complexity of the UE. As described above, in the case that the inter-eNB carrier aggregation is applied, the serving eNB and the drift eNB perform scheduling independently such that it is difficult to define a common active time. However, if the two eNBs start the onDurationTimer at the same timing and the drx-inactivityTimer and drx-retransmissionTimer according to the respective scheduling statuses, it is possible to maintain one active time from the viewpoint of the UE. That is, the onDurationTimer starts at a certain time point x, and the drift eNB and the serving eNB know about it, the drift eNB determines the active time of the UE in consideration of its own scheduling, and the serving eNB determines the active time of the UE in consideration of its own scheduling too. The UE determines the active time in consideration of the scheduling of bot the two eNBs and thus the active time of the UE is the union of the active times determined by the drift eNB and the serving eNB. Accordingly, it is possible to prevent the eNB from scheduling the UE in a subframe which is not in the active state.

In order for the serving and drift eNBs start the onDurationTimer at the same time point, both the serving and drift eNBs have to know the subframe at which the onDuration starts. If the DRX applied before configuring the non-primary set is applied as it was, the onDuration starts based on the SFN of the PCell such that the serving eNB can check the start time of the onDuration accurately. Since the drift eNB does not know the SFN of the serving eNB, the drift eNB cannot check the start time of the onDurationTimer by itself. In the present invention, if the UE reports to the drift eNB the SFN and subframe number at which the onDurationTimer starts, the drift eNB determines the time when the UE transitions to the active time based on that information and performs scheduling based thereon.

Since steps 1916, 1920, and 1921 of FIG. 19 are identical with steps 1416, 1420, and 1421 of FIG. 14, detailed descriptions thereof are omitted herein.

The drift eNB 1910 performs Call Admission Control at step 1922. If it is accepted to add the SCell, the drift eNB 1910 determines various parameters related to the SCell. For example, the parameters may include information on the serving cell to be added as SCell and the information on the PUCCH transmission resource for use by the UE 1905 in the SCell.

The drift eNB 1910 sends the serving eNB 1915 a SCell Add Accept control message including the above information at step 1923. If SFN/subframe synchronization is not established between the drift eNB 1910 and the serving eNB 1915 and if the drift eNB 1910 does not know the difference between its SFN/subframe and the SFN/subframe of the serving eNB 1915, the drift eNB 1910 includes 'onDuration timing request' information in the control message.

The serving eNB transmits a predetermined control message, e.g. RRC Connection Reconfiguration, to configure S Cell 4 and S Cell 5 to the UE 1905. The control message transmitted to the UE 1905 at step 1925 includes the 'onDuration timing request' information.

The UE 1905 acquires the SFN/subframe timing of a predetermined non-primary set serving cell, e.g. PUCCH SCell, to determine the SFN/subframe number of the PUCCH SCell matching the start subframe of the onDurationTimer determined by the SFN/subframe of the PCell in the time domain at step 1930.

The UE generates a predetermined RRC control message including the SFN/subframe number of the PUCCH SCell corresponding to the start subframe of the onDuration and the information on whether the subframe of the PUCCH S Cell preceding or following the subframe of the PCell at step 1935. Next, the UE transmits the control message through the non-primary set serving cell.

The drift eNB 1910 determines whether the UE 1905 is in the active time at a certain time point in consideration of the subframe number corresponding to the start time of the onDurationTimer, DRX configuration information, and its own scheduling status and schedules the UE based thereon at step 1940. That is, the UE 1905 transmits the downlink assignment/uplink grant to the UE at the subframe which is predicted corresponds to the active time.

Figure 20:
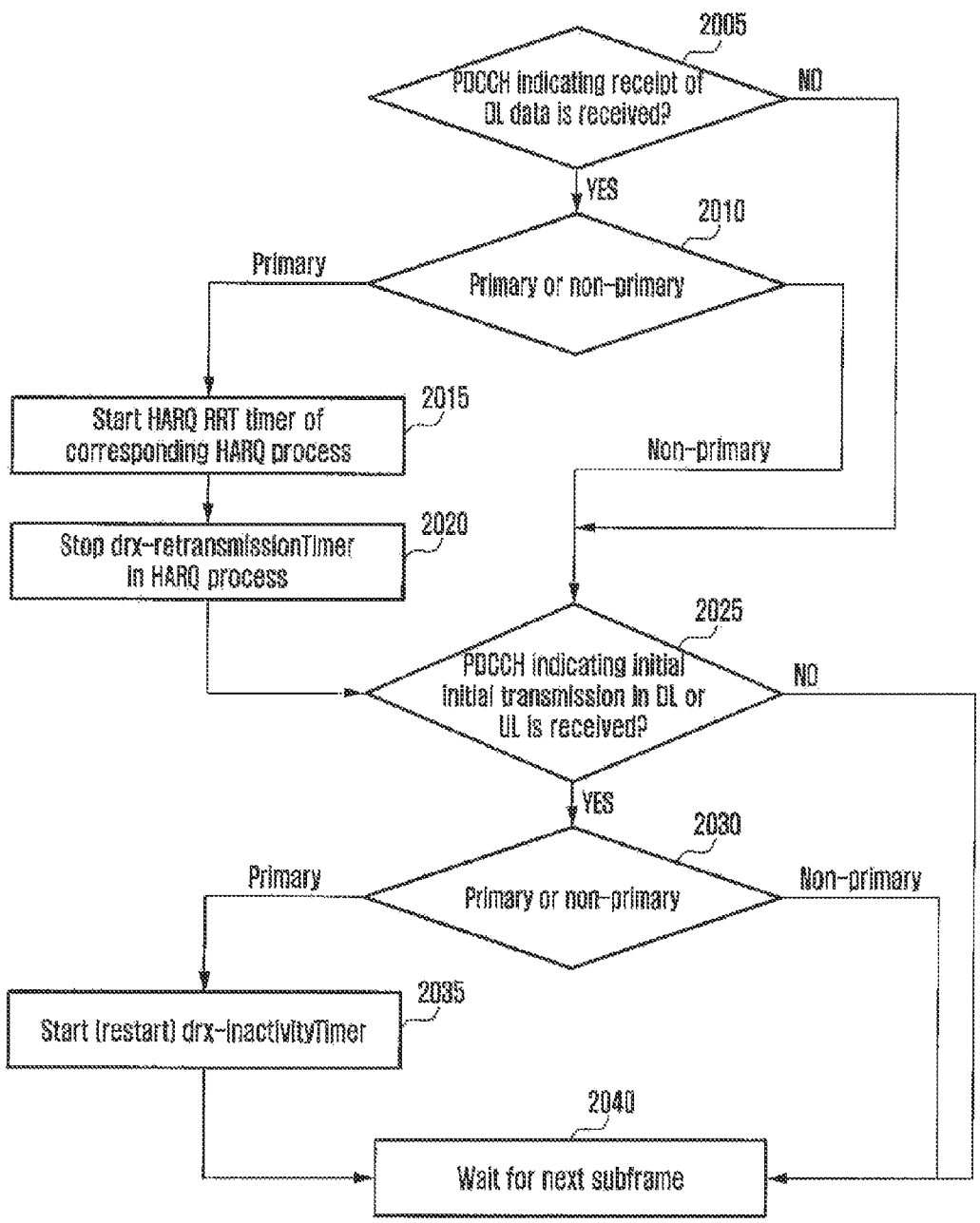
FIG. 20 is a flowchart illustrating the UE operation when DRX is not applied to non-primary serving cells according to an embodiment of the present invention.

FIG. 20 is a flowchart illustrating the UE operation when DRX is not applied to non-primary serving cells according to an embodiment of the present invention.

If any non-primary set is configured, this means that large amount data communication is performed through the serving cells of the non-primary set. Accordingly, it can be considered to apply DRX to only the primary set but not the non-primary set. If the DRX is configured, the UE determines the subframes corresponding to the active time in consideration of only the scheduling status of the primary set serving cells and the SFN of the PCell, monitors PDCCH of the serving cell in the active state currently among the primary and non-primary sets serving cells during the active time, and monitors PDCCH of the serving cell in the active times currently among the non-primary set serving cells at the subframes that are not active time. FIG. 20 is directed to the UE operation in which the HARQ RTT timer and drx-inactivityTimer are running when the PDCCH has been received. If the PDCCH is received through the primary set serving cell, the UE starts the HARQ RTT timer and drx-inactivityTimer and, otherwise if the PDCCH is received through a non-primary set serving cell, does not start these timers.

Referring to FIG. 20, the UE determines whether the PDCCH indicating downlink data reception is received at the current subframe at step 2005. If the PDCCH indicating downlink data receipt is received, the procedure goes to step 2010 and, otherwise, step 2025.

The UE determines whether the PDCCH has been received through a primary set serving cell or a non-primary set serving cell at step 2010. If the PDCCH has been received through a primary set serving cell, the procedure goes to step 2015 and, otherwise if the PDCCH has been received through a non-primary set serving cell, step 2025.

The UE starts the HARQ RTT timer of the corresponding HARQ process at step 2015 and stops the drx-retransmissionTimer of the HARQ process at step 2020.

At step 2015, the UE determines whether the PDCCH indicating downlink or uplink initial transmission has been received in the subframe. If the PDCCH indicating downlink or uplink initial transmission has been received, the procedure goes to step 2030 and, otherwise, step 2040.

At step 2030, the UE determines whether the PDCCH has been received through a primary set serving cell or a non-primary set serving cell. If the PDCCH has been received through the primary set serving cell, the procedure goes to step 2035 and, otherwise, step 2040.

At step 2035, the UE starts the drx-inactivityTimer, and the procedure goes to step 2040.

At step 2040, the UE waits for the next subframe.

Figure 21:
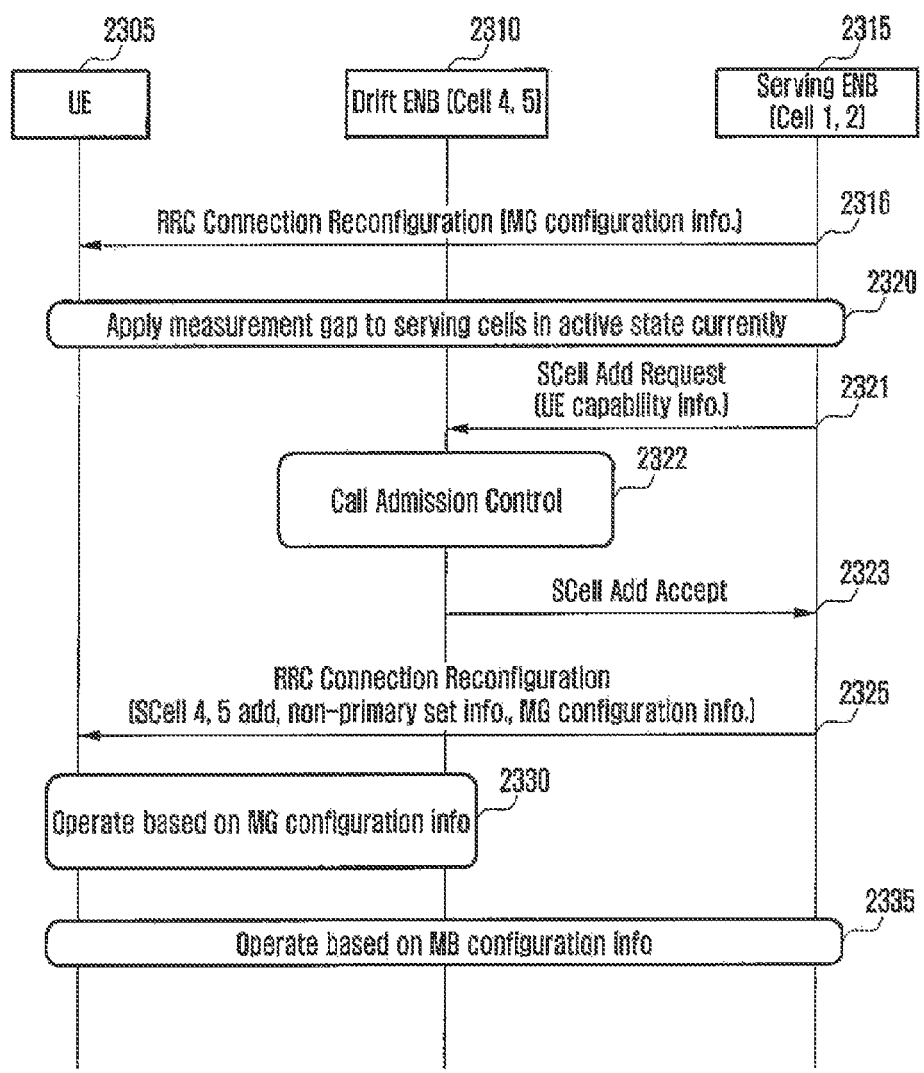
FIG. 21 is a signal flow diagram illustrating the procedure of applying different measurement gaps to the primary and non-primary sets according to an embodiment of the present invention.

FIG. 21 is a signal flow diagram illustrating the procedure of applying different measurement gaps to the primary and non-primary sets according to an embodiment of the present invention.

In another embodiment of the present invention, a method of applying different measurement gaps (hereinafter, referred to interchangeably as MG) to the primary and non-primary sets. In more detail, the eNB instructs the serving cell, i.e. primary or non-primary set serving cell, to which the measurement gap is applied in the measurement gap configuration information, and the UE does not perform downlink data reception and uplink data transmission during the measurement gap.

Referring to FIG. 21, the serving eNB 2315 sends the UE 2305 the RRC Connection Reconfiguration message including the measurement gap configuration information at a certain time point at step 2316. The serving eNB 2315 may instruct the UE 2305 to perform measurement on a frequency different from the current serving frequency or on other Radio Access Technology (RAT).

The measurement gap is a predetermined length of time duration configured for measurement on a frequency different from the serving frequency and occurs periodically at a predetermined interval. The UE 2305 performs neighbor cell measurement without communication with the serving cell in the subframes corresponding to the measurement gap.

The measurement gap start at the start time of a predetermined subframe and maintains during a predetermined period, e.g. 6 ms. The subframe at which the measurement gap starts is determined by a parameter called gapOffset, and the measurement gap configuration information may include the following information.

The gapOffset is the information indicating the subframe at which the measurement gap starts.

The gap repetition period information indicates whether the gap repletion interval is 40 ms or 80 ms.

The UE 2305 checks the time duration corresponding to the MG based on the above information and suspends downlink signal reception and uplink signal transmission in the serving cell during the MG.

Figure 22:
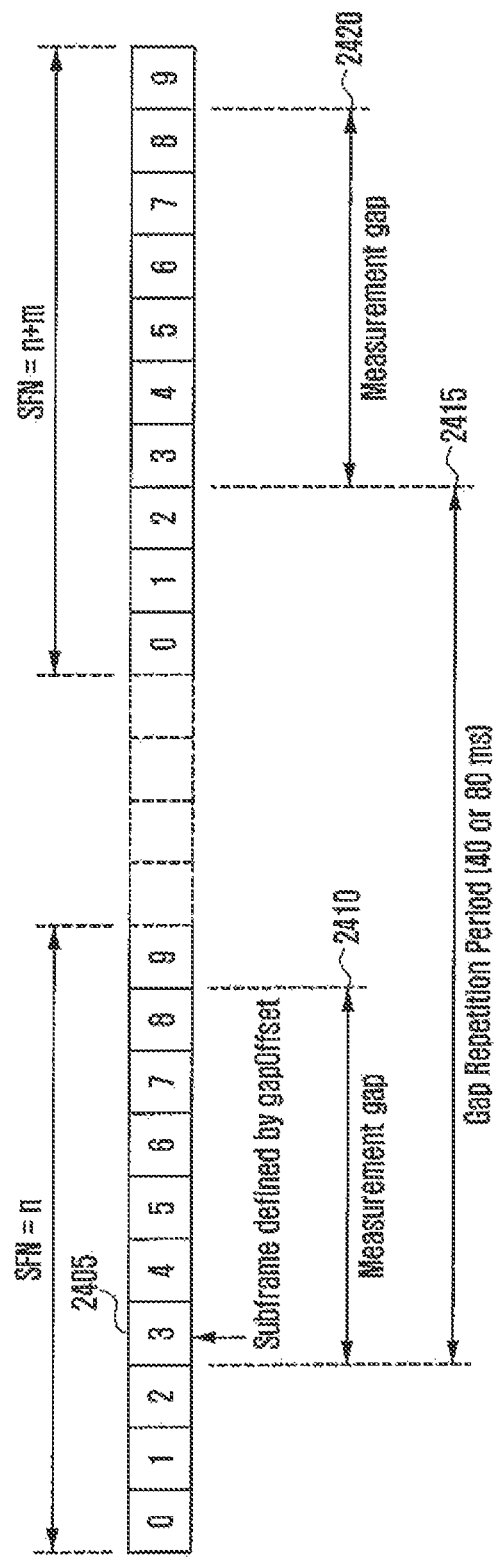
FIG. 22 is a diagram illustrating exemplary measurement gap configuration according to an embodiment of the present invention.

FIG. 22 is a diagram illustrating exemplary measurement gap configuration according to an embodiment of the present invention.

Referring to FIG. 22, the gapOffset indicates the subframe [3] 2405 of the radio frame of which system frame number (SFN) is n, and the first MG 2410 begins at the start time of the subframe [3] 2405 and maintains for 6 ms. The second MG 2420 starts at the same subframe, i.e. subframe [3], of the radio frame [n+m] after a predetermined period elapses since the start time of the subframe [3] 2405. Here, m is an integer determined by the gap repetition period.

Although the non-serving frequency measurement has been completed during one MG, the MG occurs repeatedly until it is released by the eNB.

Returning to FIG. 21, the UE 2305 performs the operation necessary by applying the measurement gap defined based on the measurement gap configuration at step 2320. The UE 2305 determines the time duration corresponding to the measurement gap by applying the gapOffset and gap repetition period. The gapOffset is classified into one of the first gapOffset set to a value in the range from 0 to 39 and the second gapOffset set to a value in the range from 0 to 79. If the first gapOffset is signaled, the gap repletion period is 40 ms and, otherwise if the second gap Offset is signaled, 80 ms. The UE may calculates the system frame number (SFN and the subframe number which determine the start time of the MG using equations (10) and (11).

The SFN of the radio frame in which the MG starts can be calculated by equation (10) in embodiment.

$$\text{SFN mod } T = \text{FLOOR}(\text{gapOffset}/10)$$

$$T = \text{gap repetition period}/10 \tag{10}$$

The subframe number at which the MG start can be calculated by equation (11) in an embodiment.

$$\text{subframe} = \text{gapOffset mod } 10 \tag{11}$$

The UE 2305 applies the measurement gap to the serving cells in the active state currently. The UE 2305 may operate as follows during the measurement gap.

<UE Operation in Measurement Gap>

The UE rules out the subframe overlapped with MG in determining PRACH subframe for start of the random access If the MG is overlapped with the subframe carrying the configured uplink grant, the UE processes the uplink grant but does not transmit but PUSCH. The configured uplink grant is the uplink grant allocating resource through semi-persistent scheduling for use semi-persistently utile being withdrawn explicitly. Processing the uplink grant means preparing uplink transmission indicated by the uplink grant to make retransmission possible afterward.

The UE does not monitor PDCCH of the activated serving cell during the MG.

The UE does not monitor PHICH of the activated serving cell during the MG. The PHICH is the downlink control channel carrying HARQ feedback information. If PHICH is not received after transmitting the PUSCH due to the MG, the UE sets the feedback to ACK to avoid unnecessary retransmission.

The UE does not receive PDSCH through the activated serving cell during the MG.

The UE does not transmit PUSCH through the activated serving cell during the MG.

The UE does not transmit Channel Quality Indicator (CQI) or Channel

Status Information (CSI) during the MG.

The UE does not transmit Scheduling Request (SR) during the MG. The SR is a control signal of 1 bit for configuration Physical Uplink Control Channel (PUCCH). The UE transmits the SR to request the eNB for transmission resource.

The UE does not transmit Sounding Reference Signal (SRS) during the MG.

The UE does not transmit PUSCH during the MG and performs non-adaptive retransmission at the next retransmission timing (i.e. sets HARQ_FEEDBACK to NACK).

The serving eNB 2315 determines to add a cell of the drift eNB 2310 to the UE 2305 as a serving cell at step 2321. The serving eNB 2315 sends the drift eNB 2310 a predetermined control message to request for configuring the serving cell. The control message includes various informations, particularly UE capability information such as rf-Parameters, measParameters, and SuportedBandCombination-r10.

The rf-parameters includes the information on the frequency band and frequency band combination supported by the UE (SupportedBandCombination). The measParameters is the information indicating whether the measurement gap is necessary when the UE 2305 measures a predetermined frequency band in predetermined configuration.

The serving eNB 2315 sends the drift eNB 2310 the information on the SCells configured to the current UE 2305, i.e. the supportedBandCombination information applied to the UE 2305. The supportedBandCombination information indicates the frequency band on which the serving cell has been configured to the UE 2305. The serving eNB 2315 sends the drift eNB 2310 the measConfig and MeasGapConfig configured to the current UE 2305. The measConfig is the information on the measurement configured to the UE 2305 and includes the information on the frequencies on which measurement is configured.

After performing the Call Admission Control at step 2322, the drift eNB 2310 determines to add the serving cell and sends the serving eNB 2315 a SCell Add Accept control message at step 2323. The SCell Add Accept control message may include the control information related to the measurement gap configuration. The drift eNB 2310 operates in association with the measurement gap configuration as follows. The drift eNB 2310 determines the SCell to be configured additionally in consideration of the capability of the UE 2305 and the current band combination of the eNB 2305 (supportedBandCombination applied currently). The drift eNB 2310 determines whether it is necessary to apply the MG to the non-primary set serving cells in consideration of the measConfig, MeasGapConfig, and measParameters configured to the UE 2305 and the frequency band of the non-primary set serving cell to be configured to the UE 2305. For example, if the MG is necessary for the UE to measure the measurement target configured currently in the band combination of the UE 2305 which include the non-primary set serving cell, the UE determines that it is necessary to apply the MG to the non-primary set serving cell. The drift eNB 2310 notifies the serving eNB 2315 the MG application necessity and MG configuration.

The serving eNB 2315 determines whether to perform MG reconfiguration at step 2325. The serving eNB 2315 determines whether it is necessary to apply the MG to the primary set serving cells in consideration to the capability of the UE 2305 and current band combination and measurement target of the UE 2305. According to the determination result, the serving eNB sends the UE 2305 the following information.

MeasGapConfig: This can be omitted if MG is configured to the UE 2305 already and the same configuration is to be used.

Primary set or non-primary set or both: This is an indicator indicating the serving cell to which the measurement gap (MG) is applied. The MG is applied to the primary set serving cells or non-primary set serving cells or both the primary and non-primary sets serving cells depending on the above information.

The UE 2305 performs measurement on the measurement target while performing data communication with the eNB. The UE 2305 applies the measurement gap to the primary and non-primary sets serving cells selectively. If it is indicated that the MG is applied to the primary set serving cells, the UE 2305 determines the MG duration by applying the SFN and subframe number of the PCell. If it is indicated that the MG is applied to the non-primary set serving cells, the UE 2305 determines the MG duration by applying the SFN of a predetermined non-primary set serving cell, e.g. PUCCH SCell, and the subframe number. If it is determined that the MG is applied to both the primary and non-primary sets serving cells, the UE 2305 determines the MG duration by applying the SFN and subframe number of the PCell.

If the non-primary set serving cell and the measurement gap are configured, the UE 2305 operates as follows during the measurement gap.

<UE Operation During MG>

If the serving cell in which random access is to be performed belongs to the set of the serving cell indicated to apply the MG in determining the PRACH subframe for initiating the random access, the UE omits the subframe overlapped to the MG.

If the subframe carrying the configured uplink grant is overlapped with the MG, the UE operations as follows.

0 If it is indicated that the MG is applied to the primary set serving cells, the UE processes the uplink grant but does not transmit PUSCH.

0 If it is indicated that the MB is applied to only the non-primary set serving cells, the UE processes the uplink grant and transmits PUSCH.

If it is indicated that the MG is applied to the primary set serving cells, the UE does not monitor PDCCH of the primary set serving cells in the active state during the MG. If it is determined that the MG is applied to the non-primary set serving cells, the UE does not monitor PDCCH of the non-primary set serving cells in the active state during the MG.

Figure 23:
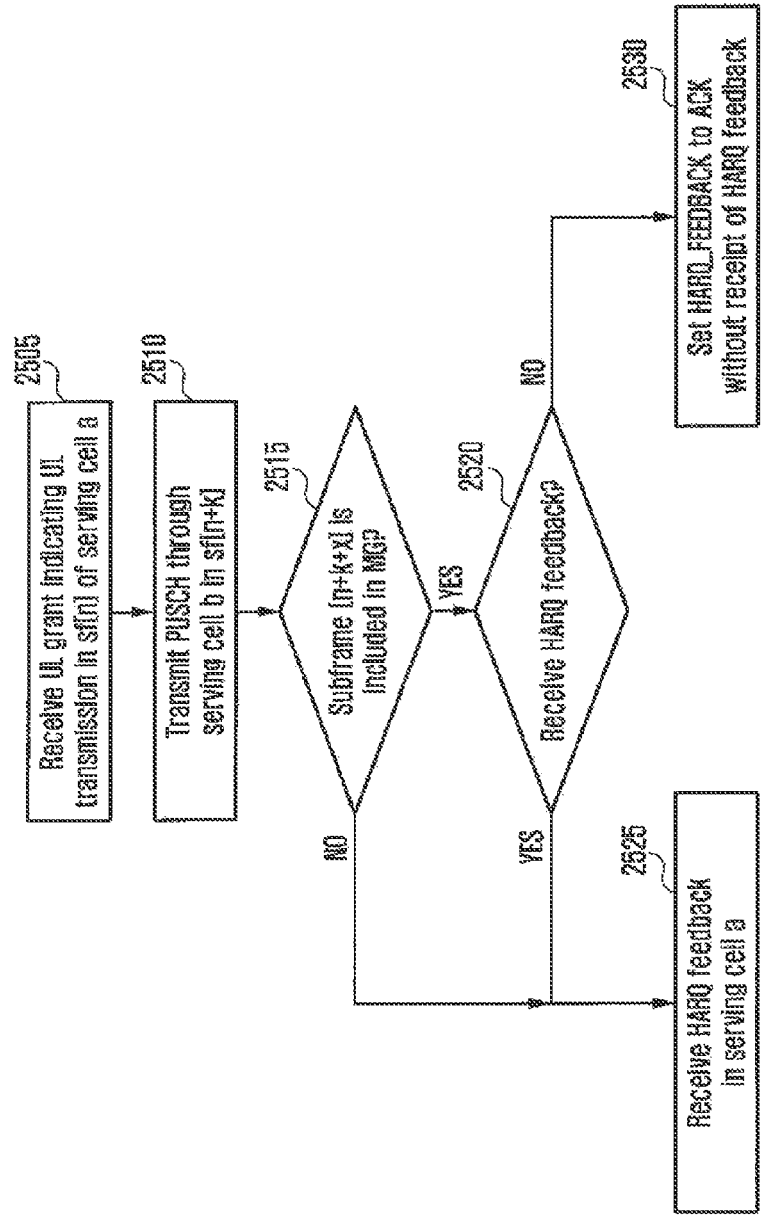
FIG. 23 is a flowchart illustrating the UE operation of receiving PHICH according to an embodiment of the present invention.

The UE operation of determining whether to monitor PHICH during the MG is performed as shown in FIG. 23. The detailed description thereof is made later.

If it is indicated that the MG is applied to the primary set serving cells, the UE does not receive PDSCH through the primary set serving cells in the active state during the MG. If it is indicated that the MG is applied to the non-primary set serving cells, the UE does not received PDSCH through the non-primary set serving cells in the active state during the MG.

If it is indicated that the MG is applied to the primary set serving cells, the UE does not transmit PUSCH through the primary set serving cells in the active state during the MG and sets the HARQ_FEEDBACK to NACK. If it is indicated that the MG is applied to the non-primary set serving cells, the UE does not transmit PUSCH through the non-primary set serving cells in the active state during the MG and sets the HARQ_FEEDBACK to NACK.

Figure 25:
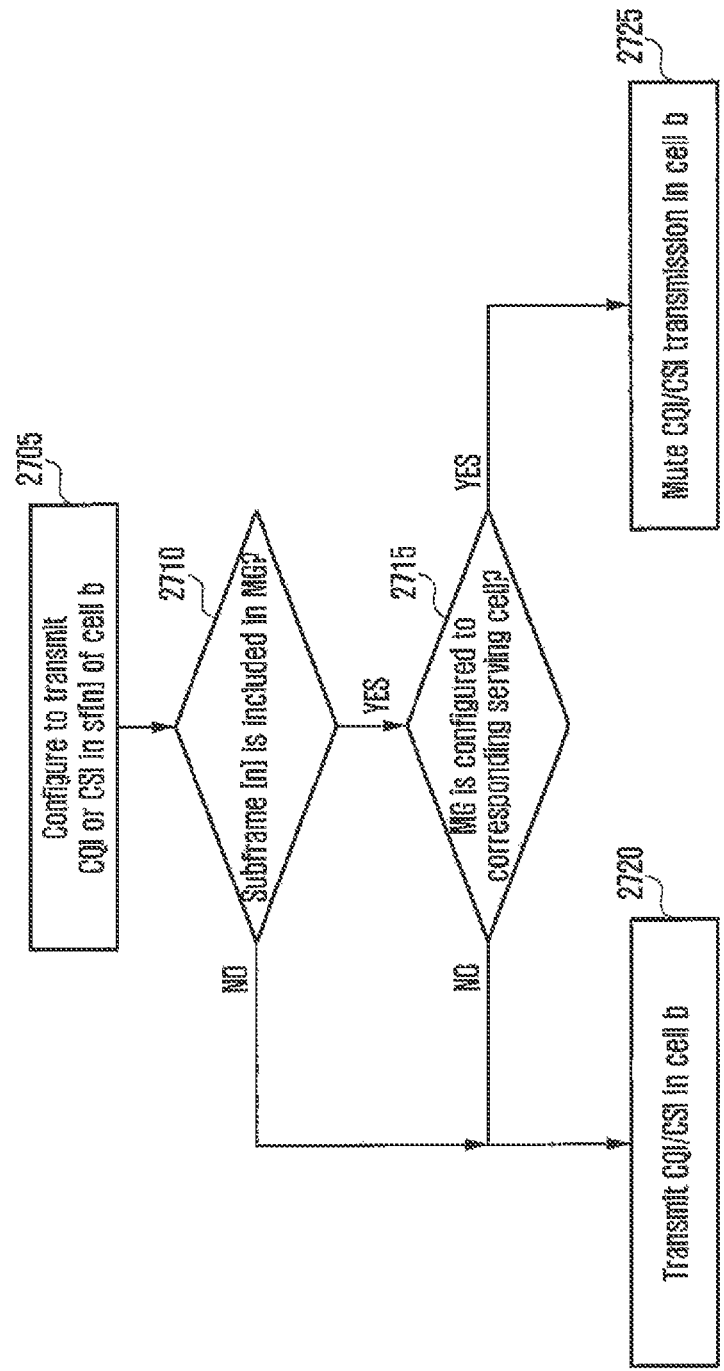
FIG. 25 is a flowchart illustrating the UE operation of transmitting CQI or CSI according to an embodiment of the present invention.

The UE operation of determining whether to transmit Channel Quality Indicator (CQI) or Channel status Information (CSI) during the MG is performed as shown in FIG. 25. Detailed description thereof is made later.

If it is indicated that the MG is applied to the primary set serving cell, the UE does not transmit Scheduling Request (SR) through the PCell during the MG. If it is indicated that the MG is applied to the non-primary set serving cells, the UE does not transmit the SR through the PUCCH SCell during the MG.

If it is indicated that the MG is applied to the primary set serving cell, the UE does not transmit Sounding Reference Signal (SRS) through the primary set serving cells in the active state during the MG. If it is indicated that the MG is applied to the non-primary set serving cell, the UE does not transmit the SRS through the non-primary set serving cell in the active state during the MG.

FIG. 23 is a flowchart illustrating the UE operation of receiving PHICH according to an embodiment of the present invention.

Referring to FIG. 23, the UE receives the PDCCH indicating PUSCH transmission from a certain serving cell a at the subframe [n](sf[n]) at step 2505.

The UE performs PUSCH transmission at the subframe [n+k](sf[n+k]) of the serving cell b at step 2510. Here, k is a predetermined integer which is fixed to 4 in FDD mode and set to different values depending on TDD UL/DL configuration in TDD mode. Typically, the serving cells a and b are identical with each other, if the cross-carrier scheduling is configured to the serving cell b, the serving cell a may differ from the serving cell b. The cross-carrier scheduling is a technique of differentiating between the cell for receiving PDCCH and the cell for transmitting PDSCH and PUSCH for use when it is difficult to decode the PDCCH of the serving cell be correctly due to the strong interference of the neighbor cells.

The UE determines whether the subframe supposed to receive PHICH, i.e. subframe (n+k+x), is included in the MG period at step 2515. At this time, the subframe (n+k+x) may be partially included in the MG period. This may occurs when the primary and non-primary sets subframe boundaries mismatch, subframe (n+k+x) is placed at the start or end of the MG period, or the MG period is configured based on the SFN and subframe of the primary set although the MG has to be applied to the serving cell belonging to the non-primary set. At this time, the UE operates as follows.

If a part of the subframe is included in the MG period, the UE may operate as if the whole subframe is included. If n OFDM symbols at the beginning of the subframe (n+k+x) are included in the MG period, the UE may operate as if the subframe (n+k+x) is included in the MG period. If m OFDM symbols at the end of the subframe (n+k+x) is included in the MG period, the UE may operate as if the subframe (n+k+x) is included in the MG period. Here, x is set to 4 in the FDD mode and a value determined depending on the TDD UL-DL configuration in the TDD mode.

If it is determined that the subframe (n+k+x) is included in the MG period at step 2515, the UE determines whether the HARQ feedback is received at step 2520 as follows. The UE determines whether the serving cell a or the serving cells a and b belong to the set of the serving cells configured such that the MG is applied (e.g. determines whether it is configured that the MB is applied to the primary set serving cells and whether the cell a or the cells a and b belong to the primary set) and, if so, the procedure goes to step 2530. If the serving cell a does not belong to the set of the serving cells configured such that the MG is applied thereto or if the serving cells a and b do not belong to the set of serving cells configured such that the MG is applied thereto, the procedure goes to step 2525. Also, the UE may determine whether the MG is configured for the set of the serving cells to which the serving cell a belongs or whether the MG is configured for the set of serving cells to which the serving cells a and be belong.

Since the cross-carrier scheduling is not configured across the primary and non-primary sets, if one of the serving cells a and b belongs to a set, the other cell belongs to the same cell too.

If it is determined that the subframe (n+k+x) is included in the MG period at step 2515 or if the HARQ feedback is received at step 2520, the UE receives PHICH from the SCell a and sets the HARQ_FEEDBACK variable based on the received HARQ feedback at step 2525.

If no HARQ feedback is received at step 2520, the UE does not receive PHICH from the SCell a at step 2530. The HARQ_FEEDBACK is set to ACK to avoid unnecessary retransmission at the next retransmission occasion.

Figure 24:
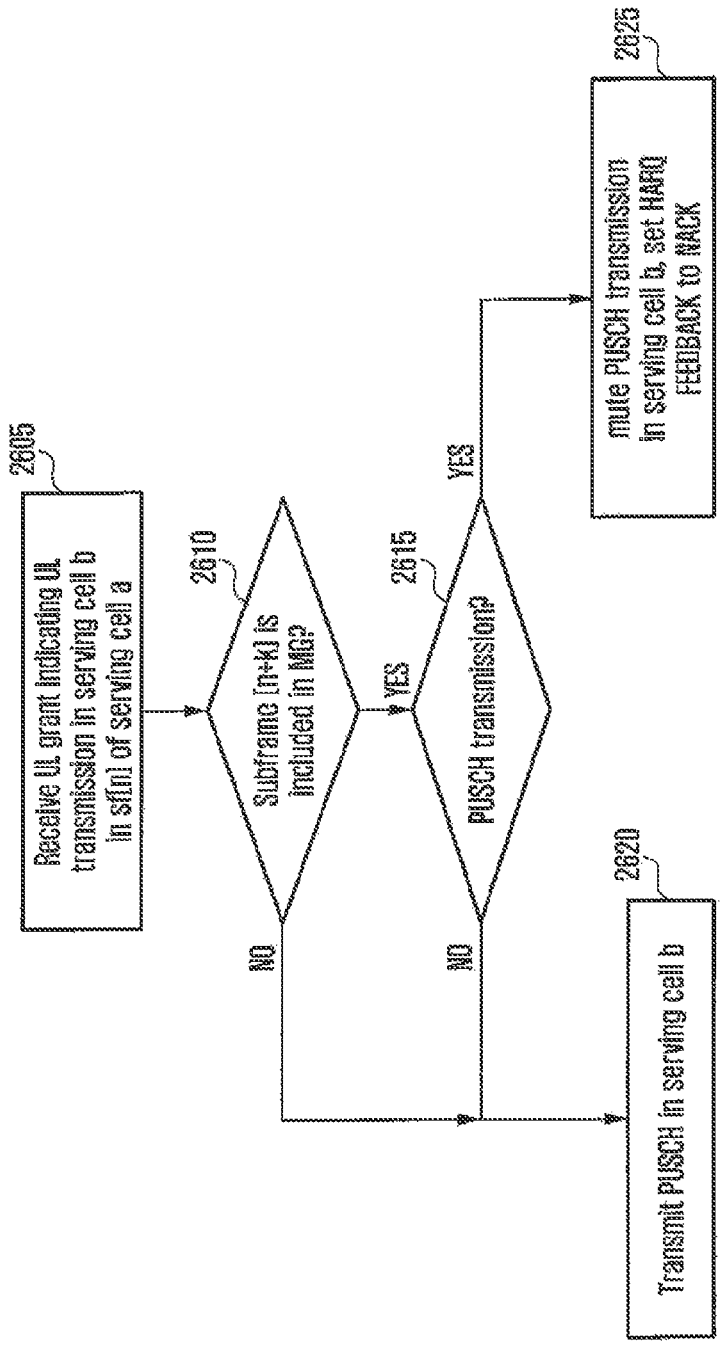
FIG. 24 is a flowchart illustrating the UE operation of transmitting PUSCH according to an embodiment of the present invention.

FIG. 24 is a flowchart illustrating the UE operation of transmitting PUSCH according to an embodiment of the present invention.

Referring to FIG. 24, the UE receives the PDCCH instructing PUSCH transmission of the serving cell b from the serving cell a at the subframe [n].

The UE determines whether the subframe supposed to transmit PUCCH, i.e. subframe (n+k) is included in the MG period at step 2610. At this time, if the subframe (n+k) may be partially included in the MG period. This may occurs when the primary and non-primary sets subframe boundaries mismatch, subframe (n+k) is placed at the start or end of the MG period, or the MG period is configured based on the SFN and subframe of the primary set although the MG has to be applied to the serving cell belonging to the non-primary set. At this time, the UE operates as follows. If a part of the subframe is included in the MG period, the UE may operate as if the whole subframe is included. Here, k is set to 4 in the FDD mode and a value determined depending on the TDD UL-DL configuration in the TDD mode.

If it is determined that the subframe (n+k) is included in the MG period at step 2610, the UE determines whether the PUSCH is transmitted at step 2615 as follows. The UE determines whether the serving cell a or the serving cells a and b belong to the set of the serving cells configured such that the MG is applied (e.g. determines whether it is configured that the MB is applied to the primary set serving cells and whether the cell a or the cells a and b belong to the primary set) and, if so, the procedure goes to step 2625. If the serving cell a does not belong to the set of the serving cells configured such that the MG is applied thereto or if the serving cells a and b do not belong to the set of serving cells configured such that the MG is applied thereto, the procedure goes to step 2620. Also, the UE may determine whether the MG is configured for the set of the serving cells to which the serving cell a belongs or whether the MG is configured for the set of serving cells to which the serving cells a and be belong.

If it is determined that the subframe (n+k) is not included in the MG period at step 2610 or if the PUSCH is not transmitted at step 2615, the UE transmits the PUSCH through the SCell b at step 2620.

If it is determined to transmit the PUSCH at step 2615, the UE skips PUSCH transmission and sets the HARQ_FEEDBACK to NACK at step 2625.

FIG. 25 is a flowchart illustrating the UE operation of transmitting CQI or CSI according to an embodiment of the present invention.

The UE recognize that the subframe [n] of the cell b is configured to transmit the CQI or CSI at step 2705. The cell b may be the PCell or the PUCCH SCell.

The UE determines whether the subframe [n] is included in the MG period at step 2710. If the subframe is included MG at least partially, the UE operates as if the whole subframe is included in the MG period.

If it is determined that the subframe [n] is included in the MG period at step 2710, the UE determines whether the serving cell set including the cell b is configured with the MG. If the cell b is the PCell, the UE determines whether the primary set serving cell is configured with the MG and, otherwise, if the cell be is the PUCCH SCell, whether the primary set serving cell is configured with the MG. If the corresponding serving cell is configured with the MG, the procedure goes to step 2725 and, otherwise, step 2720.

At step 2720, the UE transmits the CQI or CSI at the subframe [n] of the cell b.

At step 2725, the UE does not transmit the CQI and CSI at the subframe [n] of the cell b.

Figure 26:
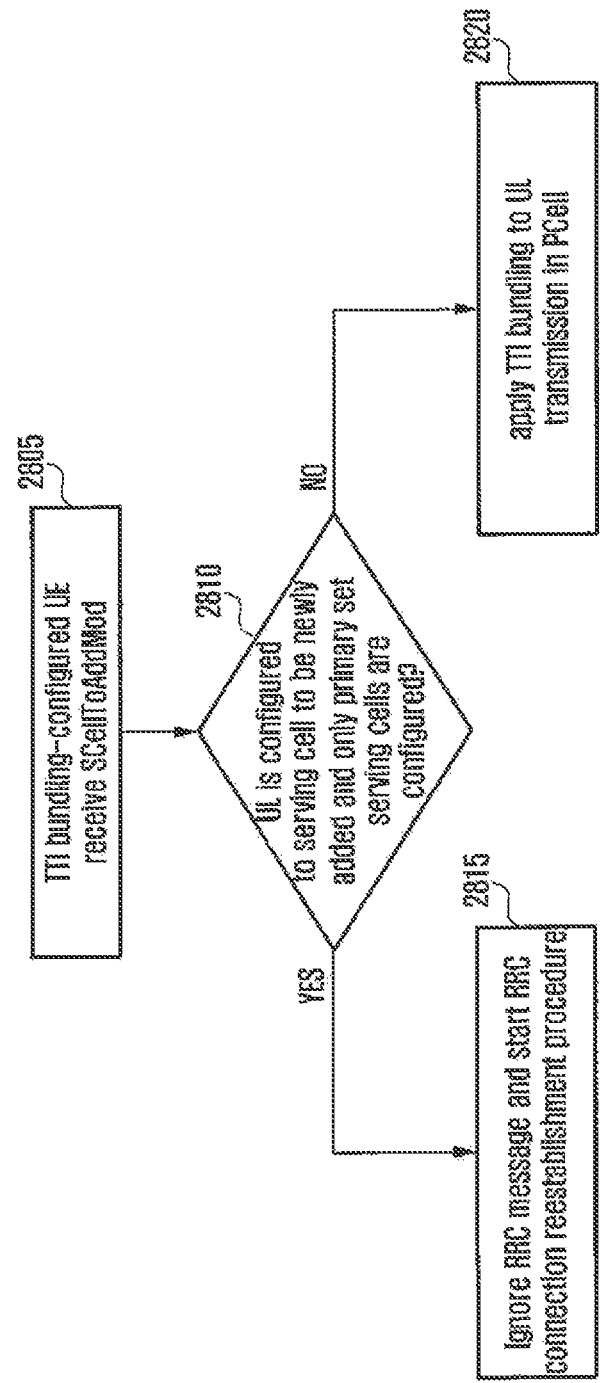
FIG. 26 is a flowchart illustrating the UE operation of configuring TTI bundling according to an embodiment of the present invention.

FIG. 26 is a flowchart illustrating the UE operation of configuring TTI bundling according to an embodiment of the present invention.

According to another embodiment of the present invention, a procedure of applying different TTI bundling schemes to the primary and non-primary sets is proposed. The TTI bundling is a technique of solving the uplink transmission power shortage problem occurring in cell switching by transmitting the same data in four consecutive subframes. Typically, the carrier aggregation and TTI bundling are not applied together. This is because the carrier aggregation is advantageous when the uplink transmission power is high enough while the TTI bundling is advantageous when the uplink transmission power is low. In the case that the inter-eNB CA is configured, the TTI bundling may be necessary in data communication with the macro cell although there is no transmit power shortage in data communication with the pico cell. The present invention proposes a method of applying the TTI bundling to predetermined serving cells but not the rest serving cell when the inter-eNB CA and TTI bundling are configured together. The predetermined serving cell may be the PCell or primary set serving cell.

Referring to FIG. 26, the UE receives a control message for configuring SCell at step 2805. At this time, the TTI bundling is configured to the UE.

The UE determines whether the following condition is fulfilled at step 2810 after configuring the SCell.

<Condition>

If any SCell to which uplink has been configured exists among the SCells configured to the UE after adding the SCell, all of the currently configured serving cells are primary set serving cells (or no non-primary set serving cells exist among the currently configured serving cells).

If the condition is fulfilled, this is a situation in which the intra-eNB CA is configured and thus the TTI bundling should not be configured. In this case, the procedure goes to step 2815. If the condition is not fulfilled, this is a situation in which the inter-eNB CA has been configured and thus the procedure goes to step 2820.

At step 2815, the UE ignores the received RRC message and determines that RRC connection reestablishment has failed. The UE starts RRC connection reestablishment procedure.

At step 2820, the UE applies the TTI bundling to a predetermined serving cell selectively. The serving cell may be the PCell or a primary set serving cell. If the serving cell through which the PUSCH is transmitted is the PCell, the UE applies TTI bundling and, otherwise, does not apply TTI bundling. Also, if the serving cell through which the PUSCH is transmitted is a primary set serving cell, the UE applies TTI bundling and, otherwise, does not apply TTI bundling.

Applying TTI bundling means transmitting and retransmitting one MAC PDU consecutively a predetermined number of times when the uplink grant is received or uplink transmission is triggered by the configured uplink grant. The predetermined number of times is provided by TTI_BUNDLE_SIZE set to a value. The repetitive uplink transmission is referred to as uplink transmission bundle, and the HARQ operation is performed in unit of bundle. By transmitting one packet repetitively and soft-combining the uplink signals transmitted by the eNB consecutively, it is possible to maintain a satisfactory transmission success rate in a transmit power shortage situation of the UE.

Figure 27:
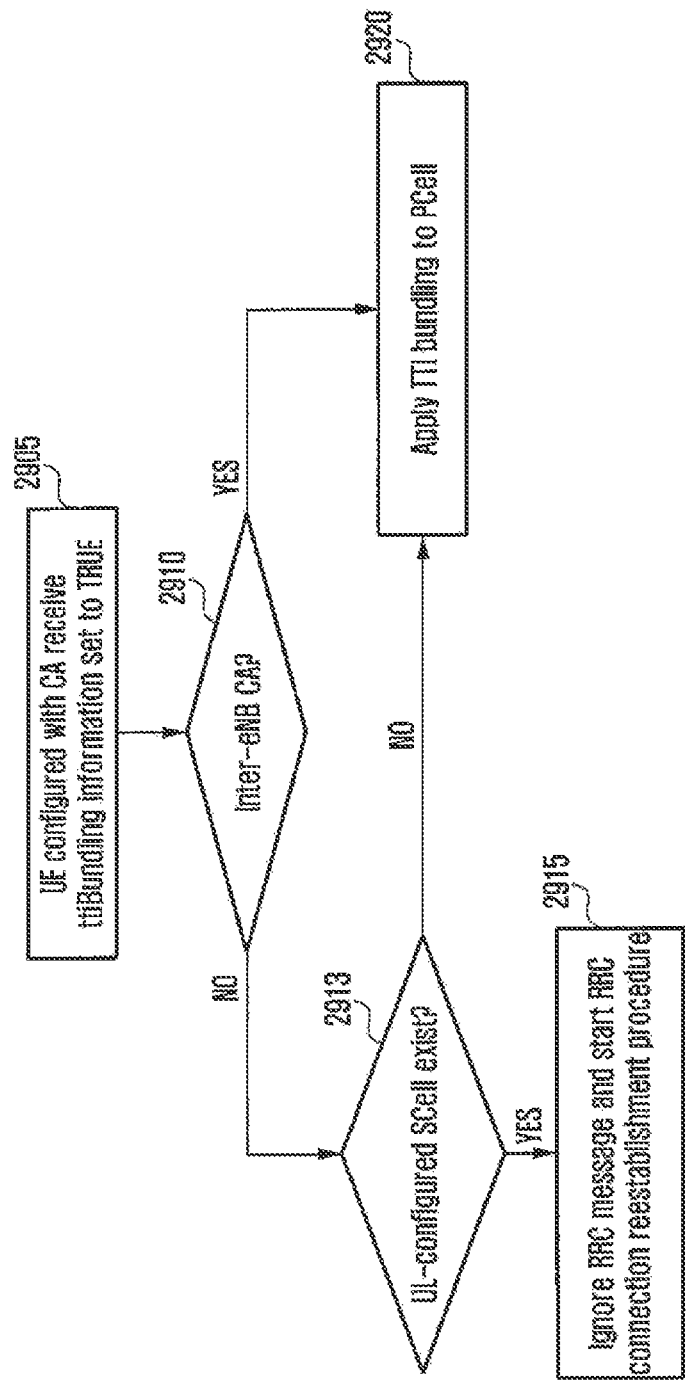
FIG. 27 is a flowchart illustrating the UE operation of configuring TTI bundling according to an embodiment of the present invention.

FIG. 27 is a flowchart illustrating the UE operation of configuring TTI bundling according to an embodiment of the present invention.

Referring to FIG. 27, the UE receives a control message for configuring TTI bundling to the UE to which one or more SCells are configured at step 2905. If an RRC control message includes a ttiBundling IE set to TRUE, this control message is of configuring TTI bundling to the UE.

The UE determines whether the currently configured CA is the inter-eNB CA or intra-eNB CA at step 2910. If one or more non-primary set serving cells have been configured, this means that the inter-eNB CA is configured and thus the procedure goes to step 2920. If all of the configured serving cells are the primary set serving cells, the procedure goes to step 2913.

At step 2913, the UE determines whether any SCell configured with uplink resource (SCell configured with UL) among the currently configured SCells. If there is nay SCell configured with uplink resource, the procedure goes to step 2915 and, otherwise, step 2920.

Steps 2915 and 2920 of FIG. 27 are identical with steps 2815 and 2820 of FIG. 26, detailed descriptions thereof are omitted herein.

Figure 28:
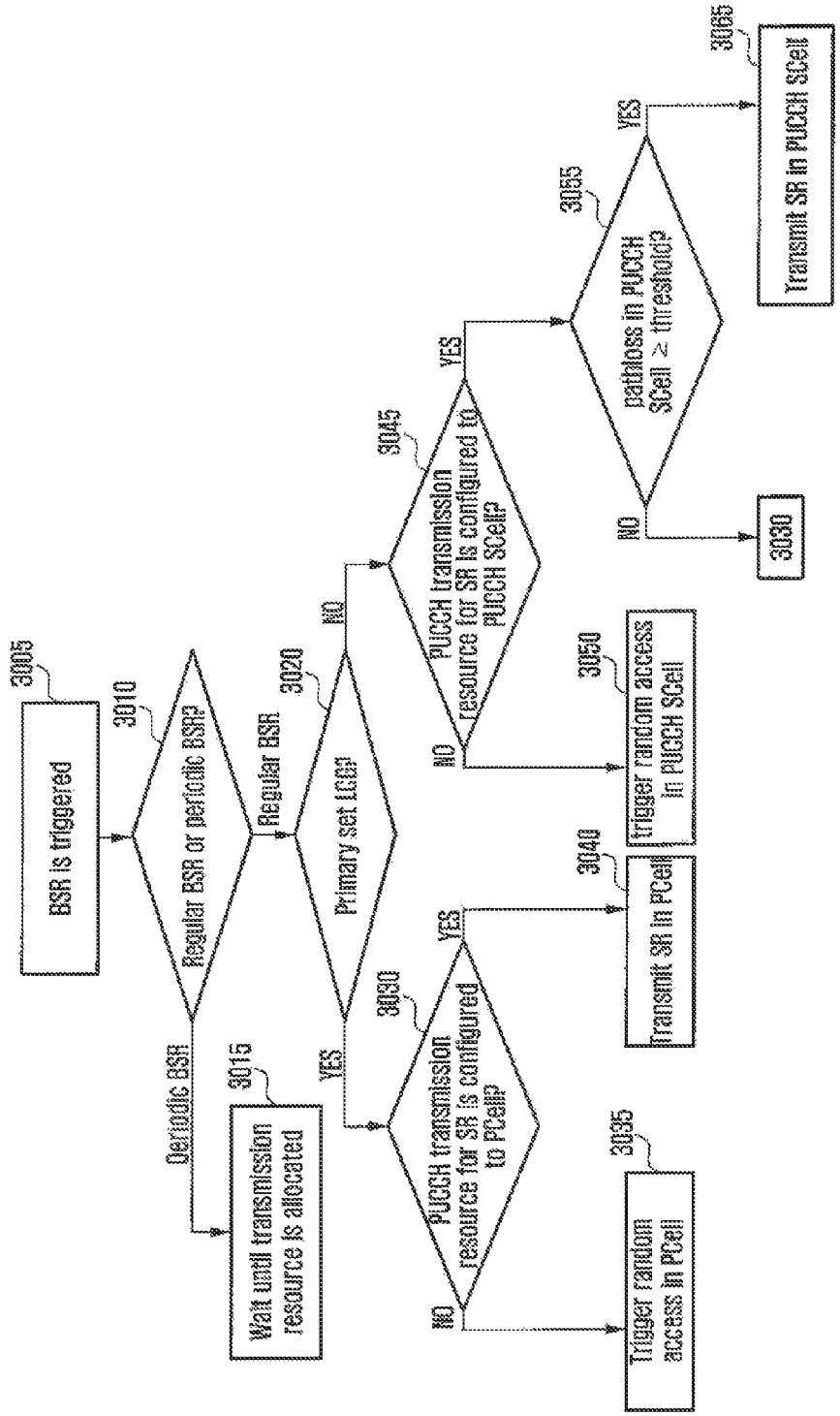
FIG. 28 is a flowchart illustrating the UE operation of selecting a cell for triggering SR according to an embodiment of the present invention.

FIG. 28 is a flowchart illustrating the UE operation of selecting a cell for triggering SR according to an embodiment of the present invention.

A SR transmission procedure and apparatus of a UE is proposed in another embodiment of the present invention.

In order to transmit data in uplink, the UE has to request the eNB for transmission resource. The UE may request for the transmission resource using the Scheduling Request (SR) transmission resource allocated already or through the random access procedure. The transmission resource request using the SR transmission resource is referred to as Dedicated-Scheduling Request (D-SR), and the transmission resource request using the random access procedure is referred to as Random Access-Scheduling Request (RA-SR) procedure. The SR transmission resource is allocated as a part of the PUCCH transmission resource. The PUCCH transmission resource can be allocated to the UE in the PCell or the PUCCH SCell, and the UE may be allocated one or more SR transmission resources at a certain time point. The UE selects the serving for SR transmission in consideration of the type of data which has triggered SR, whether SR transmission resource is configured, and PUCCH SCell path loss.

Referring to FIG. 28, the Buffer Status Report is triggered to the UE at step 3005. The BSR is the control information in order for the UE to reports its buffer status to the eNB and used in one of two formats: short BSR and long BSR. The BSR may carry the Buffer Status (BS) of at least one and up to 4 Logical Channel Group (LCG). The short BSR is used when there is one LCG having the data to be transmitted and is composed of the LCG identifier and BS. The long BSR is used to report the buffer status of four LCGs and contains the BSs of the LCGs in an order of the LCG identifiers. The LCG is a set of the logical channel grouped under the control of the eNB, and the logical channels have similar logical channel priorities. The buffer status of the LCG is the sum of the buffer status related to the logical channels included in the LCG and shows the data amount that can be transmitted among the data of RLC transmission buffer, retransmission buffer, PDCP transmission buffer of the logical channels. The BSR may be triggered periodically or when a predetermined condition is fulfilled, e.g. when the data having a priority higher than that of the currently stored data occurs. The former is referred to as periodic BSR, and the latter is referred to as regular BSR.

The UE determines whether the triggered BSR is the periodic BSR or the regular BSR at step 3010. If the regular BSR is triggered, the procedure goes to step 3020 and, otherwise if the periodic BSR is triggered, step 3015.

At step 3015, the UE waits until the transmission resource for BSR transmission is allocated.

At step 3020, the UE starts the procedure of requesting for BSR transmission resource. This is because the regular BSR is required to be transmitted to the eNB promptly unlike the periodic BSR.

The UE determines whether the regular BSR is triggered for the primary set logical channel (or primary set LCG) data or the non-primary set logical channel (or non-primary set LCG) data at step 3020. In the case that the inter-eNB carrier aggregation is configured, the logical channels may be processed by set. For example, the logical channel of the service generating small data and sensitive to transmission delay and jitter such as VoIP may be processed through the serving cell of the primary set, and the logical channel of the service generating large data such as FTP may be processed through the serving cell of the non-primary set. As described above, the eNB may instruct the UE to process a part of the DRB in the serving cell of the non-primary set at step 635.

The logical channel processed in the serving cell of the primary set is referred to as primary set logical channel, and the logical channel processed in the serving cell of the non-primary set is referred to as non-primary set logical channel. The eNB may notify the UE of the primary set logical channel and non-primary set logical channel using the control message such as RRC connection reconfiguration message. At this time, it is possible to notify of the non-primary set logical channel explicitly while the rest logical channel are configured as the primary set logical channel. If the BSR has been triggered by the primary set logical channel data, the procedure goes to step 3030. Otherwise if the BSR has been triggered by the non-primary set logical channel data, the procedure goes to step 3045.

At step 3030, the UE determines whether SR transmission resource has been configured to the PCell. If the SR transmission resource has been configured to the PCell, the UE transmits the SR through the PCell. The UE sets the SR transmission power in consideration of the pathloss of the PCell. If no SR transmission resource has been configured to the PCell, the UE starts random access in the PCell at step 3035.

At step 3045, the UE determines whether SR transmission resource has been configured to the PUCCH SCell. If the SR transmission resource has been configured to the PUCCH SCell, the procedure goes to step 3055 and, otherwise if no SR transmission resource has been configured to the PUCCH SCell, step 3050.

At step 3050, the UE triggers random access in the PUCCH SCell. At this time, the UE operates depending on whether the following condition is fulfilled.

<PUCCH SR Start Condition>

The pathloss of a predetermined downlink signal, e.g. Cell Reference Signal (CRS), of the PUCCH SCell is good as compared to a predetermined threshold value (i.e. pathloss of PUCCH SCell is less than a threshold value); or the received signal strength of a predetermined downlink signal of the PUCCH SCell it good as compared to another threshold value (i.e. the received signal strength of the downlink signal of the PUCCH SCell is greater than the threshold value).

The threshold value may be transmitted to the UE using the control message of configuring the PUCCH SCell or non-primary set serving cell.

If the condition is fulfilled, the UE starts the random access in the PUCCH SCell and, otherwise, the procedure goes to step 3030 to determine whether to trigger the random access or transmit the SR in the PCell.

At step 3055, the UE determines whether the PUCCH SR start condition is fulfilled. If the PUCCH SR start condition is fulfilled, the UE transmits the SR in the PUCCH SCell at step 3065. If the PUCCH SR start condition is not fulfilled, the UE returns the procedure to step 3030.

Comparing the pathloss of the PUCCH SCell with the threshold value is to avoid triggering SR in the PUCCH SCell when the UE is near the PUCCH SCell physically but cannot receive the downlink signal of the PUCCH SCell.

Figure 29:
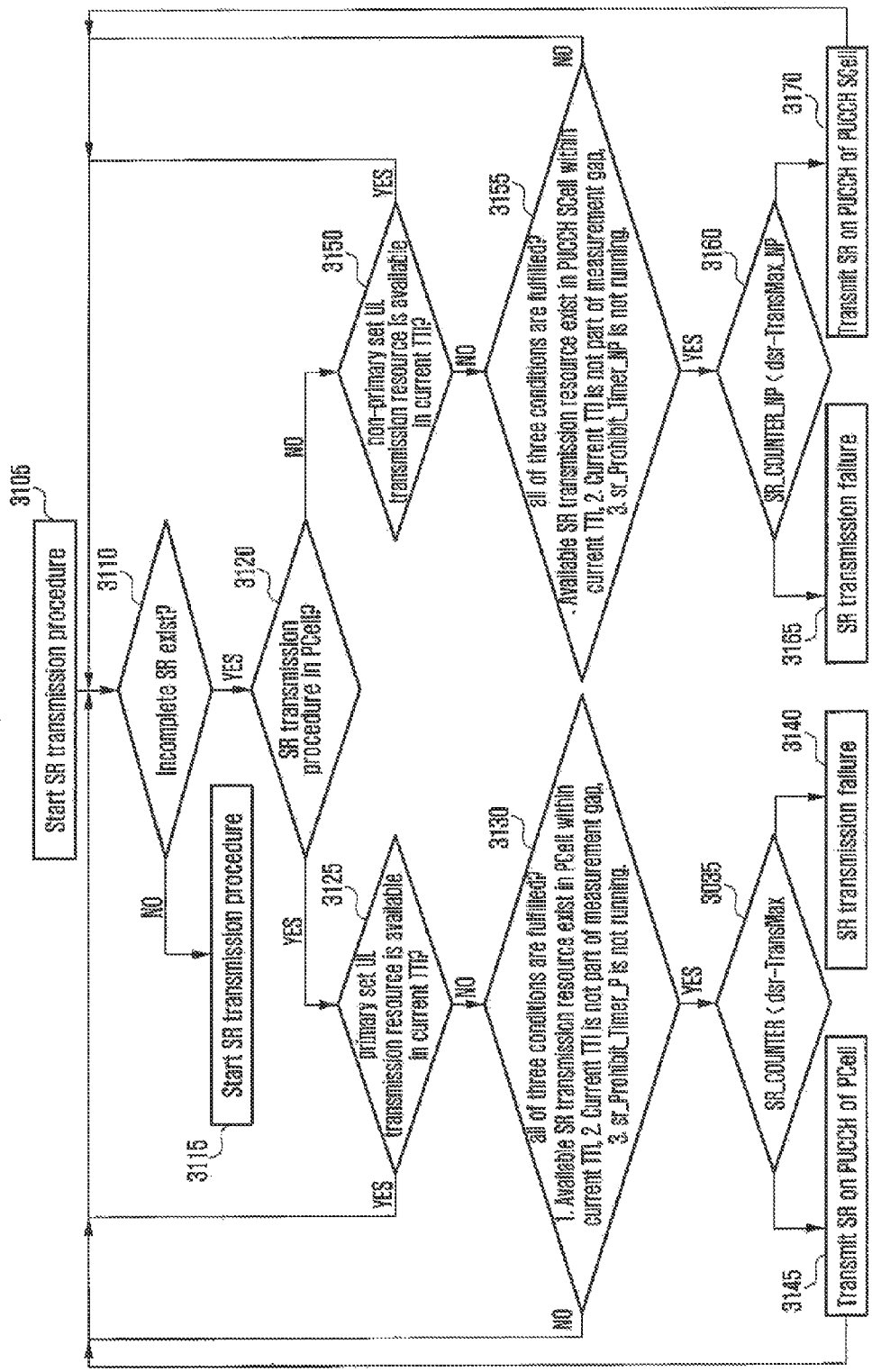
FIG. 29 is a flowchart illustrating the UE operation of transmitting the SR according to an embodiment of the present invention.

The UE operation of transmitting the SR is depicted in FIG. 29.

FIG. 29 is a flowchart illustrating the UE operation of transmitting the SR according to an embodiment of the present invention.

Referring to FIG. 29, the UE starts the SR transmission procedure at step 3105. The UE determines whether any incomplete SR at step 3110. If there is any incomplete SR, the procedure goes to step 3120 and, otherwise, step 3115 to end the SR transmission procedure.

The SR is triggered along with the regular BSR and regarded as not completed before being canceled. The SR is classified into one of primary SR and non-primary SR. If the BSR triggered along with the SR is the BSR of the primary set (i.e. if the BSR includes the primary set logical channel buffer status and triggered by the data of the primary set logical channel), the SR is the primary SR. If the BSR triggered along with the SR is the BSR of the non-primary set (i.e. if the BSR includes the non-primary set logical channel buffer status and triggered by the data of the non-primary set logical channel), the SR is the non-primary SR. The primary SR cancellation condition and the non-primary SR cancellation condition are as follows.

[Primary SR Cancellation Condition]

A MAC PDU to be transmitted through the primary set, the PDU includes a BSR, and the BSR reflects the buffer status up to the time point when the last event that triggered the primary set BSR (MAC PDU for the primary set is assembled and this PDU includes a BSR which includes buffer status up to (and including) the last event that triggered a primary set BSR).

[Non-Primary SR Cancellation Condition]

A MAC PDU to be transmitted through the non-primary set is generated, the PDU includes a BSR, and the BSR reflects the buffer status up to the time point when the last event that triggered the non-primary set BSR (MAC PDU for the non-primary set is assembled and this PDU includes a BSR which includes buffer status up to (and including) the last event that triggered a non-primary set BSR).

If there is any incomplete SR at step 3110, the UE determines whether the SR is triggered along with the BSR of the primary set at step 3120.

Or the UE determines whether the SR is triggered for PUCCH of the PCell. If the SR is triggered for the primary set or the PCell, the procedure goes to step 3125. Otherwise if the SR is triggered along with the BSR of the non-primary set or for the PUCCH of the PUCCH SCell, non-primary set, or PUSCH SCell, the procedure goes to step 3150.

If it is determined that the SR is triggered along with the BSR of the primary set or for the PCell at step 3120, the UE determines whether there is any serving cell allocated available uplink transmission resource among the serving cells of the primary set within the current TTI at step 3125 (check if UL-SCH is available for a transmission on the primary set serving cell). If there is available transmission resource, the procedure returns to step 3110 and, otherwise, step 3130.

At step 3130, the UE checks the three conditions as follows to determine whether the SR transmission is possible through the PUCCH of the PCell within the current TTI.

1. Available SR transmission resource is configured on the PUCCH of the PCell in the current TTI.
2. The current TTI is not a part of a measurement gap.
3. The sr-ProhibitTimer related to the PCell SR transmission (sr_Prohibit_Timer_P) is not running.

The measurement gap is the time duration which the eNB configures to the UE to perform measurement on other frequencies and in which the UE does not transmit/receive signal.

The sr-ProhibitTimer aims to prevent the UE from transmitting the SR so frequently and starts when the SR is transmitted. The sr-ProhibitTimer of the primary set (or PCell) and the sr-ProhibitTimer of the non-primary set (or PUCCH SCell) operate separately and may be set to different values. Both the sr-ProhibitTimer's are determined by the eNB and notified to the UE through a control message such as the RRC connection reconfiguration method.

If all of the three conditions are fulfilled, the procedure goes to step 3135 and, otherwise at least one of the three conditions is not fulfilled, returns to step 3110.

The UE compares the SR_COUNTER and the dsr-TransMax at step 3135. If the SR_COUNTER is less than the dsr-TransMax, the procedure goes to step 3145 and, otherwise, step 3140.

The SR_COUNTER denotes the number of SR transmission times of the UE, and the UE increments this variable by 1 whenever the SR is transmitted and initializes the variable when the SR is cancelled. The dsr-TransMax is a variable for preventing the SR from being repeated infinitely and is informed to the UE through a control message such as RRC connection reconfiguration message.

If the SR is triggered by the BSR of the primary set or triggered to the PCell at step 3120, the UE regards this as SR transmission failure at step 3140 and takes a necessary action.

If the SR_COUNTER is less than the dsr-TransMax, the UE transmits the SR through the PUCCH of the PCell, increments the SR_COUNTER by 1, and starts sr_Prohibit_Timer at step 3145, and then returns the procedure to step 3110.

If it is determined the SR is not triggered along with the BSR of the primary set or not for the PCell at step 3120, the UE determines whether there is any serving cell having uplink transmission resource available among the serving cells of the non-primary set within the current TTI (check if UL-SCH is available for a transmission on the corresponding non primary set serving cell). If there is any cell having transmission resource available, the procedure returns to step 3110 and, otherwise, step 3155.

At step 3155, the UE checks the three conditions as follows to determine whether the SR transmission is possible through the PUCCH of the PUCCH SCell within the current TTI.

1. Available SR transmission resource is configured on the PUCCH of the PUCCH SCell in the current TTI.
2. The current TTI is not a part of the measurement gap.
3. The sr-ProhibitTimer related to the PUCCH SCell PCell SR transmission (sr_Prohibit_Timer_NP) is not running.

If all of the three conditions are fulfilled, the procedure goes to step 3160 and, otherwise at least one of the three conditions is not fulfilled, returns to step 3110.

At step 3160, the UE compares the SR_COUNTER_NP and the dsr-TransMax_NP. If the SR_COUNTER_NP is less than the dsr-TransMax_NP, the procedure goes to step 3170 and, otherwise, step 3165.

The SR_COUNTER_NP denotes the number of SR transmission times of the UE, and the UE increments this variable by 1 whenever the SR is transmitted and initializes the variable when the SR is cancelled. The dsr-TransMax_NP is a variable for preventing the SR from being repeated infinitely and is informed to the UE through a control message such as RRC connection reconfiguration message.

If the SR_COUNTER_NP is not less than the dsr-TransMax_NP, the UE determines that the SR transmission has failed at step 3165 and takes a necessary action.

Figure 30:
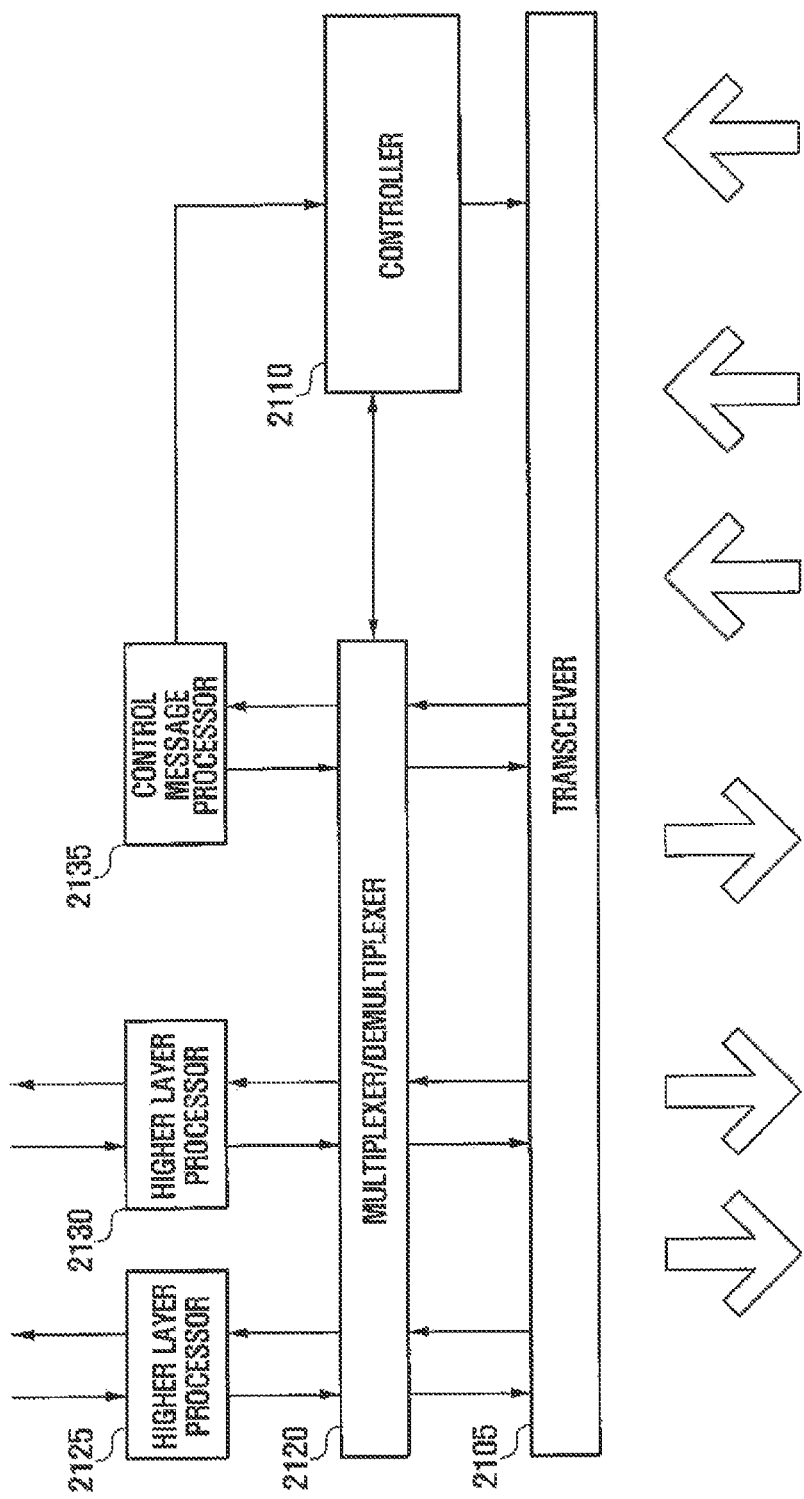
FIG. 30 is a block diagram illustrating a configuration of the UE according to an embodiment of the present invention.

If the SR_COUNTER_NP is less than the dsr-TransMax_NP, the UE transmits the SR through the PUCCH of the PCell, increments the SR_COUNTER_NP by 1, and starts sr_Prohibit_Timer_NP at step 3170, and then returns the procedure to step 3110. FIG. 30 is a block diagram illustrating a configuration of the UE according to an embodiment of the present invention.

Referring to FIG. 30, the UE according to an embodiment of the present invention includes a transceiver 2105, a controller 2110, a multiplexer/demultiplexer 2120, a control message processor 2135, and various higher layer processors 2125 and 2130.

The transceiver 2105 receives data and predetermined control signals on the downlink channel of the serving cell and transmits data and predetermined control signals on the uplink channel. In the case that a plurality of serving cells is configured, the transceiver 2105 transmits/receives data and control signals through the plural serving cells.

The multiplexer/demultiplexer 2120 multiplexes the data generated by the higher layer processors 2125 and 2130 and the control message processor 2135 and demultiplexes the data received by the transceiver 2105, the demultiplexed data being delivered to the higher layer processors 2125 and 2130 or the control message processor 2135.

The control message processor 2135 is an RRC layer entity which takes an action necessary for processing the control message received from the eNB. For example, the control message processor 2135 processes the received random access-related information and delivers the processing result to the controller.

The higher layer processors 2125 and 2130 are established per service. The higher layer processor processes the data generated by the user service such as File Transfer Protocol (FTP) and Voice over Internet Protocol (VoIP), the processing result being delivered to the multiplexer/demultiplexer 2120, and processes the data from the multiplexer/demultiplexer 2115, the processing result being delivered to the higher layer service application.

The controller 2110 controls the transceiver 2105 and the multiplexer/demultiplexer 2115 to check the scheduling command, e.g. uplink grants, received by the transceiver 2105 and perform uplink transmission using appropriate transmission resource at appropriate timing. The controller controls overall operations of SCell configuration and DRX configuration. In more detail, the controller controls the UE operations as shown in FIGS. 5 to 29. For example, the controller receives the control information including the configuration information of the secondary cell (SCell) to be added and the DRX configuration information from the primary serving cell (PCell) and controls, when the control message includes the indicator notifying that the first eNB controlling the SCell to be added differs from the second eNB controlling the PCell, such that the DRX configuration information is applied to the serving cell of the first eNB.

FIG. 31 is a block diagram illustrating an eNB according to an embodiment of the present invention.

The eNB includes a transceiver 2205, a controller 2210, a multiplexer/demultiplexer 2220, a control message processor 2235, various higher layer processors 2225 and 2230, and a scheduler 2215.

The transceiver transmits data and predetermined control signals on the downlink channel of the serving cell and receives data and predetermined control signals on the uplink channel. In the case that a plurality of carriers is configured, the transceiver 2205 transmits/receives data and control signals through the plural carriers.

The multiplexer/demultiplexer 2220 is responsible for multiplexing data generated by the higher layer processors 2225 and 2230 and the control message processor 2235 or demultiplexing the data received by the transceiver 2205, the demultiplexed data being delivered to the control message processor 2235 or the controller 2210. The control message processor 2235 processes the control message transmitted by the UE and takes a necessary action or generates a control message to be transmitted to the UE, the generated control message being delivered to the lower layer.

The higher layer processors 2225 and 2230 are established per service and processes the data from the S-GW or other eNB into RLC PDU, the RLC PDU being delivered to the multiplexer/demultiplexer 2220, and processes the RLC PDU from the multiplexer/demultiplexer 2220 into PDCP SDU, the PDCP SDU being transmitted to the S-GW or other eNB.

The scheduler allocates transmission resource to the UE at an appropriate timing in consideration of the UE buffer status and channel status and controls the transceiver to process the signal to be transmitted to the UE and transmit the signal.

The controller controls overall operations associated with the SCell configuration and DRX configuration. In more detail, the controller performs control operations of the eNB as described with reference to FIGS. 5 to 29. For example, the controller controls to transmit to the UE a control message including the secondary serving cell (SCell) configuration information and Discontinuous Reception (DRX) configuration information. Depending on the embodiment, the controller controls to receive the second cell (SCell) Add Request message from the second eNB controlling the primary serving cell (PCell) and transmit the SCell parameters and DRX configuration information to the second eNB.

Although preferred embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

Accordingly, it should be understood that above-described embodiments are essentially for illustrative purpose only but not in any way for restriction thereto. Thus the scope of the invention should be determined by the appended claims and their legal equivalents rather than the specification, and various alterations and modifications within the definition and scope of the claims are included in the claims.

The invention claimed is:
1. A communication method of a terminal in a mobile communication system, the method comprising:
receiving, from a primary serving cell (PCell), a first control message including secondary serving cell (SCell) configuration information for an SCell and discontinuous reception (DRX) configuration information;
applying, when the first control message includes an indicator indicating that a first base station for the SCell is different from a second base station for the PCell, the DRX configuration information to the SCell of the first base station;
receiving a second control message including a DRX media access layer (MAC) control element (CE);
determining whether the DRX MAC CE is received from a non-primary set serving cell or a primary set serving cell; and
stopping, if the DRX MAC CE is received from the non-primary set serving cell, the DRX timer for the non-primary set serving cell.

2. The method of claim 1, further comprising applying, if the first control message does not include the indicator, the DRX configuration information to the PCell of the second base station.

3. The method of claim 1, further comprising stopping, if the DRX MAC CE is received from the primary set serving cell, the DRX timer for the primary set serving cell.

4. The method of claim 1, wherein the DRX configuration information comprises at least one of an active time timer and a DRX-cycle parameter.

5. A communication method of a primary base station in a mobile communication system, the method comprising:
   transmitting, to a terminal, a first control message including secondary serving cell (SCell) configuration information for an SCell to be added and discontinuous reception (DRX) configuration information, the first control message including an indicator indicating that a first base station for the SCell is different from a second base station for the PCell; and
   transmitting a second control message including a DRX media access layer (MAC) control element (CE).

6. The method of claim 5, wherein the DRX configuration information comprises at least one of an active time timer and a DRX-cycle parameter.

7. A communication method of a base station in a mobile communication system, the method comprising:
   receiving a secondary serving cell (SCell) add request message from a first base station for a primary serving cell (PCell);
   transmitting a SCell parameter and discontinuous reception (DRX) configuration information to the first base station; and
   transmitting a control message including a DRX media access layer (MAC) control element (CE),
   wherein the DRX configuration information is applied to a SCell of a second base station, if the second base station for the SCell is different from the first base station for the PCell.

8. A terminal comprising:
   a transceiver configured to communicate with a base station; and
   at least one processor configured to:
      control receiving, from a primary serving cell (PCell), a first control message including secondary serving cell (SCell) configuration information for an SCell and discontinuous reception (DRX) configuration information, and
      applying, if the first control message includes an indicator indicating that a first base station for the SCell is different from a second base station for the PCell, the DRX configuration information to the SCell of the first base station,
   wherein the at least one processor is further configured to control receiving a second control message including a DRX media access layer (MAC) control element (CE),
   determining whether the DRX MAC CE is received from one of a non-primary set serving cell and a primary set serving cell, and stopping, if the DRX MAC CE is received from the non-primary set serving cell, the DRX timer for the non-primary set serving cell.

9. The terminal of claim 8, wherein the at least one processor is further configured to control applying, if the control message does not include the indicator, the DRX configuration information to the PCell of the second base station.

10. The terminal of claim 8, wherein the at least one processor is further configured to control stopping, if the DRX MAC CE is received from the primary set serving cell, the DRX timer for the primary set serving cell.

11. The terminal of claim 8, wherein the DRX configuration information comprises at least one of an active time timer and a DRX-cycle parameter.

12. A primary base station comprising:
   a transceiver configured to communicate with a terminal; and
   at least one processor configured to control transmitting, to a terminal, a first control message including secondary serving cell (SCell) configuration information for an SCell and discontinuous reception (DRX) configuration information, the first control message including an indicator indicating that a first base station for the SCell is different from a second base station the PCell,
   wherein the controller is further configured to control transmitting a second control message including a DRX media access layer (MAC) control element (CE).

13. The primary base station of claim 12, wherein the DRX configuration information comprises at least one of an active time timer and a DRX-cycle parameter.

14. A non-primary base station comprising:
   a transceiver configured to communicate with a terminal; and
   at least one processor configured to:
      control receiving a secondary serving cell (SCell) add request message from a first base station for a primary serving cell (PCell), and
      control transmitting a SCell parameter and discontinuous reception (DRX) configuration information to the first base station,
   wherein the DRX configuration information is applied to a SCell of a second base station, if the second base station for the SCell is different from the first base station for the PCell, and
   wherein the at least one processor is further configured to control transmitting a control message including a DRX media access layer (MAC) control element (CE).

* * * * *